US012552854B2

(12) United States Patent
Tomer et al.

(10) Patent No.: US 12,552,854 B2
(45) Date of Patent: Feb. 17, 2026

(54) PEPTIDES THAT BLOCK PRESENTATION OF ANTIGENIC ISLET PEPTIDES BY HLA-DQ8 AND METHODS FOR TREATING TYPE-1 DIABETES

(71) Applicants: Icahn School of Medicine at Mount Sinai, New York, NY (US); Montefiore Medical Center, Bronx, NY (US); Albert Einstein College of Medicine, Inc., Bronx, NY (US)

(72) Inventors: Yaron Tomer, New York, NY (US); Roman Osman, New York, NY (US); Angela Lombardi, Bronx, NY (US)

(73) Assignees: Icahn School of Medicine at Mount Sinai, New York, NY (US); Montefiore Medical Center, Bronx, NY (US); Albert Einstein College of Medicine, Bronx, NY (US)

( * ) Notice: Subject to any disclaimer, the term of this patent is extended or adjusted under 35 U.S.C. 154(b) by 1048 days.

(21) Appl. No.: 17/633,173

(22) PCT Filed: Aug. 4, 2020

(86) PCT No.: PCT/US2020/044911
§ 371 (c)(1),
(2) Date: Feb. 4, 2022

(87) PCT Pub. No.: WO2021/026175
PCT Pub. Date: Feb. 11, 2021

(65) Prior Publication Data
US 2022/0306722 A1    Sep. 29, 2022

Related U.S. Application Data

(60) Provisional application No. 62/883,062, filed on Aug. 5, 2019.

(51) Int. Cl.
C07K 14/74    (2006.01)
C07K 7/06    (2006.01)

(52) U.S. Cl.
CPC .......... C07K 14/70539 (2013.01); C07K 7/06 (2013.01)

(58) Field of Classification Search
None
See application file for complete search history.

(56) References Cited

U.S. PATENT DOCUMENTS

| 6,001,604 | A | * | 12/1999 | Hartman | ................ | C07K 14/62 |
| | | | | | | 435/68.1 |
| 7,745,391 | B2 | * | 6/2010 | Mintz | ..................... | A61P 37/00 |
| | | | | | | 514/19.3 |
| 7,842,467 | B1 | * | 11/2010 | Heidbrink | ............... | A61P 35/00 |
| | | | | | | 435/7.1 |
| 2008/0194462 | A1 | * | 8/2008 | Wucherpfennig | ..... | A61K 38/02 |
| | | | | | | 435/7.21 |
| 2008/0305986 | A1 | | 12/2008 | Fieboes et al. | | |
| 2013/0153419 | A1 | | 6/2013 | Li et al. | | |
| 2017/0281788 | A1 | | 10/2017 | Dimarchi et al. | | |
| 2018/0312544 | A1 | | 11/2018 | Collins et al. | | |

FOREIGN PATENT DOCUMENTS

WO    WO 2016/081869 A2    5/2016

OTHER PUBLICATIONS

Tugyi et al. (PNAS, 2005, vol. 102, p. 413-418).*
International Search Report and Written Opinion for International Application No. PCT/US2020/044911 mailed Nov. 23, 2020.
International Preliminary Report on Patentability for International Application No. PCT/US2020/044911 mailed Feb. 17, 2022.
Stavrakoudis, Molecular dynamics study of the human insulin B peptide SHLVEALYLVCGERGG complexed with HLA-DQ8 reveals important hydrogen bond interactions. Molecular Simulation. Sep. 1, 2011;37(10):837-45.

* cited by examiner

*Primary Examiner* — Agnieszka Boesen
(74) *Attorney, Agent, or Firm* — Heslin Rothenberg Farley & Mesiti P.C.

(57) ABSTRACT

The disclosure provides polypeptides that specifically bind to HLA-DQ8 for treating Type 1 Diabetes (T1D) and methods using same for reducing autoimmune destruction of pancreatic islet beta cells. In particular, the present disclosure relates to peptides containing at least one D-amino acid that are capable of blocking the presentation of antigenic islet peptides (e.g., InsB:9-23) by HLA-DQ8, and to their uses, especially as it relates to the prevention and/or treatment of T1D.

20 Claims, 31 Drawing Sheets

Specification includes a Sequence Listing.

|  |  | P1 | P2 | P3 | P4 | P5 | P6 | P7 | P8 | P9 |  |  |  |
|---|---|---|---|---|---|---|---|---|---|---|---|---|---|
|  | INSB9-23 | N-term |  |  | H | L | V | E | A | L | Y | L | V | C | G | E | R | G | G |  |  | C-term |
| 1 | RI | C-term |  |  | H | L | V | E | A | L | Y | L | V | C | G | E | R | G | G |  |  | N-term |
| 2 | RI-CT | C-term |  |  | G | G | V | E | A | L | Y | L | V | C | G | E | R | G | G |  |  | N-term |
| 3 | RI-CT-P6L | C-term |  |  | G | G | V | E | A | L | Y | L | L | C | G | E | R | G | G |  |  | N-term |
| 4 | RI-CT-P6F | C-term |  |  | G | G | V | E | A | L | Y | L | F | C | G | E | R | G | G |  |  | N-term |
| 5 | RI-CT-P6Y | C-term |  |  | G | G | V | E | A | L | Y | L | Y | C | G | E | R | G | G |  |  | N-term |
| 6 | RI-CT-P3A | C-term |  |  | G | G | V | E | A | A | Y | L | V | C | G | E | R | G | G |  |  | N-term |
| 7 | RI-CT-P3S | C-term |  |  | G | G | V | E | A | S | Y | L | V | C | G | E | R | G | G |  |  | N-term |
| 8 | RI-CT-P3C | C-term |  |  | G | G | V | E | A | C | Y | L | V | C | G | E | R | G | G |  |  | N-term |
| 9 | RI-CT-P3G | C-term |  |  | G | G | V | E | A | G | Y | L | V | C | G | E | R | G | G |  |  | N-term |
| 10 | RI-EXT | C-term | G | S | H | L | V | E | A | L | Y | L | V | C | G | E | R | G | G | F | F | N-term |
| 11 | RI-EXT1 | C-term | F | D | G | G | V | E | A | L | Y | L | V | C | G | E | R | G | G | S | H | N-term |
| 12 | RI-EXT2 | C-term | D | F | G | G | V | E | A | L | Y | L | V | C | G | E | R | G | G | H | S | N-term |
| 13 | RI-EXT3 | C-term | S | E | G | G | V | E | A | L | Y | L | V | C | G | E | R | G | G | S | R | N-term |
| 14 | RI-EXT4 | C-term | F | S | G | G | V | E | A | L | Y | L | V | C | G | E | R | G | G | S | K | N-term |

FIG. 3A

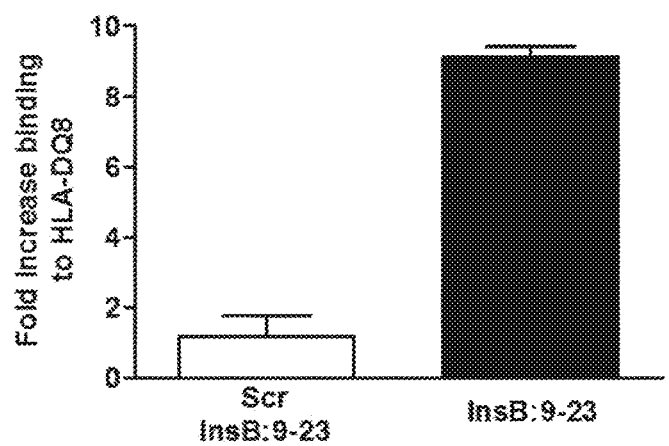

FIG. 3B

| Half-life and Intrinsic Clearance of RI-CT and RI-EXT (1 µM) after Incubation with Mouse Hepatocytes | | | |
|---|---|---|---|
| Species | Compound | $t_{1/2}$ (minutes) | $CL_{int}$ (mL/min/million cells) |
| CD-1 Mouse | RI-CT | ND | ND |
| | RI-EXT | 57.8 | 0.012 |
| | Midazolam* | 69.3 | 0.010 |
| Midazolam (0.2 µM) was used as the positive control. | | | |
| ND: Not determined because there was little/no consumption of compound, i.e. it has a very long half life. | | | |

SEQUENCE LISTING

```
<160> NUMBER OF SEQ ID NOS: 27

<210> SEQ ID NO 1
<211> LENGTH: 10
<212> TYPE: PRT
<213> ORGANISM: Artificial Sequence
<220> FEATURE:
<223> OTHER INFORMATION: Synthetic
<220> FEATURE:
<221> NAME/KEY: MOD_RES
<222> LOCATION: (4)..(4)
<223> OTHER INFORMATION: Xaa is Val, Leu, Phe, or Tyr
<220> FEATURE:
<221> NAME/KEY: MOD_RES
<222> LOCATION: (7)..(7)
<223> OTHER INFORMATION: Xaa is Leu, Ala, Ser, Cys, or Gly

<400> SEQUENCE: 1

Gly Gly Cys Xaa Leu Tyr Xaa Ala Glu Val
1               5                   10
```

```
<210> SEQ ID NO 2
<211> LENGTH: 15
<212> TYPE: PRT
<213> ORGANISM: Artificial Sequence
<220> FEATURE:
<223> OTHER INFORMATION: Synthetic
<220> FEATURE:
<221> NAME/KEY: MOD_RES
<222> LOCATION: (7)..(7)
<223> OTHER INFORMATION: Xaa is Val, Leu, Phe, or Tyr
<220> FEATURE:
<221> NAME/KEY: MOD_RES
<222> LOCATION: (10)..(10)
<223> OTHER INFORMATION: Xaa is Leu, Ala, Ser, Cys, or Gly
<220> FEATURE:
<221> NAME/KEY: MOD_RES
<222> LOCATION: (14)..(14)
<223> OTHER INFORMATION: Xaa is Leu or Gly
<220> FEATURE:
<221> NAME/KEY: MOD_RES
<222> LOCATION: (15)..(15)
<223> OTHER INFORMATION: Xaa is His or Gly

<400> SEQUENCE: 2

Gly Gly Arg Glu Gly Cys Xaa Leu Tyr Xaa Ala Glu Val Xaa Xaa
1               5                   10                  15

<210> SEQ ID NO 3
<211> LENGTH: 15
<212> TYPE: PRT
<213> ORGANISM: Artificial Sequence
<220> FEATURE:
<223> OTHER INFORMATION: Synthetic

<400> SEQUENCE: 3

Gly Gly Arg Glu Gly Cys Val Leu Tyr Leu Ala Glu Val Leu His
1               5                   10                  15

<210> SEQ ID NO 4
<211> LENGTH: 15
<212> TYPE: PRT
<213> ORGANISM: Artificial Sequence
<220> FEATURE:
<223> OTHER INFORMATION: Synthetic

<400> SEQUENCE: 4

Gly Gly Arg Glu Gly Cys Val Leu Tyr Leu Ala Glu Val Gly Gly
1               5                   10                  15

<210> SEQ ID NO 5
<211> LENGTH: 15
<212> TYPE: PRT
<213> ORGANISM: Artificial Sequence
<220> FEATURE:
<223> OTHER INFORMATION: Synthetic

<400> SEQUENCE: 5

Gly Gly Arg Glu Gly Cys Leu Leu Tyr Leu Ala Glu Val Gly Gly
1               5                   10                  15

<210> SEQ ID NO 6
<211> LENGTH: 15
<212> TYPE: PRT
<213> ORGANISM: Artificial Sequence
<220> FEATURE:
<223> OTHER INFORMATION: Synthetic

<400> SEQUENCE: 6

Gly Gly Arg Glu Gly Cys Phe Leu Tyr Leu Ala Glu Val Gly Gly
1               5                   10                  15
```

<210> SEQ ID NO 7
<211> LENGTH: 15
<212> TYPE: PRT
<213> ORGANISM: Artificial Sequence
<220> FEATURE:
<223> OTHER INFORMATION: Synthetic

<400> SEQUENCE: 7

Gly Gly Arg Glu Gly Cys Tyr Leu Tyr Leu Ala Glu Val Gly Gly
1               5                   10                  15

<210> SEQ ID NO 8
<211> LENGTH: 15
<212> TYPE: PRT
<213> ORGANISM: Artificial Sequence
<220> FEATURE:
<223> OTHER INFORMATION: Synthetic

<400> SEQUENCE: 8

Gly Gly Arg Glu Gly Cys Val Leu Tyr Ala Ala Glu Val Gly Gly
1               5                   10                  15

<210> SEQ ID NO 9
<211> LENGTH: 15
<212> TYPE: PRT
<213> ORGANISM: Artificial Sequence
<220> FEATURE:
<223> OTHER INFORMATION: Synthetic

<400> SEQUENCE: 9

Gly Gly Arg Glu Gly Cys Val Leu Tyr Ser Ala Glu Val Gly Gly
1               5                   10                  15

<210> SEQ ID NO 10
<211> LENGTH: 15
<212> TYPE: PRT
<213> ORGANISM: Artificial Sequence
<220> FEATURE:
<223> OTHER INFORMATION: Synthetic

<400> SEQUENCE: 10

Gly Gly Arg Glu Gly Cys Val Leu Tyr Cys Ala Glu Val Gly Gly
1               5                   10                  15

<210> SEQ ID NO 11
<211> LENGTH: 15
<212> TYPE: PRT
<213> ORGANISM: Artificial Sequence
<220> FEATURE:
<223> OTHER INFORMATION: Synthetic

<400> SEQUENCE: 11

Gly Gly Arg Glu Gly Cys Val Leu Tyr Gly Ala Glu Val Gly Gly
1               5                   10                  15

<210> SEQ ID NO 12
<211> LENGTH: 19
<212> TYPE: PRT
<213> ORGANISM: Artificial Sequence
<220> FEATURE:
<223> OTHER INFORMATION: Synthetic

<400> SEQUENCE: 12

Phe Phe Gly Gly Arg Glu Gly Cys Val Leu Tyr Leu Ala Glu Val Leu
1               5                   10                  15

```
His Ser Gly

<210> SEQ ID NO 13
<211> LENGTH: 19
<212> TYPE: PRT
<213> ORGANISM: Artificial Sequence
<220> FEATURE:
<223> OTHER INFORMATION: Synthetic

<400> SEQUENCE: 13

His Ser Gly Gly Arg Glu Gly Cys Val Leu Tyr Leu Ala Glu Val Gly
1               5                   10                  15

Gly Asp Phe

<210> SEQ ID NO 14
<211> LENGTH: 19
<212> TYPE: PRT
<213> ORGANISM: Artificial Sequence
<220> FEATURE:
<223> OTHER INFORMATION: Synthetic

<400> SEQUENCE: 14

Ser His Gly Gly Arg Glu Gly Cys Val Leu Tyr Leu Ala Glu Val Gly
1               5                   10                  15

Gly Phe Asp

<210> SEQ ID NO 15
<211> LENGTH: 19
<212> TYPE: PRT
<213> ORGANISM: Artificial Sequence
<220> FEATURE:
<223> OTHER INFORMATION: Synthetic

<400> SEQUENCE: 15

Arg Ser Gly Gly Arg Glu Gly Cys Val Leu Tyr Leu Ala Glu Val Gly
1               5                   10                  15

Gly Glu Ser

<210> SEQ ID NO 16
<211> LENGTH: 19
<212> TYPE: PRT
<213> ORGANISM: Artificial Sequence
<220> FEATURE:
<223> OTHER INFORMATION: Synthetic

<400> SEQUENCE: 16

Lys Ser Gly Gly Arg Glu Gly Cys Val Leu Tyr Leu Ala Glu Val Gly
1               5                   10                  15

Gly Ser Phe

<210> SEQ ID NO 17
<211> LENGTH: 270
<212> TYPE: PRT
<213> ORGANISM: Artificial Sequence
<220> FEATURE:
<223> OTHER INFORMATION: Synthetic

<400> SEQUENCE: 17

Met Ile Leu Asn Lys Ala Leu Met Leu Gly Ala Leu Ala Leu Thr Thr
1               5                   10                  15

Val Met Ser Pro Cys Gly Gly Glu Asp Ile Val Ala Asp His Val Ala
                20                  25                  30

Ser Tyr Gly Val Asn Leu Tyr Gln Ser Tyr Gly Pro Ser Gly Gln Tyr
```

```
                  35                  40                  45
Ser His Glu Phe Asp Gly Asp Glu Glu Phe Tyr Val Asp Leu Glu Arg
 50                  55                  60

Lys Glu Thr Val Trp Gln Leu Pro Leu Phe Arg Arg Phe Arg Arg Phe
65                  70                  75                  80

Asp Pro Gln Phe Ala Leu Thr Asn Ile Ala Val Leu Lys His Asn Leu
                 85                  90                  95

Asn Ile Val Ile Lys Arg Ser Asn Ser Thr Ala Ala Thr Asn Glu Val
                100                 105                 110

Pro Glu Val Thr Val Phe Ser Lys Ser Pro Val Thr Leu Gly Gln Pro
                115                 120                 125

Asn Thr Leu Ile Cys Leu Val Asp Asn Ile Phe Pro Pro Val Val Asn
130                 135                 140

Ile Thr Trp Leu Ser Asn Gly His Ser Val Thr Glu Gly Val Ser Glu
145                 150                 155                 160

Thr Ser Phe Leu Ser Lys Ser Asp His Ser Phe Phe Lys Ile Ser Tyr
                165                 170                 175

Leu Thr Phe Leu Pro Ser Ala Asp Glu Ile Tyr Asp Cys Lys Val Glu
                180                 185                 190

His Trp Gly Leu Asp Glu Pro Leu Leu Lys His Trp Glu Pro Glu Ile
                195                 200                 205

Pro Thr Pro Met Ser Glu Leu Thr Glu Asn Leu Tyr Phe Gln Gly
210                 215                 220

Val Asp Gly Gly Gly Leu Thr Asp Thr Leu Gln Ala Glu Thr Asp Gln
225                 230                 235                 240

Leu Glu Asp Glu Lys Ser Ala Leu Gln Thr Glu Ile Ala Asn Leu Leu
                245                 250                 255

Lys Glu Lys Glu Lys Leu Glu Phe Ile Leu Ala Ala His Arg
                260                 265                 270

<210> SEQ ID NO 18
<211> LENGTH: 281
<212> TYPE: PRT
<213> ORGANISM: Artificial Sequence
<220> FEATURE:
<223> OTHER INFORMATION: Synthetic

<400> SEQUENCE: 18

Met Ser Trp Lys Lys Ala Leu Arg Ile Pro Gly Gly Leu Arg Val Ala
1               5                   10                  15

Thr Val Thr Leu Met Leu Ala Met Leu Ser Thr Pro Val Ala Glu Gly
                20                  25                  30

Arg Asp Ser Pro Glu Asp Phe Val Tyr Gln Phe Lys Gly Met Cys Tyr
                35                  40                  45

Phe Thr Asn Gly Thr Glu Arg Val Arg Leu Val Thr Arg Tyr Ile Tyr
 50                  55                  60

Asn Arg Glu Glu Tyr Ala Arg Phe Asp Ser Asp Val Gly Val Tyr Arg
65                  70                  75                  80

Ala Val Thr Pro Leu Gly Pro Pro Ala Ala Glu Tyr Trp Asn Ser Gln
                 85                  90                  95

Lys Glu Val Leu Glu Arg Thr Arg Ala Glu Leu Asp Thr Val Cys Arg
                100                 105                 110

His Asn Tyr Gln Leu Glu Leu Arg Thr Thr Leu Gln Arg Arg Val Glu
                115                 120                 125

Pro Thr Val Thr Ile Ser Pro Ser Arg Thr Glu Ala Leu Asn His His
```

```
            130                 135                 140
Asn Leu Leu Val Cys Ser Val Thr Asp Phe Tyr Pro Ala Gln Ile Lys
145                 150                 155                 160

Val Arg Trp Phe Arg Asn Asp Gln Glu Glu Thr Thr Gly Val Val Ser
                165                 170                 175

Thr Pro Leu Ile Arg Asn Gly Asp Trp Thr Phe Gln Ile Leu Val Met
                180                 185                 190

Leu Glu Met Thr Pro Gln Arg Gly Asp Val Tyr Thr Cys His Val Glu
                195                 200                 205

His Pro Ser Leu Gln Asn Pro Ile Ile Val Glu Trp Arg Ala Gln Ser
                210                 215                 220

Glu Ser Ala Gln Ser Lys Glu Asn Leu Tyr Phe Gln Gly Val Asp Gly
225                 230                 235                 240

Gly Gly Arg Ile Ala Arg Leu Glu Asp Lys Val Lys Thr Leu Lys Ala
                245                 250                 255

Glu Asn Ala Gly Leu Ser Ser Thr Ala Gly Leu Leu Arg Glu Gln Val
                260                 265                 270

Ala Gln Leu Lys Gln Lys Val Met Asn
                275                 280

<210> SEQ ID NO 19
<211> LENGTH: 254
<212> TYPE: PRT
<213> ORGANISM: Artificial Sequence
<220> FEATURE:
<223> OTHER INFORMATION: Synthetic

<400> SEQUENCE: 19

Met Ile Leu Asn Lys Ala Leu Met Leu Gly Ala Leu Ala Leu Thr Thr
1               5                   10                  15

Val Met Ser Pro Cys Gly Gly Glu Asp Ile Val Ala Asp His Val Ala
                20                  25                  30

Ser Tyr Gly Val Asn Leu Tyr Gln Ser Tyr Gly Pro Ser Gly Gln Tyr
                35                  40                  45

Thr His Glu Phe Asp Gly Asp Glu Gln Phe Tyr Val Asp Leu Gly Arg
50                  55                  60

Lys Glu Thr Val Trp Cys Leu Pro Val Leu Arg Gln Phe Arg Phe Asp
65                  70                  75                  80

Pro Gln Phe Ala Leu Thr Asn Ile Ala Val Leu Lys His Asn Leu Asn
                85                  90                  95

Ser Leu Ile Lys Arg Ser Asn Ser Thr Ala Ala Thr Asn Glu Val Pro
                100                 105                 110

Glu Val Thr Val Phe Ser Lys Ser Pro Val Thr Leu Gly Gln Pro Asn
                115                 120                 125

Ile Leu Ile Cys Leu Val Asp Asn Ile Phe Pro Pro Val Val Asn Ile
                130                 135                 140

Thr Trp Leu Ser Asn Gly His Ser Val Thr Glu Gly Val Ser Glu Thr
145                 150                 155                 160

Ser Phe Leu Ser Lys Ser Asp His Ser Phe Phe Lys Ile Ser Tyr Leu
                165                 170                 175

Thr Leu Leu Pro Ser Ala Glu Glu Ser Tyr Asp Cys Lys Val Glu His
                180                 185                 190

Trp Gly Leu Asp Lys Pro Leu Leu Lys His Trp Glu Pro Glu Ile Pro
                195                 200                 205

Ala Pro Met Ser Glu Leu Thr Glu Thr Val Val Cys Ala Leu Gly Leu
```

```
                210                 215                 220
Ser Val Gly Leu Val Gly Ile Val Val Gly Thr Val Phe Ile Ile Arg
225                 230                 235                 240

Gly Leu Arg Ser Val Gly Ala Ser Arg His Gln Gly Pro Leu
                245                 250
```

<210> SEQ ID NO 20
<211> LENGTH: 15
<212> TYPE: PRT
<213> ORGANISM: Artificial Sequence
<220> FEATURE:
<223> OTHER INFORMATION: Synthetic

<400> SEQUENCE: 20

```
Ser His Leu Val Glu Ala Leu Tyr Leu Val Cys Gly Glu Arg Gly
1               5                   10                  15
```

<210> SEQ ID NO 21
<211> LENGTH: 270
<212> TYPE: PRT
<213> ORGANISM: Artificial Sequence
<220> FEATURE:
<223> OTHER INFORMATION: Synthetic

<400> SEQUENCE: 21

```
Met Ile Leu Asn Lys Ala Leu Met Leu Gly Ala Leu Ala Leu Thr Thr
1               5                   10                  15

Val Met Ser Pro Cys Gly Gly Glu Asp Ile Val Ala Asp His Val Ala
                20                  25                  30

Ser Tyr Gly Val Asn Leu Tyr Gln Ser Tyr Gly Pro Ser Gly Gln Tyr
            35                  40                  45

Ser His Glu Phe Asp Gly Asp Glu Glu Phe Tyr Val Asp Leu Glu Arg
        50                  55                  60

Lys Glu Thr Val Trp Gln Leu Pro Leu Phe Arg Arg Phe Arg Arg Phe
65                  70                  75                  80

Asp Pro Gln Phe Ala Leu Thr Asn Ile Ala Val Leu Lys His Asn Leu
                85                  90                  95

Asn Ile Val Ile Lys Arg Ser Asn Ser Thr Ala Ala Thr Asn Glu Val
            100                 105                 110

Pro Glu Val Thr Val Phe Ser Lys Ser Pro Val Thr Leu Gly Gln Pro
        115                 120                 125

Asn Thr Leu Ile Cys Leu Val Asp Asn Ile Phe Pro Pro Val Val Asn
    130                 135                 140

Ile Thr Trp Leu Ser Asn Gly His Ser Val Thr Glu Gly Val Ser Glu
145                 150                 155                 160

Thr Ser Phe Leu Ser Lys Ser Asp His Ser Phe Phe Lys Ile Ser Tyr
                165                 170                 175

Leu Thr Phe Leu Pro Ser Ala Asp Glu Ile Tyr Asp Cys Lys Val Glu
            180                 185                 190

His Trp Gly Leu Asp Glu Pro Leu Leu Lys His Trp Glu Pro Glu Ile
        195                 200                 205

Pro Thr Pro Met Ser Glu Leu Thr Glu Asn Leu Tyr Phe Gln Gly
    210                 215                 220

Val Asp Gly Gly Gly Leu Thr Asp Thr Leu Gln Ala Glu Thr Asp Gln
225                 230                 235                 240

Leu Glu Asp Glu Lys Ser Ala Leu Gln Thr Glu Ile Ala Asn Leu Leu
                245                 250                 255
```

```
        Lys Glu Lys Glu Lys Leu Glu Phe Ile Leu Ala Ala His Arg
                    260                 265                 270

<210> SEQ ID NO 22
<211> LENGTH: 281
<212> TYPE: PRT
<213> ORGANISM: Artificial Sequence
<220> FEATURE:
<223> OTHER INFORMATION: Synthetic

<400> SEQUENCE: 22

Met Ser Trp Lys Lys Ala Leu Arg Ile Pro Gly Gly Leu Arg Val Ala
1               5                   10                  15

Thr Val Thr Leu Met Leu Ala Met Leu Ser Thr Pro Val Ala Glu Gly
            20                  25                  30

Arg Asp Ser Pro Glu Asp Phe Val Tyr Gln Phe Lys Gly Met Cys Tyr
        35                  40                  45

Phe Thr Asn Gly Thr Glu Arg Val Arg Leu Val Thr Arg Tyr Ile Tyr
    50                  55                  60

Asn Arg Glu Glu Tyr Ala Arg Phe Asp Ser Asp Val Gly Val Tyr Arg
65                  70                  75                  80

Ala Val Thr Pro Leu Gly Pro Pro Ala Ala Glu Tyr Trp Asn Ser Gln
                85                  90                  95

Lys Glu Val Leu Glu Arg Thr Arg Ala Glu Leu Asp Thr Val Cys Arg
            100                 105                 110

His Asn Tyr Gln Leu Glu Leu Arg Thr Thr Leu Gln Arg Arg Val Glu
        115                 120                 125

Pro Thr Val Thr Ile Ser Pro Ser Arg Thr Glu Ala Leu Asn His His
    130                 135                 140

Asn Leu Leu Val Cys Ser Val Thr Asp Phe Tyr Pro Ala Gln Ile Lys
145                 150                 155                 160

Val Arg Trp Phe Arg Asn Asp Gln Glu Glu Thr Thr Gly Val Val Ser
                165                 170                 175

Thr Pro Leu Ile Arg Asn Gly Asp Trp Thr Phe Gln Ile Leu Val Met
            180                 185                 190

Leu Glu Met Thr Pro Gln Arg Gly Asp Val Tyr Thr Cys His Val Glu
        195                 200                 205

His Pro Ser Leu Gln Asn Pro Ile Ile Val Glu Trp Arg Ala Gln Ser
    210                 215                 220

Glu Ser Ala Gln Ser Lys Glu Asn Leu Tyr Phe Gln Gly Val Asp Gly
225                 230                 235                 240

Gly Gly Arg Ile Ala Arg Leu Glu Asp Lys Val Lys Thr Leu Lys Ala
                245                 250                 255

Glu Asn Ala Gly Leu Ser Ser Thr Ala Gly Leu Leu Arg Glu Gln Val
            260                 265                 270

Ala Gln Leu Lys Gln Lys Val Met Asn
        275                 280

<210> SEQ ID NO 23
<211> LENGTH: 25
<212> TYPE: DNA
<213> ORGANISM: Artificial Sequence
<220> FEATURE:
<223> OTHER INFORMATION: Synthetic

<400> SEQUENCE: 23
agggatcccc gcagaggatt tcgtg                                        25
```

<210> SEQ ID NO 24
<211> LENGTH: 28
<212> TYPE: DNA
<213> ORGANISM: Artificial Sequence
<220> FEATURE:
<223> OTHER INFORMATION: Synthetic

<400> SEQUENCE: 24
cacctgcagt gcggagctcc aactggta                                          28

<210> SEQ ID NO 25
<211> LENGTH: 261
<212> TYPE: PRT
<213> ORGANISM: Artificial Sequence
<220> FEATURE:
<223> OTHER INFORMATION: Synthetic

<400> SEQUENCE: 25

Met Ser Trp Lys Lys Ala Leu Arg Ile Pro Gly Gly Leu Arg Ala Ala
1               5                   10                  15

Thr Val Thr Leu Met Leu Ala Met Leu Ser Thr Pro Val Ala Glu Gly
            20                  25                  30

Arg Asp Ser Pro Glu Asp Phe Val Tyr Gln Phe Lys Ala Met Cys Tyr
        35                  40                  45

Phe Thr Asn Gly Thr Glu Arg Val Arg Tyr Val Thr Arg Tyr Ile Tyr
    50                  55                  60

Asn Arg Glu Glu Tyr Ala Arg Phe Asp Ser Asp Val Glu Val Tyr Arg
65                  70                  75                  80

Ala Val Thr Pro Leu Gly Pro Pro Asp Ala Glu Tyr Trp Asn Ser Gln
                85                  90                  95

Lys Glu Val Leu Glu Arg Thr Arg Ala Glu Leu Asp Thr Val Cys Arg
            100                 105                 110

His Asn Tyr Gln Leu Glu Leu Arg Thr Thr Leu Gln Arg Arg Val Glu
        115                 120                 125

Pro Thr Val Thr Ile Ser Pro Ser Arg Thr Glu Ala Leu Asn His His
    130                 135                 140

Asn Leu Leu Val Cys Ser Val Thr Asp Phe Tyr Pro Ala Gln Ile Lys
145                 150                 155                 160

Val Arg Trp Phe Arg Asn Asp Gln Glu Glu Thr Thr Gly Val Val Ser
                165                 170                 175

Thr Pro Leu Ile Arg Asn Gly Asp Trp Thr Phe Gln Ile Leu Val Met
            180                 185                 190

Leu Glu Met Thr Pro Gln His Gly Asp Val Tyr Thr Cys His Val Glu
        195                 200                 205

His Pro Ser Leu Gln Asn Pro Ile Thr Val Glu Trp Arg Ala Gln Ser
    210                 215                 220

Glu Ser Ala Gln Ser Lys Met Leu Ser Gly Ile Gly Gly Phe Val Leu
225                 230                 235                 240

Gly Leu Ile Phe Leu Gly Leu Gly Leu Ile Ile His His Arg Ser Gln
                245                 250                 255

Lys Gly Leu Leu His
            260

<210> SEQ ID NO 26
<211> LENGTH: 261
<212> TYPE: PRT
<213> ORGANISM: Artificial Sequence
<220> FEATURE:

<223> OTHER INFORMATION: Synthetic

<400> SEQUENCE: 26

Met Ser Trp Lys Lys Ala Leu Arg Ile Pro Gly Gly Leu Arg Ala Ala
1               5                   10                  15

Thr Val Thr Leu Met Leu Ala Met Leu Ser Thr Pro Val Ala Glu Gly
            20                  25                  30

Arg Asp Ser Pro Glu Asp Phe Val Tyr Gln Phe Lys Ala Met Cys Tyr
        35                  40                  45

Phe Thr Asn Gly Thr Glu Arg Val Arg Tyr Val Thr Arg Tyr Ile Tyr
    50                  55                  60

Asn Arg Glu Glu Tyr Ala Arg Phe Asp Ser Asp Val Glu Val Tyr Arg
65                  70                  75                  80

Ala Val Thr Pro Leu Gly Pro Pro Asp Ala Glu Tyr Trp Asn Ser Gln
                85                  90                  95

Lys Glu Val Leu Glu Arg Thr Arg Ala Glu Leu Asp Thr Val Cys Arg
            100                 105                 110

His Asn Tyr Gln Leu Glu Leu Arg Thr Thr Leu Gln Arg Arg Val Glu
        115                 120                 125

Pro Thr Val Thr Ile Ser Pro Ser Arg Thr Glu Ala Leu Asn His His
    130                 135                 140

Asn Leu Leu Val Cys Ser Val Thr Asp Phe Tyr Pro Ala Gln Ile Lys
145                 150                 155                 160

Val Arg Trp Phe Arg Asn Asp Gln Glu Glu Thr Thr Gly Val Val Ser
                165                 170                 175

Thr Pro Leu Ile Arg Asn Gly Asp Trp Thr Phe Gln Ile Leu Val Met
            180                 185                 190

Leu Glu Met Thr Pro Gln His Gly Asp Val Tyr Thr Cys His Val Glu
        195                 200                 205

His Pro Ser Leu Gln Asn Pro Ile Thr Val Glu Trp Arg Ala Gln Ser
    210                 215                 220

Glu Ser Ala Gln Ser Lys Met Leu Ser Gly Ile Gly Gly Phe Val Leu
225                 230                 235                 240

Gly Leu Ile Phe Leu Gly Leu Gly Leu Ile Ile His His Arg Ser Gln
                245                 250                 255

Lys Gly Leu Leu His
            260

<210> SEQ ID NO 27
<211> LENGTH: 15
<212> TYPE: PRT
<213> ORGANISM: Artificial Sequence
<220> FEATURE:
<223> OTHER INFORMATION: Synthetic

<400> SEQUENCE: 27

His Leu Val Glu Ala Leu Tyr Leu Val Cys Gly Glu Arg Gly Gly
1               5                   10                  15

PEPTIDES THAT BLOCK PRESENTATION OF ANTIGENIC ISLET PEPTIDES BY HLA-DQ8 AND METHODS FOR TREATING TYPE-1 DIABETES

CROSS-REFERENCE TO RELATED APPLICATIONS

This Application is a national stage filing under 35 U.S.C. 371 of International Patent Application Serial No. PCT/US2020/044911, filed Aug. 4, 2020, entitled "PEPTIDES THAT BLOCK PRESENTATION OF ANTIGENIC ISLET PEPTIDES BY HLA-DQ8 AND METHODS FOR TREATING TYPE-1 DIABETES", which claims the benefit, and priority under 35 U.S.C. § 119 (e), of U.S. Provisional Patent Application Ser. No. 62/883,062, filed Aug. 5, 2019, the entire contents of which applications are hereby incorporated herein by reference.

REFERENCE TO A SEQUENCE LISTING SUBMITTED AS A TEXT FILE VIA EFS-WEB

The instant application contains a Sequence Listing which has been submitted in ASCII format via EFS-Web and is hereby incorporated by reference in its entirety. Said ASCII copy, created on Feb. 4, 2022, is named I052670006US01-SEQ and is 22,406 bytes in size.

FIELD OF THE DISCLOSURE

The present disclosure relates to a peptide-based therapy for treating T1D. In particular, the present disclosure relates to peptides containing at least one D-amino acid that are capable of blocking the presentation of antigenic islet peptides (e.g., InsB:9-23) by HLA-DQ8, and to their uses, especially as it relates to the prevention and/or treatment of T1D.

BACKGROUND

Type I diabetes ("T1D") is one of the most common autoimmune endocrine disorders and is associated with significant morbidity and mortality in children and adults (1). Each year ~15,000 children are diagnosed with T1D in the United States alone. Moreover, the prevalence of T1D has been increasing by 2-4% per year in the last decades especially in children resulting in the doubling of the frequency of T1D every 2 decades (2, 3). These rapid trends are alarming and underscore the urgent need for newer therapies for T1D. T1D is characterized by the generation of islet-specific T-cells and autoantibodies, inflammatory infiltration of the islets, and beta cell destruction (4). The beta cell death that characterizes T1D leads to insulin deficiency and hyperglycemia that lead to long-term complications including neuropathy, retinopathy, nephropathy, and cardiovascular disease (5, 6).

FIG. 2 (FIG. 2) of the disclosure depicts a possible model of the T1D pathogenic autoimmune pathway leading to the destruction (e.g., apoptosis) of the pancreatic islet beta cells. The autoantigens which are thought to be involved in T1D autoimmune pathogenesis, such as InsB:9-23 and GAD65, relate to the secretory functions of the islet beta cells. Pancreatic beta cells are built to efficiently regulate insulin secretion in response to acute changes in metabolic demand, which can exceed the rate at which new insulin can be synthesized. To accommodate this demand, beta cells pre-synthesize insulin secretory granules that accumulate in the cytoplasm (i.e., the insulin storage pool). In this way, insulin may be immediately secreted in response to meals and other stimuli. It has been recognized that the majority of identified islet beta cell autoantigens are involved in the insulin secretory/storage pool pathway, including those antigens located in the insulin secretory granule itself, e.g., proinsulin InsB:9-23 and L-glutamic acid decarboxylase (GAD65).

As further depicted in FIG. 2, autoantigens (e.g., InsB:9-23 or "Islet Ag") escape the pancreatic islet cells and become presented on the surface of antigen presenting cells (e.g., dendritic cells) in association with HLA Class I or Class II proteins (e.g., a DQ8 Class II protein). Cytotoxic CD8+ T-cells can become stimulated through their interaction with the HLA Class I/antigen complex through its T-cell receptor to specifically target the destruction of islet beta cells. It is also thought that there may be a pathogenic association between the MHC Class II molecule DQ8 on APCs and the development of T1D.

Currently no curative therapeutic or prevention modalities exist for T1D to reverse or prevent the autoimmune destruction of the islets, and the disease can only be managed with insulin replacement therapy. While patients can achieve good glucose control on insulin therapy and a normal life expectancy if they maintain near normoglycemia, insulin treatment is challenging requiring multiple injections per day or the use of an insulin pump and multiple blood glucose measurements per day. Therefore, many patients have sub-optimal glycemic control resulting in complications, especially in teenage T1D patients, who often have uncontrolled diabetes due to non-adherence (7-9). Moreover, even when fully adherent to the treatment regimen, studies have shown that T1D patients often have sub-optimal glucose control, due to the fact that even the best insulin regimen cannot mimic endogenous secretion of insulin by the pancreatic β-cells (7). Therefore, novel therapies and prevention strategies are needed for T1D. Ideally, such therapeutic approaches should target the autoimmune response to the β-cells without causing systemic immunosuppression.

Such therapies, if developed, would significantly advance therapeutic approaches in relation to finding new and effective treatments for T1D. The present Application provides for such a solution.

SUMMARY

This disclosure pertains to HLA-DQ8 binding proteins for treating T1D. Binding proteins of the disclosure include, but are not limited to proteins, peptides, peptide chains, and/or polypeptides (all terms which are used interchangeably herein) capable of binding HLA-DQ8 (e.g., human HLA-DQ8). Further, this disclosure provides methods of making and using proteins (e.g., RI-EXT, RI-CT) that bind HLA-DQ8 (e.g., human HLA-DQ8) to treat T1D. In various embodiments, the peptides and/or polypeptides disclosed herein contain one or more D-amino acid residues and may be referred to as "D-amino acid" peptides and/or polypeptides. In various embodiments, the D-amino acid peptides and/or polypeptides disclosed herein contain four or more D-amino acid residues. In various embodiments, the D-amino acid peptides and/or polypeptides disclosed herein contain six or fewer more D-amino acid residues. In various embodiments, the D-amino acid peptides and/or polypeptides disclosed herein contain at least four, but no more than six D-amino acid residues.

Accordingly, in one aspect, the disclosure relates to a polypeptide comprising the amino acid sequence of SEQ ID NO: 1, wherein: $X_1$ is V, L, F, or Y; $X_2$ is L, A, S, C, or G; and wherein each amino acid of the amino acid sequence is a D-amino acid.

In another aspect, the disclosure relates to a polypeptide comprising the amino acid sequence of SEQ ID NO: 2, wherein: $X_1$ is V, L, F, or Y; $X_2$ is L, A, S, C, or G; $X_3$ is L or G; $X_4$ is H or G; and wherein each amino acid of the amino acid sequence is a D-amino acid.

In some embodiments, the polypeptides of SEQ ID NO: 1 or 2, further comprise one or more additional D-amino acid residues at the $NH_2$ terminus of the amino acid sequence. In some embodiments, the polypeptides of SEQ ID NO: 1 or 2, further comprise two additional D-amino acid residues at the $NH_2$ terminus of the amino acid sequence. In some embodiments, the polypeptides of SEQ ID NO: 1 or 2, further comprise two additional D-amino acid residues selected from the group consisting of FF (Phe-Phe), HS (His-Ser), SH (Ser-His), RS (Arg-Ser), and KS (Lys-Ser) at the $NH_2$ terminus of the amino acid sequence.

In some embodiments, the polypeptides contained herein further comprise one or more additional D-amino acid residues at the COOH terminus of the amino acid sequence. In some embodiments, the polypeptides contained herein further comprise two additional D-amino acid residues at the COOH terminus of the amino acid sequence. In some embodiments, the polypeptides contained herein further comprise two additional D-amino acid residues selected from the group consisting of SG (Ser-Gly), DF (Asp-Phe), FD (Phe-Asp), ES (Glu-Ser), and SF (Ser-Phe) at the COOH terminus of the amino acid sequence.

In some embodiments, the polypeptide comprises the amino acid sequence of any of SEQ ID NO: 3-16, wherein each amino acid of the amino acid sequence is a D-amino acid.

In some embodiments, the polypeptide specifically binds to an HLA-DQ8. In some embodiments, the HLA-DQ8 is comprised on a cell.

In some embodiments, the disclosure relates to a complex comprising, (i) any of the polypeptides described herein, and (ii) an HLA-DQ8. In some embodiments, the HLA-DQ8 of the complex is HLA-DQ8.1. In some embodiments, the HLA-DQ8 of the complex is HLA-DQ8.4. In some embodiments, the HLA-DQ8 of the complex is HLA-DQ8.5. In some embodiments, the HLA-DQ8 of the complex is HLA-DQA1*0301. In some embodiments, the HLA-DQ8 of the complex is HLA-DQA1*0302. In some embodiments, the HLA-DQ8 of the complex is HLA-DQB1*0302. In some embodiments, the HLA-DQ8 of the complex is HLA-DQB1*0304. In some embodiments, the HLA-DQ8 of the complex is HLA-DQB1*0305.

In some embodiments, the HLA-DQ8 of the complex is a human HLA-DQ8. In some embodiments, the HLA-DQ8 of the complex comprises an alpha chain that is at least 80%, 85%, 90%, 95%, 96%, 97%, 98%, 99%, 99.5%, or 99.9% identical to the amino acid sequence of SEQ ID NO: 17. In some embodiments, the HLA-DQ8 of the complex comprises an alpha chain comprising the amino acid sequence of SEQ ID NO: 19.

In some embodiments, the HLA-DQ8 of the complex comprises a beta chain that is at least 80%, 85%, 90%, 95%, 96%, 97%, 98%, 99%, 99.5%, or 99.9% identical to the amino acid sequence SEQ ID NO: 18. In some embodiments, the HLA-DQ8 of the complex comprises a beta chain comprising the amino acid sequence SEQ ID NO: 18.

In some embodiments, the HLA-DQ8 of the complex comprises an APC. In some embodiments, the APC is a professional APC. In some embodiments, the APC is a macrophage, dendritic cell, B-cell, or T-cell. In some embodiments, the APC is a macrophage. In some embodiments, the APC is a dendritic cell. In some embodiments, the APC is a B-cell. In some embodiments, the APC is a T-cell. In some embodiments, the APC expresses an MHC class II molecule. In some embodiments, the APC is human APC.

In some embodiments, the APC has a decreased ability to induce T-cell activation as compared to a second APC comprising HLA-DQ8 that is bound to InsB:9-23. In some embodiments, the APC has a 10%, 20%, 30%, 40%, 50%, 60%, 70%, 80%, 85%, 90%, 95%, 96%, 97%, 98%, 99%, 99.5%, or 99.9% decreased ability to induce T-cell activation as compared to a second APC.

In some embodiments, the APC has a decreased ability to induce T-cell activation in vivo. In some embodiments, the APC has a decreased ability to induce T-cell activation in vitro.

In some embodiments, the disclosure relates to a composition comprising any of the polypeptides of the disclosure and a pharmaceutically acceptable carrier. In some embodiments, the peptides and/or the compositions further comprise polyethylene glycol (PEG). The PEG may be complexed to the peptides and/or the compositions via a linker and a covalent bond. In other embodiments, the PEG may be complexed through non-covalent interactions (e.g., hydrogen bonds).

In some aspects, the disclosure relates to a method of inhibiting activation of a cytotoxic T-cell, the method comprising: contacting an APC with any of the polypeptides of the disclosure, wherein the APC comprises HLA-DQ8. In some embodiments, the method is performed in vitro. In some embodiments, the method is performed in vivo.

In some aspects, the disclosure relates to a method of treating a subject having, suspected of having, or at risk of having T1D, the treatment comprising administering to the subject any of the polypeptides of the disclosure, or the composition thereof.

In some embodiments, any of the polypeptides, complexes, compositions, or combinations thereof, is administered to a subject. In some embodiments, the polypeptide is administered to a subject. In some embodiments, the complex is administered to a subject. In some embodiments, the composition is administered to a subject. In some embodiments, the subject is human.

In some embodiments, the treatment is administered to the subject parenterally. In some embodiments, the treatment is administered to the subject non-parenterally.

In some embodiments, the treatment is administered at least once daily. In other embodiments, the treatment is administered at least twice daily. In still other embodiment, the treatment is administered three times daily. In yet other embodiments, the treatment is administered four times or more daily. In still other embodiments, the treatment is administered once, or twice, or three times, or four time, or more per week. In yet other embodiments, the treatment is administered once, or twice, or three times, or four time, or more per month. In still other embodiments, the treatment is administered once, or twice, or three times, or four time, or more per year.

In some aspects, the disclosure relates to a method of making an HLA-DQ8 inhibiting peptide, the method comprising: (a) identifying a peptide that binds to HLA-DQ8 in a subject; and (b) synthesizing a retro-inverso peptide of the peptide identified in step (a). In some embodiments, identifying a peptide comprises: (i) isolating APCs that express HLA-DQ8 from a subject; and (ii) obtaining the amino acid sequence of a peptide bound to the HLA-DQ8 of step (i).

BRIEF DESCRIPTION OF THE DRAWINGS

The following drawings form part of the present specification and are included to further demonstrate certain aspects of the present disclosure, which can be better understood by reference to one or more of these drawings in combination with the detailed description of specific embodiments presented herein.

FIGS. 3A-3D show in vitro screening results of the 14 D-peptides identified in the virtual screen. 14 D-peptides were predicted by the virtual screening to block the HLA-DQ8 pocket (FIG. 3A); the recombinant HLA-DQ8 protein used for the screening was tested using DELFIA immunoassay (FIG. 3B). Two (2) D-peptides inhibited InsB:9-23 binding to HLADQ8 more than 50% (FIG. 3C; numbers 1-14 (e.g., #1-#14) on the x-axis correspond to 1-14 as illustrated in FIG. 3A, shown as counting from 1 to 14 down the left-hand side of the figure) and both compounds showed a significant dose-dependent inhibition of the InsB:9-23 binding to HLADQ8 (FIG. 3D). Sequences is FIG. 3A correspond from top to bottom to SEQ ID NO: 27, 3-16.

DETAILED DESCRIPTION

Figure 1A:
FIGS. 1A-1B depict the global growing epidemic of T1D as described in Atkinson et al., Lancet, 2014.
Figure 1B:
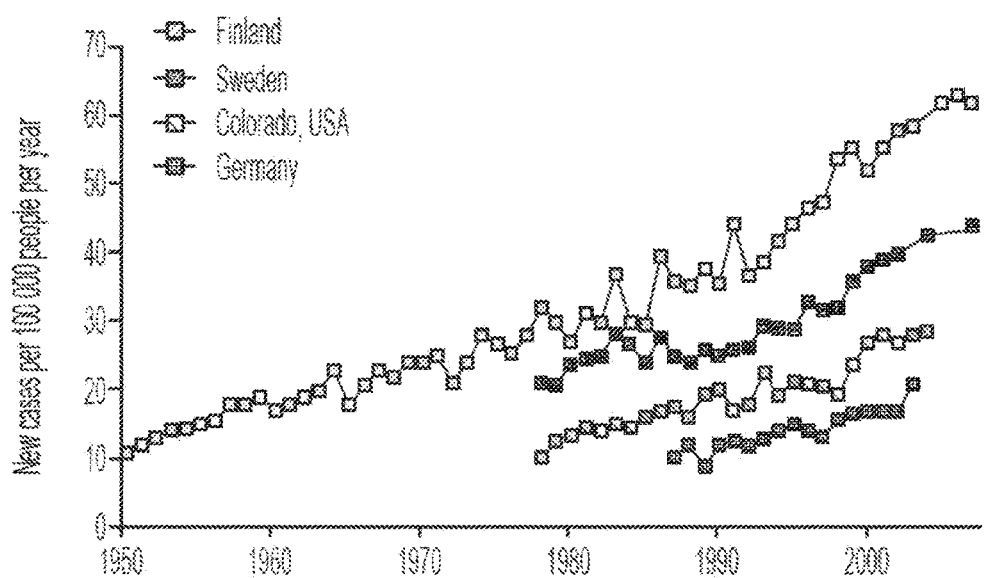
Figure 2:
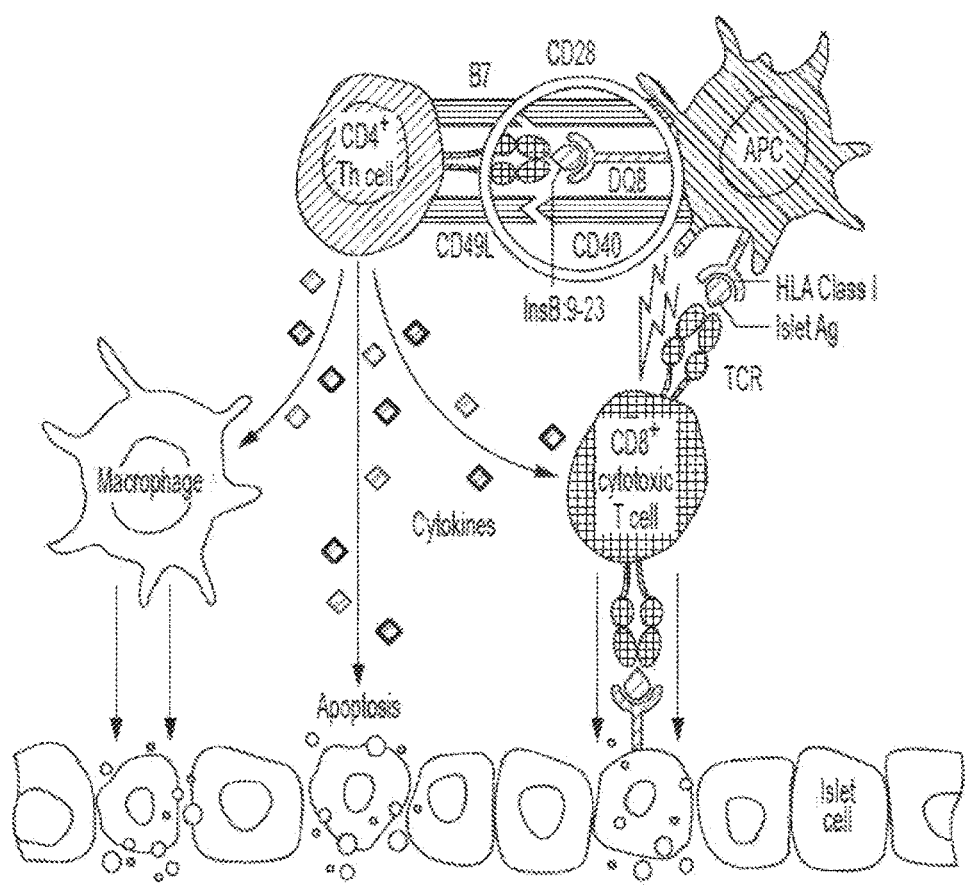
FIG. 2 depicts without being bound by theory the mechanism of autoimmune islet cell destruction in T1D and the general approach (red circle) of targeting the HLA-DQ8 molecule to block autoimmune destructive activity against islet cells.

This disclosure pertains to HLA-DQ8 binding proteins, and more particularly to polypeptides formed of D-amino acids to bind HLA-DQ8. Various aspects of the disclosure relate to peptides, complexes, and compositions thereof, as well as nucleic acids, recombinant expression vectors and host cells for making such polypeptides. Methods of using the polypeptides of the disclosure to modulate human HLA-DQ8 activities and/or levels, either in vitro or in vivo are also disclosed as well as treat HLA-DQ8 related disorders.

Without being bound by theory, the peptides and methods disclosed herein involve the association between peptides binding to the MHC Class II molecule DQ8 and the development of T1D. HLA-DQ8 has been shown to present antigenic islet peptides in a manner that drives activation of CD4+ T-cells in T1D patients. Specifically, the diabetogenic insulin peptide InsB:9-23 activates self-reactive CD4+ T-cells driving pancreatic beta cell destruction. The inventors have shown, it is believed for the first time, that rationally designed peptides (e.g., rationally designed D-peptides) can be used to interfere in the presentation of antigenic InsB:9-23, thereby preventing T-cell activation and subsequent beta-cell destruction. As a result, native insulin production can be preserved and in some instances can be restored and maintained.

It is shown herein that blocking the binding of InsB:9-23 to HLA-DQ8 can prevent the CD4+ T-cell activation in T1D needed to initiate and maintain the autoimmune response to the beta-cells. The D-amino acid based peptides (D-peptides) of the present disclosure can block T-cell activation by InsB:9-23 peptide presented within HLA-DQ8 pocket. An exemplary such peptide, D-peptide "RI-EXT," (SEQ ID NO: 12), blocks InsB:9-23 binding to HLA-DQ8 and its presentation to T-cells. RI-EXT inhibits binding of InsB:9-23 to recombinant HLA-DQ8 molecule, demonstrated with an ELISA assay, as well as its binding to DQ8 expressed on B-cells shown by flow cytometry. Functionally, RI-EXT inhibits T-cell activation in a mixed lymphocyte reaction containing human HLA-DQ8 cells loaded with InsB:9-23 peptide and murine T-cells expressing a human TCR specific for the InsB:9-23—DQ8 complex. Furthermore, RI-EXT significantly inhibits T-cell activation in transgenic DQ8 mice immunized with InsB:9-23 both ex vivo and in vivo, as shown by decreased production of pro-inflammatory cytokines IL-2 and IFN-γ and reduced T-cell proliferation by CFSE. Finally, RI-EXT significantly inhibits the ability of InsB:9-23 to stimulate T-cell activation in PBMCs from DQ8 positive T1D patients with recent onset disease. In summary, the polypeptides disclosed herein (e.g., D-peptides) block InsB:9-23 binding to HLA-DQ8 and its presentation to T-cells in T1D for the treatment of for autoimmune diseases (e.g., T1D).

Moreover, it has been shown herein the further reaching beneficial effects of RI-EXT and RI-CT at blocking a variety of T1D peptides from binding HLA-DQ8. This activity is shown to inhibit the activation of T-cell response.

DEFINITIONS

Unless otherwise defined herein, scientific and technical terms used in connection with the present disclosure shall have the meanings that are commonly understood by those of ordinary skill in the art. The meaning and scope of the terms are clear; however, in the event of any latent ambiguity, definitions provided herein take precedent over any dictionary or extrinsic definition. Further, unless otherwise required by context, singular terms shall include pluralities and plural terms shall include the singular. In this disclosure, the use of "or" means "and/or" unless stated otherwise. Furthermore, the use of the term "including," as well as other forms, such as "includes" and "included," is not limiting. Also, terms such as "element" or "component" encompass both elements and components comprising one unit and elements and components that comprise more than one subunit unless specifically stated otherwise.

Generally, nomenclatures used in connection with, and techniques of, cell and tissue culture, molecular biology, immunology, microbiology, genetics and protein and nucleic acid chemistry and hybridization described herein are those well-known and commonly used in the art. The methods and techniques of the present disclosure are generally performed according to conventional methods well known in the art and as described in various general and more specific references that are cited and discussed throughout the present disclosure unless otherwise indicated. Enzymatic reactions and purification techniques are performed according to manufacturer's specifications, as commonly accomplished in the art or as described herein. The nomenclatures used in connection with, and the laboratory procedures and techniques of, analytical chemistry, synthetic organic chemistry, and medicinal and pharmaceutical chemistry described herein are those well-known and commonly used in the art. Standard techniques are used for chemical syntheses, chemical analyses, pharmaceutical preparation, formulation, and delivery, and treatment of patients.

That the present disclosure may be more readily understood, select terms are defined below.

The term "agonist", as used herein, refers to a modulator that, when contacted with a molecule of interest, causes an increase in the magnitude of a certain activity or function of the molecule compared to the magnitude of the activity or function observed in the absence of the agonist.

The term "antagonist" or "inhibitor," as used herein, refer to a modulator that, when contacted with a molecule of interest causes a decrease in the magnitude of a certain activity or function of the molecule produced by the "agonist" compared to the magnitude of the activity or function observed in the absence of the antagonist. Particular antagonists of interest include those that block or modulate the biological or immunological activity of HLA-DQ8. Antagonists and inhibitors of HLA-DQ8 may include, but are not limited to, proteins (e.g., polypeptides), that bind to HLA-DQ8.

"Biological activity" or "activity" of a protein, as used herein, refers to all inherent biological properties of the protein.

As used herein, the term "effective amount" refers to the amount of a therapy which is sufficient to reduce or ameliorate the severity and/or duration of a disorder or one or more symptoms thereof, prevent the advancement of a disorder, cause regression of a disorder, prevent the recurrence, development, onset or progression of one or more symptoms associated with a disorder, detect a disorder, or enhance or improve the prophylactic or therapeutic effect(s) of another therapy (e.g., prophylactic or therapeutic agent). As one example, the disorder is T1D.

The term "GAD65," as may be used herein, refers to an isoform of Glutamate decarboxylase, also known generally as glutamic acid decarboxylase. It is generally known to be an enzyme that catalyzes the decarboxylation of glutamate to GABA and carbon dioxide ($CO_2$).

The term "HLA-DQ8" as used herein, refers to the Human Leukocyte Antigen of class II comprised of 2 polypeptide chains called the alpha and beta chains. An exemplary amino acid sequence of a human HLA-DQ8 is represented by SEQ ID NO: 21-22, with SEQ ID NO: 22 comprising the alpha chain and SEQ ID NO: 22 comprising the beta chain.

The term "isolated polynucleotide" as used herein shall mean a polynucleotide (e.g., of genomic, cDNA, or synthetic origin, or some combination thereof) that, by virtue of its origin, is not associated with all or a portion of a polynucleotide with which the "isolated polynucleotide" is found in nature; is operably linked to a polynucleotide that it is not linked to in nature; or does not occur in nature as part of a larger sequence.

The term "isolated protein" or "isolated polypeptide" is a protein or polypeptide that by virtue of its origin or source of derivation is not associated with naturally associated components that accompany it in its native state; is substantially free of other proteins from the same species; is expressed by a cell from a different species; or does not occur in nature. Thus, a polypeptide that is chemically synthesized or synthesized in a cellular system different from the cell from which it naturally originates will be "isolated" from its naturally associated components. A protein may also be rendered substantially free of naturally associated components by isolation, using protein purification techniques well known in the art.

As used herein, the term "neutralizing" refers to neutralization of the biological activity of a target protein when a binding protein specifically binds the target protein. In one embodiment, a neutralizing binding protein is a polypeptide as described herein, whose binding to HLA-DQ8 results in inhibition of a biological activity of HLA-DQ8. In another embodiment, the neutralizing binding protein binds HLA-DQ8 and reduces a biologically activity of HLA-DQ8 by at least about 10%, 20%, 40%, 60%, 80%, 85%, 90%, 95%, 96%, 97%, 98%, 99%, or more. Inhibition of a biological activity of HLA-DQ8 by a neutralizing binding protein (e.g., neutralizing peptide) can be assessed by measuring one or more indicators of the indication or disorder being treated (e.g., T1D) by any method known in the art.

The term "peptide" and/or "polypeptide" as used herein, refers to any polymeric chain of amino acids encompassing native or artificial proteins, protein fragments, and polypeptide analogs of a protein sequence. A peptide and/or polypeptide may be monomeric or polymeric. The terms "peptide," "polypeptide," and "protein" are used interchangeably with the term polypeptide and also refer to a polymeric chain of amino acids.

Reference to "D-amino acid peptides" (or similarly, "D-amino acid polypeptides") of the disclosure refers to peptides comprising at least one amino acid moiety or residue that is in the "D" isomeric chiral form. Every amino acid (except glycine) can occur in two isomeric forms because of the possibility of forming two different enantiomers (stereoisomers) around the central carbon atom (C-alpha). By convention, these are called L- and D-forms, analogous to left-handed and right-handed configurations. L-amino acids are manufactured in cells and incorporated into proteins. Some D-amino acids are found in the cell walls of bacteria, but not in human proteins. Glycine, the simplest amino acid, has no enantiomers because it has two hydrogen atoms attached to the C-alpha. Only when all four attachments are different can enantiomers occur.

In various embodiments, D-amino acid peptides may include those peptides in which 100% of its amino acid moieties are in the D isomeric configuration. In other embodiments, the D-amino acid peptides may include those peptides in which at least 95% or its amino acid moieties are in the D isomeric configuration. In still other embodiments, the D-amino acid peptides may include those peptides in which at least 90% or its amino acid moieties are in the D isomeric configuration. In yet other embodiments, the D-amino acid peptides may include those peptides in which at least 85% of its amino acid moieties are in the D isomeric configuration. In other embodiments, the D-amino acid peptides may include those peptides in which at least 80% of its amino acid moieties are in the D isomeric configuration. In yet other embodiments, the D-amino acid peptides may include those peptides in which at least 75% of its amino acid moieties are in the D isomeric configuration. In still other embodiments, the D-amino acid peptides may include those peptides in which at least 70% of its amino acid moieties are in the D isomeric configuration. In yet other embodiments, the D-amino acid peptides may include those peptides in which at least 65% of its amino acid moieties are in the D isomeric configuration. In other embodiments, the D-amino acid peptides may include those peptides in which at least 60% of its amino acid moieties are in the D isomeric configuration. In still other embodiments, the D-amino acid peptides may include those peptides in which at least 55% of its amino acid moieties are in the D isomeric configuration. In yet other embodiments, the D-amino acid peptides may include those peptides in which at least 50% of its amino acid moieties are in the D isomeric configuration. In other embodiments, the D-amino acid peptides may include those peptides in which at least 45% of its amino acid moieties are in the D isomeric configuration. In other embodiments, the D-amino acid peptides may include those peptides in which at least 40% of its amino acid moieties are in the D isomeric configuration. In yet other embodiments, the D-amino acid peptides may include those peptides in which at least 35% of its amino acid moieties are in the D isomeric configuration. In other embodiments, the D-amino acid peptides may include those peptides in which at least 30% of its amino acid moieties are in the D isomeric configuration. In other embodiments, the D-amino acid peptides may include those peptides in which at least 25% of its amino acid moieties are in the D isomeric configuration. In still other embodiments, the D-amino acid peptides may include those peptides in which at least 20% of its amino acid moieties are in the D isomeric configuration. In other embodiments, the D-amino acid peptides may include those peptides in which at least 15% of its amino acid moieties are in the D isomeric configuration. In still other embodiments, the D-amino acid peptides may include those peptides in which at least 10% of its amino acid moieties are in the D isomeric configuration. In other embodiments, the D-amino acid peptides may include those peptides in which at least 5% of its amino acid moieties are in the D isomeric configuration.

In certain contexts, and for specific known peptide lengths, for example, where the length of an effective peptides is 15-19 amino acids, the relative content of D-amino acid residues present in the entire peptide may be represented or described as a fraction. In such fractions, the numerator represents the number of D-amino acid residues and the denominator represents the total number of amino acid residues in the peptide. Thus, in some embodiments, the D-amino acid peptides may include those peptides in which at least 18/19 of its amino acid moieties are in the D isomeric configuration. In still other embodiments, the D-amino acid peptides may include those peptides in which at least 17/19 of its amino acid moieties are in the D isomeric configuration. In yet other embodiments, the D-amino acid peptides may include those peptides in which at least 16/19 of its amino acid moieties are in the D isomeric configuration. In other embodiments, the D-amino acid peptides may include those peptides in which at least 15/19 of its amino acid moieties are in the D isomeric configuration. In yet other embodiments, the D-amino acid peptides may include those peptides in which at least 14/19 of its amino acid moieties are in the D isomeric configuration. In still other embodiments, the D-amino acid peptides may include those peptides in which at least 13/19 of its amino acid moieties are in the D isomeric configuration. In yet other embodiments, the D-amino acid peptides may include those peptides in which at least 12/19 of its amino acid moieties are in the D isomeric configuration. In other embodiments, the D-amino acid peptides may include those peptides in which at least 11/19 of its amino acid moieties are in the D isomeric configuration. In still other embodiments, the D-amino acid peptides may include those peptides in which at least 10/19 of its amino acid moieties are in the D isomeric configuration. In yet other embodiments, the D-amino acid peptides may include those peptides in which at least 9/19 of its amino acid moieties are in the D isomeric configuration. In other embodiments, the D-amino acid peptides may include those peptides in which at least 8/19 of its amino acid moieties are in the D isomeric configuration. In other embodiments, the D-amino acid peptides may include those peptides in which at least 7/19 of its amino acid moieties are in the D isomeric configuration. In yet other embodiments, the D-amino acid peptides may include those peptides in which at least 6/19 of its amino acid moieties are in the D isomeric configuration. In other embodiments, the D-amino acid peptides may include those peptides in which at least 5/19 of its amino acid moieties are in the D isomeric configuration. In other embodiments, the D-amino acid peptides may include those peptides in which at least 4/19 of its amino acid moieties are in the D isomeric configuration. In still other embodiments, the D-amino acid peptides may include those peptides in which at least 3/19 of its amino acid moieties are in the D isomeric configuration. In other embodiments, the D-amino acid peptides may include those peptides in which at least 2/19 of its amino acid moieties are in the D isomeric configuration. In still other embodiments, the D-amino acid peptides may include those peptides in which at least 1/19 of its amino acid moieties are in the D isomeric configuration.

In yet other embodiments, the D-amino acid peptides may include those peptides in which at least one of its amino acid moieties is in the D isomeric configuration. In other embodiments, the D-amino acid peptides may include those peptides in which at least two of its amino acid moieties are in the D isomeric configuration. In still other embodiments, the D-amino acid peptides may include those peptides in which at least three of its amino acid moieties are in the D isomeric configuration. In yet other embodiments, the D-amino acid peptides may include those peptides in which at least four of its amino acid moieties are in the D isomeric configuration. In other embodiments, the D-amino acid peptides may include those peptides in which at least five of its amino acid moieties are in the D isomeric configuration. In still other embodiments, the D-amino acid peptides may include those peptides in which at least ten of its amino acid moieties are in the D isomeric configuration. In yet other embodiments, the D-amino acid peptides may include those peptides in which at least twenty of its amino acid moieties are in the D isomeric configuration. In other embodiments, the D-amino acid peptides may include those peptides in which at least thirty of its amino acid moieties are in the D isomeric configuration. In still other embodiments, the D-amino acid peptides may include those peptides in which at least forty of its amino acid moieties are in the D isomeric configuration. In other embodiments, the D-amino acid peptides may include those peptides in which at least fifty of its amino acid moieties are in the D isomeric configuration. In yet other embodiments, the D-amino acid peptides may include those peptides in which at least sixty of its amino acid moieties are in the D isomeric configuration. In still other embodiments, the D-amino acid peptides may include those peptides in which at least seventy of its amino acid moieties are in the D isomeric configuration. In yet other embodiments, the D-amino acid peptides may include those peptides in which at least eighty of its amino acid moieties are in the D isomeric configuration. In still other embodiments, the D-amino acid peptides may include those peptides in which at least ninety of its amino acid moieties are in the D isomeric configuration. In yet other embodiments, the D-amino acid peptides may include those peptides in which at least 100 or more of its amino acid moieties are in the D isomeric configuration.

In one aspect, it is recognized that the core of the native peptide that binds to DQ8 consists of a sequence of about 9 amino acids. This sequence confers the specificity of the peptide binding to DQ8 because the side chains of the peptide fit into the binding pockets in DQ8. It is well-recognized that in DQ8 pockets 1 and 9 are occupied by negatively charged residues, preferably E. Pocket 4 accommodates a hydrophobic aromatic residue, preferably Y or F and pocket 6 binds a hydrophobic aliphatic residue, e.g., V or L. Structural analysis shows that the other side chains do not fit into pockets in the DQ8, but rather present their side chains perpendicularly to the groove. They are believed to be instrumental in contributing to the activation of T-cell receptors. The flanking sequences on the N- and the C-termini add binding strength but are not believed to be part of the specificity of the peptide.

To preserve the binding of the core sequence into its selective binding pockets a convenient use of D-amino acid peptides includes "retro-inverso peptides." Retro-inverso peptides are designed by inverting the stereochemistry of the original amino acids from L- to D-amino acids. To preserve the binding of the side chains in their selectivity pockets the sequence has to reverse direction, hence the peptides are called retro-inverso. In addition to maintaining side chain topology the retro inverso peptides are more resistant to proteolytic degradation. Other reported synonyms for these peptides in the scientific literature are: Retro-Inverso Peptides, All-D-Retro Peptides, Retro-Enantio Peptides, Retro-Inverso Analogs, Retro-Inverso Analogues, Retro-Inverso Derivatives, and Retro-Inverso Isomers. D-amino acids represent conformational mirror images of natural L-amino acids occurring in natural proteins present in biological systems. The availability of modern chemical synthesis methods now allows the routine synthesis of these types of peptides.

The "percent identity" of two amino acid sequences is determined using the algorithm of Karlin and Altschul Proc. Natl. Acad. Sci. USA 87:2264-68, 1990, modified as in Karlin and Altschul Proc. Natl. Acad. Sci. USA 90:5873-77, 1993. Such an algorithm is incorporated into the NBLAST and XBLAST programs (version 2.0) of Altschul, et al. J. Mol. Biol. 215:403-10, 1990. BLAST protein searches can be performed with the XBLAST program, score=50, word length=3 to obtain amino acid sequences homologous to the protein molecules of interest. Where gaps exist between two sequences, Gapped BLAST can be utilized as described in Altschul et al., Nucleic Acids Res. 25(17):3389-3402, 1997. When utilizing BLAST and Gapped BLAST programs, the default parameters of the respective programs (e.g., XBLAST and NBLAST) can be used. BLAST nucleotide searches can be performed with the NBLAST nucleotide program parameters set, e.g., for score=100, wordlength=12 to obtain nucleotide sequences homologous to a nucleic acid molecule described herein. BLAST protein searches can be performed with the XBLAST program parameters set, e.g., to score 50, wordlength=3 to obtain amino acid sequences homologous to a protein molecule described herein. To obtain gapped alignments for comparison purposes, Gapped BLAST can be utilized as described in Altschul S F et al., (1997) Nuc Acids Res 25: 3389 3402. Alternatively, PSI BLAST can be used to perform an iterated search which detects distant relationships between molecules (Id.). When utilizing BLAST, Gapped BLAST, and PSI Blast programs, the default parameters of the respective programs (e.g., of XBLAST and NBLAST) can be used (see, e.g., National Center for Biotechnology Information (NCBI) on the worldwide web, ncbi.nlm.nih.gov). Another specific, non-limiting example of a mathematical algorithm utilized for the comparison of sequences is the algorithm of Myers and Miller, 1988, CABIOS 4:11 17. Such an algorithm is incorporated in the ALIGN program (version 2.0) which is part of the GCG sequence alignment software package. When utilizing the ALIGN program for comparing amino acid sequences, a PAM120 weight residue table, a gap length penalty of 12, and a gap penalty of 4 can be used. The percent identity between two sequences can be determined using techniques similar to those described above, with or without allowing gaps. In calculating percent identity, typically only exact matches are counted.

The term "polynucleotide" as referred to herein means a polymeric form of two or more nucleotides, either ribonucleotides or deoxynucleotides or a modified form of either type of nucleotide. The term includes single and double stranded forms of DNA, RNA, as well as other forms of nucleic acids (e.g., siRNA, mRNA, miRNA). This terms as used herein encompasses "peptides."

The term "regulate" and "modulate" are used interchangeably, and, as used herein, refers to a change or an alteration in the activity of a molecule of interest (e.g., the biological activity of HLA-DQ8). Modulation may be an increase or a decrease in the magnitude of a certain activity or function of the molecule of interest. Exemplary activities and functions of a molecule include, but are not limited to, binding characteristics, enzymatic activity, cell receptor activation, signal transduction, and cytokine release. Correspondingly, the term "modulator," as used herein, is a compound (e.g., a D-amino acid peptide) capable of changing or altering an activity or function of a molecule of interest (e.g., the biological activity of HLA-DQ8). For example, a modulator may cause an increase or decrease in the magnitude of a certain activity or function of a molecule compared to the magnitude of the activity or function observed in the absence of the modulator. In certain embodiments, a modulator is an inhibitor, which decreases the magnitude of at least one activity or function of a molecule. Exemplary inhibitors include, but are not limited to, proteins, peptides, antibodies, polypeptides, antibodies, carbohydrates, peptibodies, or small organic molecules. Peptibodies are described, e.g., in WO01/83525.

The term "T1D" refers to type 1 diabetes.

HLA-DQ8 Binding Peptides

Some aspects of the disclosure provide peptides and/or proteins that bind to HLA-DQ8. In some embodiments, HLA-DQ8 binding peptides and/or proteins provided herein bind specifically to HLA-DQ8 (e.g., human HLA-DQ8). HLA-DQ8 (DQ8) is a human leukocyte antigen class II serotype within the HLA-DQ (DQ) serotype group. DQ8 is a split antigen of the DQ3 broad antigen. DQ8 is determined by the antibody recognition of ($\beta^8$ and this generally detects the gene product of DQB1*0302. DQ8 is commonly linked to autoimmune disease in the human population. DQ8 is the second most predominant isoform linked to coeliac disease and the DQ most linked to T1D. In some embodiments, HLA-DQ8 binding peptides and/or proteins provided herein bind to (e.g., bind specifically to) HLA-DQ8 from human, mouse, rat, chicken, cattle, dog, sheep, Chinese hamster, pig-tailed macaque, Sumatran orangutan, nine-banded armadillo, gray short-tailed opossum, rhesus monkey, tropical clawed frog, domestic ferret, golden hamster, or white-tufted-ear marmoset. In some embodiments, HLA-DQ8 binding peptides and/or proteins provided herein bind to human HLA-DQ8. In some embodiments, HLA-DQ8 binding peptides and/or proteins provided herein specifically bind to human HLA-DQ8. In some embodiments, any of the HLA-DQ8 binding peptides and/or proteins provided herein bind to and/or specifically bind to human HLA-DQ8 having the amino acid sequence greater than 70%, (e.g., 80%, 85%, 90%, 95%, 96%, 97%, 98%, 99%, or more) identity of SEQ ID NO: 21 (alpha chain) and/or greater than 70%, (e.g., 80%, 85%, 90%, 95%, 96%, 97%, 98%, 99%, or more) identity of SEQ ID NO: 22 (beta chain). In some embodiments, any of the HLA-DQ8 binding peptides and/or proteins provided herein bind to and/or specifically bind to human HLA-DQ8 having the amino acid sequence of SEQ ID NO: 21 (alpha chain) and SEQ ID NO: 22 (beta chain).

Accordingly, in one aspect, the disclosure relates to a polypeptide comprising the amino acid sequence of SEQ ID NO: 1, wherein: $X_1$ is V, L, F, or Y; $X_2$ is L, A, S, C, or G; and wherein each amino acid of the amino acid sequence is a D-amino acid. Amino acids are the building blocks of the proteins which sustain biological function. They are well known in the art and generally defined as organic compounds containing amine (—$NH_2$) and carboxyl (—COOH) functional groups, along with a side chain (R group). Each amino acid has a specific side chain giving rise to its identity.

The primary elemental components of an amino acid are: carbon (C), hydrogen (H), oxygen (O), and nitrogen (N), other elements, however, may be contained in the side chains. There exist approximately 500 amino acids in nature, however only 20 are present in the human genetic code). After water, proteins, which are comprised of amino acids, form the largest component of human muscles and other tissues. Amino acids also play a crucial role in neurotransmitter transport and biosynthesis.

The primary amino acids are (their single letter abbreviation follows in parentheses): alanine (A); arginine (R); asparagine (N); aspartic acid (D); cysteine (C); glutamine (Q); glutamic acid (E); glycine (G); histidine (H); isoleucine (I); leucine (L); lysine (K); methionine (M); phenylalanine (F); proline (P); serine (S); threonine (T); tryptophan (W); tyrosine (Y); valine (V). The majority of amino acids occurring in nature and used in biological processes occur in the L-isomer form, which is a result of the central (e.g., alpha) carbon having chirality, which creates the possibility for the chemical structure to be represented in two formats (e.g., enantiomers) which are mirror images of one another. Glycine, having two hydrogens bound to the central carbon, only has one form. D-amino acids represent this mirror image. Thus, D-amino acids share the same chemical formula, and structure, but have a reversed chirality. Similar to proteins and peptides which are formed from L-amino acids, proteins peptides may be formed from D-amino acids. While used by some biological systems, D-amino acids, proteins, and peptides thereof, are not often or easily used by humans because our enzymes and cellular processes are adapted to the L-configurations.

Using D-amino acids, and especially peptides thereof, can be useful, however. The peptides exhibit properties which can be exploited for beneficial ends. For example, peptides of D-amino acids have been shown to be less immunogenic than foreign substances. Further, because peptides of D-amino acids are seldom used in our biological pathways, they are more stable and not readily degraded, leading to an increased half-life in vivo. Moreover, because recognition of a peptide isn't often done in toto (i.e., the entirety of the peptide or protein isn't required for recognition by its counterpart to effectuate binding or a reaction) peptides of D-amino acids can be useful where one particular part of a reaction is desired but another is not. For example, where binding to a first receptor triggers a binding process which then presents a corollary portion of the protein to another receptor, it can be envisioned that if the portion which binds to the first receptor is conserved, while the second is modified, the reaction can be inhibited. While not predictable, often portions of a peptide can be conserved through rearrangement of the component pieces. One such way is through the use of D-amino acids.

In some embodiments, the peptide is comprised of an amino acid sequence of SEQ ID NO: 1, wherein: $X_1$ is V, L, F, or Y; $X_2$ is L, A, S, C, or G; and wherein each amino acid of the amino acid sequence is a D-amino acid.

In another aspect, the disclosure relates to a polypeptide comprising the amino acid sequence of SEQ ID NO: 2, wherein: $X_1$ is V, L, F, or Y; $X_2$ is L, A, S, C, or G; $X_3$ is L or G; $X_4$ is H or G; and wherein each amino acid of the amino acid sequence is a D-amino acid.

In some embodiments, the polypeptides of SEQ ID NO: 1 or 2, further comprise one or more additional D-amino acid residues at the $NH_2$ terminus (N-terminus) of the amino acid sequence. In some embodiments, the polypeptide of SEQ ID NO: 1 further comprises additional two D-amino acid residues at the $NH_2$ terminus of the amino acid sequence. In some embodiments, the polypeptide of SEQ ID NO: 2 further comprises additional two D-amino acid residues at the NH$_2$ terminus of the amino acid sequence. In some embodiments, the polypeptide of SEQ ID NO: 1 further comprises two additional D-amino acid residues selected from the group consisting of FF, HS, SH, RS, and KS at the NH$_2$ terminus of the amino acid sequence. In some embodiments, the polypeptide of SEQ ID NO: 2 further comprises two additional D-amino acid residues selected from the group consisting of FF, HS, SH, RS, and KS at the NH$_2$ terminus of the amino acid sequence.

In some embodiments, the polypeptides contained herein further comprise one or more additional D-amino acid residues at the COOH terminus (C-terminus) of the amino acid sequence. In some embodiments, the polypeptides contained herein further comprise two additional D-amino acid residues selected from the group consisting of SG, DF, FD, ES, and SF at the COOH terminus of the amino acid sequence.

In some embodiments, the polypeptide comprises the amino acid sequence of any of SEQ ID NO: 3-16, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 3, wherein each amino acid of the amino acid sequence is a D-amino acid. In some embodiments, the polypeptide comprises the amino acid sequence of SEQ ID NO: 3, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 4, wherein each amino acid of the amino acid sequence is a D-amino acid. In some embodiments, the polypeptide comprises the amino acid sequence of SEQ ID NO: 4, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 5, wherein each amino acid of the amino acid sequence is a D-amino acid. In some embodiments, the polypeptide comprises the amino acid sequence of SEQ ID NO: 5, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 6, wherein each amino acid of the amino acid sequence is a D-amino acid. In some embodiments, the polypeptide comprises the amino acid sequence of SEQ ID NO: 6, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 7, wherein each amino acid of the amino acid sequence is a D-amino acid. In some embodiments, the polypeptide comprises the amino acid sequence of SEQ ID NO: 7, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 8, wherein each amino acid of the amino acid sequence is a D-amino acid. In some embodiments, the polypeptide comprises the amino acid sequence of SEQ ID NO: 8, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 9, wherein each amino acid of the amino acid sequence is a D-amino acid. In some embodiments, the polypeptide comprises the amino acid sequence of SEQ ID NO: 9, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 10, wherein each amino acid of the amino acid sequence is a D-amino acid. In some embodiments, the polypeptide comprises the amino acid sequence of SEQ ID NO: 10, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 11, wherein each amino acid of the amino acid sequence is a D-amino acid. In some embodiments, the polypeptide comprises the amino acid sequence of SEQ ID NO: 11, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 12, wherein each amino acid of the amino acid sequence is a D-amino acid. In some embodiments, the polypeptide comprises the amino acid sequence of SEQ ID NO: 12, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 13, wherein each amino acid of the amino acid sequence is a D-amino acid. In some embodiments, the polypeptide comprises the amino acid sequence of SEQ ID NO: 13, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 14, wherein each amino acid of the amino acid sequence is a D-amino acid. In some embodiments, the polypeptide comprises the amino acid sequence of SEQ ID NO: 14, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 15, wherein each amino acid of the amino acid sequence is a D-amino acid. In some embodiments, the polypeptide comprises the amino acid sequence of SEQ ID NO: 15, wherein each amino acid of the amino acid sequence is a D-amino acid. In some embodiments, the polypeptide comprises an amino acid sequence with greater than 70%, (e.g., 80%, 85%, 90%, 95%, 96%, 97%, 98%, 99%, or more) identity of the amino acid sequence of SEQ ID NO: 16, wherein each amino acid of the amino acid sequence is a D-amino acid. In some embodiments, the polypeptide comprises the amino acid sequence of SEQ ID NO: 16, wherein each amino acid of the amino acid sequence is a D-amino acid.

In some embodiments, the polypeptide comprises the amino acid sequence of any of SEQ ID NO: 3-16, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 3, wherein each amino acid of the amino acid sequence is a D-amino acid. In some embodiments, the polypeptide comprises the amino acid sequence of SEQ ID NO: 3, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 4, wherein each amino acid of the amino acid sequence is a D-amino acid. In some embodiments, the polypeptide comprises the amino acid sequence of SEQ ID NO: 4, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 5, wherein each amino acid of the amino acid sequence is a D-amino acid. In some embodiments, the polypeptide comprises the amino acid sequence of SEQ ID NO: 5, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 6, wherein each amino acid of the amino acid sequence is a D-amino acid. In some embodiments, the polypeptide comprises the amino acid sequence of SEQ ID NO: 6, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 7, wherein each amino acid of the amino acid sequence is a D-amino acid. In some embodiments, the polypeptide comprises the amino acid sequence of SEQ ID NO: 7, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 8, wherein each amino acid of the amino acid sequence is a D-amino acid. In some embodiments, the polypeptide comprises the amino acid sequence of SEQ ID NO: 8, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 9, wherein each amino acid of the amino acid sequence is a D-amino acid. In some embodiments, the polypeptide comprises the amino acid sequence of SEQ ID NO: 9, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 10, wherein each amino acid of the amino acid sequence is a D-amino acid. In some embodiments, the polypeptide comprises the amino acid sequence of SEQ ID NO: 10, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 11, wherein each amino acid of the amino acid sequence is a D-amino acid. In some embodiments, the polypeptide comprises the amino acid sequence of SEQ ID NO: 11, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 12, wherein each amino acid of the amino acid sequence is a D-amino acid. In some embodiments, the polypeptide comprises the amino acid sequence of SEQ ID NO: 12, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 13, wherein each amino acid of the amino acid sequence is a D-amino acid. In some embodiments, the polypeptide comprises the amino acid sequence of SEQ ID NO: 13, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 14, wherein each amino acid of the amino acid sequence is a D-amino acid. In some embodiments, the polypeptide comprises the amino acid sequence of SEQ ID NO: 14, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 15, wherein each amino acid of the amino acid sequence is a D-amino acid. In some embodiments, the polypeptide comprises the amino acid sequence of SEQ ID NO: 15, wherein each amino acid of the amino acid sequence is a D-amino acid. In some embodiments, the polypeptide comprises an amino acid sequence with greater than 13/19, (e.g., 14/19, 15/19, 16/19, 17/19 or 18/19) identity of the amino acid sequence of SEQ ID NO: 16, wherein each amino acid of the amino acid sequence is a D-amino acid. In some embodiments, the polypeptide comprises the amino acid sequence of SEQ ID NO: 16, wherein each amino acid of the amino acid sequence is a D-amino acid.

In some embodiments, the polypeptide specifically binds to an HLA-DQ8. In some embodiments, the HLA-DQ8 is comprised on a cell.

In some embodiments, the disclosure relates to a complex comprising, (i) any of the polypeptide described herein, and (ii) an HLA-DQ8. HLA-DQ8 is an serotype within the DQ serotype group of human leukocyte antigens. It is a split antigen of the DQ3 broad antigen group, and has a variety of serotype sub-types. In some embodiments, the HLA-DQ8 of the complex is a sub-type of HLA-DQ8. In some embodiments, the HLA-DQ8 of the complex is HLA-DQ8.1. In some embodiments, the HLA-DQ8 of the complex is HLA-DQ8.4. In some embodiments, the HLA-DQ8 of the complex is HLA-DQ8.5. In some embodiments, the HLA-DQ8 of the complex is HLA-DQA1*0301. In some embodiments, the HLA-DQ8 of the complex is HLA-DQA1*0302. In some embodiments, the HLA-DQ8 of the complex is HLA-DQB1*0302. In some embodiments, the HLA-DQ8 of the complex is HLA-DQB1*0304. In some embodiments, the HLA-DQ8 of the complex is HLA-DQB1*0305.

In some embodiments, the HLA-DQ8 of the complex is a human HLA-DQ8. In some embodiments, the HLA-DQ8 of the complex comprises an alpha chain. In some embodiments, the alpha chain is a native human HLA-DQ8 alpha chain. In some embodiments, the HLA-DQ8 of the complex comprises an alpha chain that is at least 80%, 85%, 90%, 95%, 96%, 97%, 98%, 99%, 99.5%, or 99.9% identical to a native human HLA-DQ8 alpha chain. In some embodiments, the HLA-DQ8 of the complex comprises an alpha chain that is at least 80%, 85%, 90%, 95%, 96%, 97%, 98%, 99%, 99.5%, or 99.9% identical to the amino acid sequence of SEQ ID NO: 17. In some embodiments, the HLA-DQ8 of the complex comprises an alpha chain comprising the amino acid sequence of SEQ ID NO: 19.

In some embodiments, the HLA-DQ8 of the complex comprises an beta chain. In some embodiments, the beta chain is a native human HLA-DQ8 beta chain. In some embodiments, the HLA-DQ8 of the complex comprises an beta chain that is at least 80%, 85%, 90%, 95%, 96%, 97%, 98%, 99%, 99.5%, or 99.9% identical to a native human HLA-DQ8 beta chain. In some embodiments, the HLA-DQ8 of the complex comprises a beta chain that is at least 80%, 85%, 90%, 95%, 96%, 97%, 98%, 99%, 99.5%, or 99.9% identical to the amino acid sequence SEQ ID NO: 18. In some embodiments, the HLA-DQ8 of the complex comprises a beta chain comprising the amino acid sequence SEQ ID NO: 18.

In some embodiments, the HLA-DQ8 of the complex comprises an APC. APCs are cells of the immune system that display antigens (e.g., structures or substances which can be recognized by a TCR) complexed with MHCs on their surface. APCs present these complexes to the TCR on T-cells as part of the immune response. Professional APCs present their antigens to helper T-cells (e.g., CD4$^+$ cells) and include macrophages, B-cells, and dendritic cells. In some embodiments, the APC is a professional APC. In some embodiments, the APC is a macrophage, dendritic cell, B-cell, or T-cell. In some embodiments, the APC is a macrophage. In some embodiments, the APC is a dendritic cell. In some embodiments, the APC is a B-cell. In some embodiments, the APC is a T-cell. In some embodiments, the APC expresses an MHC class II molecule. In some embodiments, the APC is human APC.

In some embodiments, the APC has a decreased ability to induce T-cell activation as compared to a second APC comprising HLA-DQ8 that is bound to InsB:9-23. In some embodiments, the APC has a 10%, 20%, 30%, 40%, 50%, 60%, 70%, 80%, 85%, 90%, 95%, 96%, 97%, 98%, 99%, 99.5%, or 99.9% decreased ability to induce T-cell activation as compared to a second APC.

In some embodiments, the APC has a decreased ability to induce T-cell activation in vivo. In some embodiments, the APC has a decreased ability to induce T-cell activation in vitro.

In some embodiments, the disclosure relates to a composition comprising any of the polypeptides of the disclosure and a pharmaceutically acceptable carrier.

In some aspects, the disclosure relates to a method of inhibiting activation of a cytotoxic T-cell, the method comprising: contacting an APC with any of the polypeptides of the disclosure, wherein the APC comprises HLA-DQ8. In some embodiments, the method is performed in vitro. In some embodiments, the method is performed in vivo.

In some aspects, the disclosure relates to a method of making an HLA-DQ8 inhibiting peptide, the method comprising, (a) identifying a peptide that binds to HLA-DQ8 in a subject, (b) synthesizing a retro-inverso peptide of the peptide identified in (a), (c) optimizing its flanking sequences, and (d) optimizing the sequence of D-amino acids to improve potency. In some embodiments, identifying a peptide comprises, (i) isolating APCs that express HLA-DQ8 from a subject, and (ii) obtaining the amino acid sequence of a peptide bound to the HLA-DQ8 of (i).

Some aspects of the disclosure relate to a peptide and/or polypeptide (i.e., as used herein, reference to "polypeptide" may encompass "peptide") comprising an amino acid sequence that is at least 70% (e.g., 80%, 85%, 90%, 95%, 98%, 99%, or more) identical to any one of the amino acid sequences set forth in SEQ ID NO: 1-16. In some embodiments, the polypeptide comprises an amino acid sequence that is at least 70% (e.g., 80%, 85%, 90%, 95%, 98%, 99%, or more) identical to SEQ ID NO: 1. In some embodiments, the polypeptide comprises an amino acid sequence that is at least 70% (e.g., 80%, 85%, 90%, 95%, 98%, 99%, or more) identical to SEQ ID NO: 2. In some embodiments, the polypeptide comprises an amino acid sequence that is at least 70% (e.g., 80%, 85%, 90%, 95%, 98%, 99%, or more) identical to SEQ ID NO: 3. In some embodiments, the polypeptide comprises an amino acid sequence that is at least 70% (e.g., 80%, 85%, 90%, 95%, 98%, 99%, or more) identical to SEQ ID NO: 4. In some embodiments, the polypeptide comprises an amino acid sequence that is at least 70% (e.g., 80%, 85%, 90%, 95%, 98%, 99%, or more) identical to SEQ ID NO: 5. In some embodiments, the polypeptide comprises an amino acid sequence that is at least 70% (e.g., 80%, 85%, 90%, 95%, 98%, 99%, or more) identical to SEQ ID NO: 6. In some embodiments, the polypeptide comprises an amino acid sequence that is at least 70% (e.g., 80%, 85%, 90%, 95%, 98%, 99%, or more) identical to SEQ ID NO: 7. In some embodiments, the polypeptide comprises an amino acid sequence that is at least 70% (e.g., 80%, 85%, 90%, 95%, 98%, 99%, or more) identical to SEQ ID NO: 8. In some embodiments, the polypeptide comprises an amino acid sequence that is at least 70% (e.g., 80%, 85%, 90%, 95%, 98%, 99%, or more) identical to SEQ ID NO: 9. In some embodiments, the polypeptide comprises an amino acid sequence that is at least 70% (e.g., 80%, 85%, 90%, 95%, 98%, 99%, or more) identical to SEQ ID NO: 10. In some embodiments, the polypeptide comprises an amino acid sequence that is at least 70% (e.g., 80%, 85%, 90%, 95%, 98%, 99%, or more) identical to SEQ ID NO: 11. In some embodiments, the polypeptide comprises an amino acid sequence that is at least 70% (e.g., 80%, 85%, 90%, 95%, 98%, 99%, or more) identical to SEQ ID NO: 12. In some embodiments, the polypeptide comprises an amino acid sequence that is at least 70% (e.g., 80%, 85%, 90%, 95%, 98%, 99%, or more) identical to SEQ ID NO: 13. In some embodiments, the polypeptide comprises an amino acid sequence that is at least 70% (e.g., 80%, 85%, 90%, 95%, 98%, 99%, or more) identical to SEQ ID NO: 14. In some embodiments, the polypeptide comprises an amino acid sequence that is at least 70% (e.g., 80%, 85%, 90%, 95%, 98%, 99%, or more) identical to SEQ ID NO: 15. In some embodiments, the polypeptide comprises an amino acid sequence that is at least 70% (e.g., 80%, 85%, 90%, 95%, 98%, 99%, or more) identical to SEQ ID NO: 16.

Some aspects of the disclosure relate to a peptide and/or polypeptide (i.e., as used herein, reference to "polypeptide" may encompass "peptide") comprising an amino acid sequence that is at least 7/10, (e.g., 7/10, 8/10, 9/10, or 10/10) identical to any one of the amino acid sequences set forth in SEQ ID NO: 1.

Some aspects of the disclosure relate to a peptide and/or polypeptide (i.e., as used herein, reference to "polypeptide" may encompass "peptide") comprising an amino acid sequence that is at least 11/15 amino acids, (e.g., 11/15, 12/15, 13/15, 14/15, or 15/15 amino acids) identical to any one of the amino acid sequences set forth in SEQ ID NO: 2-11. In some embodiments, the polypeptide comprises an amino acid sequence that is at least 11/15 amino acids, (e.g., 11/15, 12/15, 13/15, 14/15, or 15/15 amino acids) identical to SEQ ID NO: 2. In some embodiments, the polypeptide comprises an amino acid sequence that is at least 11/15 amino acids, (e.g., 11/15, 12/15, 13/15, 14/15, or 15/15 amino acids) identical to SEQ ID NO: 3. In some embodiments, the polypeptide comprises an amino acid sequence that is at least 11/15 amino acids, (e.g., 11/15, 12/15, 13/15, 14/15, or 15/15 amino acids) identical to SEQ ID NO: 4. In some embodiments, the polypeptide comprises an amino acid sequence that is at least 11/15 amino acids, (e.g., 11/15, 12/15, 13/15, 14/15, or 15/15 amino acids) identical to SEQ ID NO: 5. In some embodiments, the polypeptide comprises an amino acid sequence that is at least 11/15 amino acids, (e.g., 11/15, 12/15, 13/15, 14/15, or 15/15 amino acids) identical to SEQ ID NO: 6. In some embodiments, the polypeptide comprises an amino acid sequence that is at least 11/15 amino acids, (e.g., 11/15, 12/15, 13/15, 14/15, or 15/15 amino acids) identical to SEQ ID NO: 7. In some embodiments, the polypeptide comprises an amino acid sequence that is at least 11/15 amino acids, (e.g., 11/15, 12/15, 13/15, 14/15, or 15/15 amino acids) identical to SEQ ID NO: 8. In some embodiments, the polypeptide comprises an amino acid sequence that is at least 11/15 amino acids, (e.g., 11/15, 12/15, 13/15, 14/15, or 15/15 amino acids) identical to SEQ ID NO: 9. In some embodiments, the polypeptide comprises an amino acid sequence that is at least 11/15 amino acids, (e.g., 11/15, 12/15, 13/15, 14/15, or 15/15 amino acids) identical to SEQ ID NO: 10. In some embodiments, the polypeptide comprises an amino acid sequence that is at least 11/15 amino acids, (e.g., 11/15, 12/15, 13/15, 14/15, or 15/15 amino acids) identical to SEQ ID NO: 11.

Some aspects of the disclosure relate to a peptide and/or polypeptide (i.e., as used herein, reference to "polypeptide" may encompass "peptide") comprising an amino acid sequence that is at least 13/19 amino acids, (e.g., 14/19, 15/19, 16/19, 17/19 or 18/19 amino acids) identical to any one of the amino acid sequences set forth in SEQ ID NO: 12-16. In some embodiments, the polypeptide comprises an amino acid sequence that is at least 13/19 amino acids, (e.g., 14/19, 15/19, 16/19, 17/19 or 18/19 amino acids)) identical to SEQ ID NO: 12. In some embodiments, the polypeptide comprises an amino acid sequence that is at least 13/19 amino acids, (e.g., 14/19, 15/19, 16/19, 17/19 or 18/19 amino acids) identical to SEQ ID NO: 13. In some embodiments, the polypeptide comprises an amino acid sequence that is at least 13/19 amino acids, (e.g., 14/19, 15/19, 16/19, 17/19 or 18/19 amino acids) identical to SEQ ID NO: 14. In some embodiments, the polypeptide comprises an amino acid sequence that is at least 13/19 amino acids, (e.g., 14/19, 15/19, 16/19, 17/19 or 18/19 amino acids) identical to SEQ ID NO: 15. In some embodiments, the polypeptide comprises an amino acid sequence that is at least 13/19 amino acids, (e.g., 14/19, 15/19, 16/19, 17/19 or 18/19 amino acids) identical to SEQ ID NO: 16.

In various embodiments, the D-amino acid peptides and/or polypeptides disclosed herein contain four or more D-amino acid residues. In various embodiments, the D-amino acid peptides and/or polypeptides disclosed herein contain six or fewer more D-amino acid residues. In various embodiments, the D-amino acid peptides and/or polypeptides disclosed herein contain at least four, but no more than six D-amino acid residues.

Design of HLA-DQ8 Binding Peptides

Numerous suitable methods may be used to design HLA-DQ8 binding peptides for use in the present invention. One such method follows the steps of: 1) design of the initial D-peptide—retro-inverso-peptide; 2) optimization of the length of the D-peptide (e.g., 15, 16, 17, 18, 19, or 20 amino acids); and 3) optimization of the sequence of the D-peptide.

Design of Initial D-Peptide

One such way to design the initial D-peptide is to adopt a sequence of a known L-amino acid peptide that binds to DQ8 or an L-amino acid peptide predicted by a molecular dynamic (MD) simulation method (described in detail below) to bind to DQ8 and then create the retro-inverso (RI) peptide from that starting point L-amino acid peptide. The creation of a D-amino acid can be accomplished by switching the positions of the NH and the CO groups, while keeping the $H_\alpha$ and the side chain in their original position. This switch applied to the entire sequence creates an RI peptide in which the stereochemistry of each amino acid is inverted from L to D with the amino acid sequence now running in the opposite direction. This construct preserves the specificity of the interaction between the peptide and the HLA-DQ8 because the side chains can still bind in their respective pockets. Since the peptide now runs in the opposite sequence direction, the H-bonds with the peptide backbone have to adjust. For example, the sequence of the Insulin B:9-23 is:

(SEQ ID NO: 27)
InsB:9-23 $NH_3^+$-HLVE$_1$ALY$_4$LVCGE$_9$RGG-COO$^-$

However, the corresponding RI peptide is:

(SEQ ID NO: 3)
RI-INS $NH_3^+$-GGREGCVLYLAEVLH-COO$^-$

The resulting peptide is then tested experimentally to assess potency.

Optimization of Length

Further, it is known the necessary length of the core that binds to the DQ8 is about 9 amino acid residues, but the optimal length of the peptide as a whole may vary from about 15 to about 30 amino acid residues. The sequence of the flanking residues on either end of the core region depends on the specific MHC and is difficult to predict a priori. Consequently, a series of peptides is designed with extended sequences and the peptides are tested experimentally to determine the optimal extended sequence, e.g., the most potent sequence (e.g., peptides disclosed herein).

Optimization of Sequence

Optimization may be based on the use of a computational technique that consists of two stages: In stage 1 a molecular dynamic (MD) simulation of the system DQ8 RI peptide in a solvated periodic box may be performed. The trajectory may be used to perform a MM/G(P)BSA analysis to determine the contributions of each peptide residue to the peptide-MHC interaction as well as the total binding energy. The contribution of each residue is used to design a systematic search for improvement. The contributions are displayed below (Table 1R):

TABLE 1R

| Interaction energies per residue of InsEXT (in Kcal/mol). | | | | | | | | | | | | | | | | | | |
|---|---|---|---|---|---|---|---|---|---|---|---|---|---|---|---|---|---|---|
| 1F1 | 0F2 | G3 | G4 | R5 | E6 | G7 | C8 | V9 | L10 | Y11 | L12 | A13 | E14 | V15 | L16 | H17 | S18 | G19 |
| 9-4.3 | −4.1 | −2.2 | −2.5 | −13.2 | −35.7 | −7.5 | −8.7 | −11.5 | −6.9 | −20.2 | −7.2 | −4.3 | −7.1 | −5.0 | −5.3 | −1.9 | −1.8 | −5.0 |

The principle of the approach assumes that it is more difficult to improve the interaction of residues with strong contributions than those that interact weakly. For example, inspection of Table 1R shows that in the core region (6-14), the weakest binding residue is A13.

Interaction energies may then be calculated for all the 19 possible substitutions. For example all 19 possible substitutions of A13 from MD simulations yield the following ranking of the total interaction energies (Table 2R).

TABLE 2R

| Total Interaction energies of mutants of InsEXT with DQ8 | |
|---|---|
| RA13 | Int E |
| G | −128.743 |
| F | −122.806 |
| N | −119.293 |
| L | −115.115 |
| P | −114.298 |
| MV | −112.107 |
| R | −108.742 |
| YQ | −108.114 |
| VH | −107.895 |
| HE | −107.255 |
| QC | −107.161 |
| S | −106.854 |
| A (original) | −104.005 |
| CM | −103.971 |
| ET | −103.815 |
| TI | −100.484 |
| IY | −100.35 |
| D | −97.3141 |
| W | −86.9873 |
| K | −86.3314 |

Twelve peptides have better interactions than the original peptide and six are in the top category considered significant (G, F, N, L, P, V). The peptides with these substitutions may then be tested experimentally to identify which of them has the highest potency.

The analysis of interaction energies per residue may be repeated and the cycle of improvement of the next residue and the experimental testing may be conducted again.

Production of Polypeptides that Bind HLA-DQ8

Numerous methods may be used for obtaining polypeptides of the disclosure. For example, polypeptides can be produced using recombinant DNA methods. Similar to production of antibodies, polypeptides may be produced by generating a vector (e.g., virus, plasmid) to deliver a gene expressing the protein of interest. The vector is then used in the generation of recombinant cells to produce the protein of interest in accordance with known methods. Cell based systems of protein production us various cell lines (e.g., bacterial, non-bacterial, mammalian) as the basis for the protein production. Cell-free production of proteins is performed in vitro, and may be used as applicable. Protein production is well known in the art and any such method may be used, a person of ordinary skill will readily be able to select the most appropriate method. Selection may be determinant on size of the protein, quantity of protein desired, availability of resources, and yield and purity requirements, among other factors.

For example, one exemplary method of making polypeptides includes screening protein expression libraries that express proteins, e.g., phage or ribosome display libraries. Phage display is described, for example, in Ladner et al., U.S. Pat. No. 5,223,409; Smith (1985) Science 228:1315-1317; Clackson et al. (1991) Nature, 352: 624-628; Marks et al. (1991) J. Mol. Biol., 222: 581-597W092/18619; WO 91/17271; WO 92/20791; WO 92/15679; WO 93/01288; WO 92/01047; WO 92/09690; and WO 90/02809. In another embodiment, a polypeptide is obtained from a non-human animal, and then modified, e.g., chimeric, using suitable recombinant DNA techniques. A variety of approaches for making fusion proteins are known in the art.

Some aspects of the present disclosure relate to host cells transformed with a polynucleotide or vector. Host cells may be a prokaryotic or eukaryotic cell. The polynucleotide or vector which is present in the host cell may either be integrated into the genome of the host cell or it may be maintained extrachromosomally. The host cell can be any prokaryotic or eukaryotic cell, such as a bacterial, insect, fungal, plant, animal or human cell. In some embodiments, fungal cells are, for example, those of the genus *Saccharomyces*, in particular those of the species *S. cerevisiae*. The term "prokaryotic" includes all bacteria which can be transformed or transfected with a DNA or RNA molecules for the expression of a polypeptide or the protein. Prokaryotic hosts may include gram negative as well as gram positive bacteria such as, for example, *E. coli, S. typhimurium, Serratia marcescens* and *Bacillus subtilis*. The term "eukaryotic" includes yeast, higher plants, insects and vertebrate cells, e.g., mammalian cells, such as NSO and Chinese hamster ovary (CHO) cells. Depending upon the host employed in a recombinant production procedure, the peptide chains encoded by the polynucleotide may be glycosylated or may be non-glycosylated. Peptide chains may also include an initial methionine amino acid residue.

In some embodiments, once a vector has been incorporated into an appropriate host, the host may be maintained under conditions suitable for high level expression of the nucleotide sequences, and, as desired, the collection and purification of the polypeptides. Thus, polynucleotides or vectors are introduced into the cells which in turn produce the polypeptides. Furthermore, transgenic animals, preferably mammals, comprising the aforementioned host cells may be used for the large-scale production of the polypeptides.

The transformed host cells can be grown in fermenters and cultured using any suitable techniques to achieve optimal cell growth. Once expressed, the whole polypeptides, can be purified according to standard procedures of the art, including ammonium sulfate precipitation, affinity columns, column chromatography, gel electrophoresis and the like; see, Scopes, "Protein Purification", Springer Verlag, N.Y. (1982). The polypeptides can then be isolated from the growth medium, cellular lysates, or cellular membrane fractions. The isolation and purification of the, e.g., microbially expressed polypeptides may be by any conventional means.

Appropriate nucleic acids that encodes a polypeptide is obtained and inserted into an expression vectors which can be transfected into standard recombinant host cells. A variety of such host cells may be used. In some embodiments, mammalian host cells may be advantageous for efficient processing and production. Typical mammalian cell lines useful for this purpose include CHO cells, 293 cells, or NSO cells. The production of the polypeptides may be undertaken by culturing a modified recombinant host under culture conditions appropriate for the growth of the host cells and the expression of the coding sequences. The polypeptides may be recovered by isolating them from the culture. The expression systems may be designed to include signal peptides so that the resulting polypeptides are secreted into the medium; however, intracellular production is also possible.

Modifications

Peptides and/or polypeptides of the disclosure may be modified with a detectable label, including, but not limited to, an enzyme, prosthetic group, fluorescent material, luminescent material, bioluminescent material, radioactive material, positron emitting metal, nonradioactive paramagnetic metal ion, and affinity label for detection and isolation of HLA-DQ8. The detectable substance may be coupled or conjugated either directly to the polypeptides of the disclosure or indirectly, through an intermediate (such as, for example, a linker) using suitable techniques. Non-limiting examples of suitable enzymes include horseradish peroxidase, alkaline phosphatase, β-galactosidase, glucose oxidase, or acetylcholinesterase; non-limiting examples of suitable prosthetic group complexes include streptavidin/biotin and avidin/biotin; non-limiting examples of suitable fluorescent materials include biotin, umbelliferone, fluorescein, fluorescein isothiocyanate, rhodamine, dichlorotriazinylamine fluorescein, dansyl chloride, or phycoerythrin; an example of a luminescent material includes luminol; non-limiting examples of bioluminescent materials include luciferase, luciferin, and aequorin; and examples of suitable radioactive material include a radioactive metal ion, e.g., alpha-emitters or other radioisotopes such as, for example, iodine ($^{131}$I, $^{125}$I, $^{123}$I, $^{121}$I), carbon ($^{14}$C), sulfur ($^{35}$S), tritium ($^{3}$H), indium ($^{115}$mIn, $^{113}$mIn, $^{112}$In, $^{111}$In), and technetium ($^{99}$Tc, $^{99}$mTc), thallium ($^{201}$Ti), gallium ($^{68}$Ga, $^{67}$Ga), palladium ($^{103}$Pd), molybdenum ($^{99}$Mo), xenon ($^{133}$Xe), fluorine ($^{18}$F), $^{153}$Sm, Lu, $^{159}$Gd, $^{149}$Pm, $^{140}$La, $^{175}$Yb, $^{166}$Ho, $^{90}$Y, $^{47}$Sc, $^{86}$R, $^{188}$Re, $^{142}$Pr, $^{105}$Rh, $^{97}$Ru, $^{68}$Ge, $^{57}$Co, $^{65}$Zn, $^{85}$Sr, $^{32}$P, $^{153}$Gd, $^{169}$Yb, $^{51}$Cr, $^{54}$Mn, $^{75}$Se, and tin ($^{113}$Sn, $^{117}$Sn). The detectable substance may be coupled or conjugated either directly to the polypeptides of the disclosure or indirectly, through an intermediate (such as, for example, a linker) using suitable techniques. Polypeptides conjugated to a detectable substance may be used for diagnostic assays as described herein.

In some embodiments, any of the polypeptides provided herein comprise a polyhistidine tag. In some embodiments, the polyhistidine tag comprises two, three, four, five six, seven, eight, nine, ten, or more consecutive histidine residues. In some embodiments, the polyhistidine tag is comprised at the N-terminus of any of the polypeptides provided herein. In some embodiments, the polyhistidine tag is comprised at the C-terminus of any of the polypeptides provided herein. In some embodiments, the polyhistidine tag is comprised within any of the polypeptides provided herein. In some embodiments, the polyhistidine tag is fused directly to any of the polypeptides provided herein. In some embodiments, the polyhistidine tag is fused to any of the polypeptides provided herein via a linker. The term "linker," as used herein, refers to a chemical group or a molecule linking two molecules or moieties, e.g., two domains of a fusion protein, such as, for example, an polypeptide and an affinity tag, such as a polyhistidine tag. Typically, the linker is positioned between, or flanked by, two groups, molecules, or other moieties and connected to each one via a covalent bond, thus connecting the two. In some embodiments, the linker is an amino acid or a plurality of amino acids (e.g., a peptide or protein). In some embodiments, the linker is an organic molecule, group, polymer, or chemical moiety. In some embodiments, the linker is 1-100 amino acids in length, for example, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 30-35, 35-40, 40-45, 45-50, 50-60, 60-70, 70-80, 80-90, 90-100, 100-150, or 150-200 amino acids in length. Longer or shorter linkers are also contemplated. In some embodiments, the linker comprises three amino acids. In some embodiments, the linker consists of three amino acids. In some embodiments, the linker comprises the amino acid sequence GGS.

While polyhistidine is a common and useful purification tag, it is well known in the art that other expressable peptide sequences can act as tags for both purification and localization of the polypeptides in later pre-clinical studies. In many instances, use of protein affinity is used to purify polypeptides.

Pharmaceutical Compositions

One or more of the proteins of the disclosure can be mixed with a pharmaceutically acceptable carrier (excipient), including buffer, to form a pharmaceutical composition for use in alleviating a disease or disorder, for example a disease or disorder that is associated with T1D. "Acceptable" means that the carrier must be compatible with the active ingredient of the composition (and preferably, capable of stabilizing the active ingredient) and not deleterious to the subject to be treated. Examples of pharmaceutically acceptable excipients (carriers), including buffers, would be apparent to the skilled artisan and have been described previously. See, e.g., Remington: The Science and Practice of Pharmacy 20th Ed. (2000) Lippincott Williams and Wilkins, Ed. K. E. Hoover. In one example, a pharmaceutical composition described herein contains more than one protein that bind the same or different portions of HLA-DQ8 (e.g., folds, pockets).

The pharmaceutical compositions to be used in the present methods can comprise pharmaceutically acceptable carriers, excipients, or stabilizers in the form of lyophilized formulations or aqueous solutions. (Remington: The Science and Practice of Pharmacy 20th Ed. (2000) Lippincott Williams and Wilkins, Ed. K. E. Hoover). Acceptable carriers, excipients, or stabilizers are nontoxic to recipients at the dosages and concentrations used, and may comprise buffers such as phosphate, citrate, and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrans; chelating agents such as EDTA; sugars such as sucrose, mannitol, trehalose or sorbitol; salt-forming counter-ions such as sodium; metal complexes (e.g., Zn-protein complexes); and/or non-ionic surfactants such as TWEEN™, PLURON-ICS™, or polyethylene glycol (PEG). Pharmaceutically acceptable excipients are further described herein.

In some examples, the pharmaceutical composition described herein comprises liposomes containing the polypeptides of the disclosure, which can be prepared by any suitable method, such as described in Epstein, et al., Proc. Natl. Acad. Sci. USA 82:3688 (1985); Hwang, et al., Proc. Natl. Acad. Sci. USA 77:4030 (1980); and U.S. Pat. Nos. 4,485,045 and 4,544,545. Liposomes with enhanced circulation time are disclosed in U.S. Pat. No. 5,013,556. Particularly useful liposomes can be generated by the reverse phase evaporation method with a lipid composition comprising phosphatidylcholine, cholesterol and PEG-derivatized phosphatidylethanolamine (PEG-PE). Liposomes are extruded through filters of defined pore size to yield liposomes with the desired diameter.

The polypeptides may also be entrapped in microcapsules prepared, for example, by coacervation techniques or by interfacial polymerization, for example, hydroxymethylcellulose or gelatin-microcapsules and poly-(methylmethacylate) microcapsules, respectively, in colloidal drug delivery systems (e.g., liposomes, albumin microspheres, microemulsions, nano-particles and nanocapsules) or in macroemulsions. Exemplary techniques have been described previously, see, e.g., Remington, The Science and Practice of Pharmacy 20th Ed. Mack Publishing (2000).

In other examples, the pharmaceutical composition described herein can be formulated in sustained-release format. Suitable examples of sustained-release preparations include semipermeable matrices of solid hydrophobic polymers containing the polypeptide, which matrices are in the form of shaped articles (e.g., films, microcapsules). Examples of sustained-release matrices include polyesters, hydrogels (e.g., poly(2-hydroxyethyl-methacrylate), or poly (vinylalcohol)), polylactides (U.S. Pat. No. 3,773,919), copolymers of L-glutamic acid and 7 ethyl-L-glutamate, non-degradable ethylene-vinyl acetate, degradable lactic acid-glycolic acid copolymers such as the LUPRON DEPOT™ (injectable microspheres composed of lactic acid-glycolic acid copolymer and leuprolide acetate), sucrose acetate isobutyrate, and poly-D-(−)-3-hydroxybutyric acid).

The pharmaceutical compositions to be used for in vivo administration must be sterile. This is readily accomplished by, for example, filtration through sterile filtration membranes. Therapeutic protein compositions are generally placed into a container having a sterile access port, for example, an intravenous solution bag or vial having a stopper pierceable by a hypodermic injection needle.

The pharmaceutical compositions described herein can be in unit dosage forms such as tablets, pills, capsules, powders, granules, solutions or suspensions, or suppositories, for oral, parenteral or rectal administration, or administration by inhalation or insufflation.

For preparing solid compositions such as tablets, the principal active ingredient can be mixed with a pharmaceutical carrier, e.g., conventional tableting ingredients such as corn starch, lactose, sucrose, sorbitol, talc, stearic acid, magnesium stearate, dicalcium phosphate or gums, and other pharmaceutical diluents, e.g., water, to form a solid preformulation composition containing a homogeneous mixture of a compound of the present disclosure, or a non-toxic pharmaceutically acceptable salt thereof. When referring to these preformulation compositions as homogeneous, it is meant that the active ingredient is dispersed evenly throughout the composition so that the composition may be readily subdivided into equally effective unit dosage forms such as tablets, pills and capsules. This solid preformulation composition is then subdivided into unit dosage forms of the type described above containing from 0.1 mg to about 500 mg of the active ingredient of the present disclosure. The tablets or pills of the novel composition can be coated or otherwise compounded to provide a dosage form affording the advantage of prolonged action. For example, the tablet or pill can comprise an inner dosage and an outer dosage component, the latter being in the form of an envelope over the former. The two components can be separated by an enteric layer that serves to resist disintegration in the stomach and permits the inner component to pass intact into the duodenum or to be delayed in release. A variety of materials can be used for such enteric layers or coatings, such materials including a number of polymeric acids and mixtures of polymeric acids with such materials as shellac, cetyl alcohol, and cellulose acetate.

Suitable surface-active agents include, in particular, non-ionic agents, such as polyoxyethylenesorbitans (e.g., Tween™ 20, 40, 60, 80, or 85) and other sorbitans (e.g., Span™ 20, 40, 60, 80, or 85). Compositions with a surface-active agent will conveniently comprise between 0.05% and 5% surface-active agent, and can be between 0.1% and 2.5%. It will be appreciated that other ingredients may be added, for example mannitol or other pharmaceutically acceptable vehicles, if necessary.

Suitable emulsions may be prepared using commercially available fat emulsions, such as Intralipid™, Liposyn™, Infonutrol™, Lipofundin™, and Lipiphysan™. The active ingredient may be either dissolved in a pre-mixed emulsion composition or alternatively it may be dissolved in an oil (e.g., soybean oil, safflower oil, cottonseed oil, sesame oil, corn oil, or almond oil) and an emulsion formed upon mixing with a phospholipid (e.g., egg phospholipids, soybean phospholipids, or soybean lecithin) and water. It will be appreciated that other ingredients may be added, for example glycerol or glucose, to adjust the tonicity of the emulsion. Suitable emulsions will typically contain up to 20% oil, for example, between 5% and 20%.

The emulsion compositions can be those prepared by mixing the proteins of the disclosure with Intralipid™ or the components thereof (soybean oil, egg phospholipids, glycerol, and water).

Pharmaceutical compositions for inhalation or insufflation include solutions and suspensions in pharmaceutically acceptable, aqueous or organic solvents, or mixtures thereof, and powders. The liquid or solid compositions may contain suitable pharmaceutically acceptable excipients as set out above. In some embodiments, the compositions are administered by the oral or nasal respiratory route for local or systemic effect.

Compositions in preferably sterile pharmaceutically acceptable solvents may be nebulized by use of gases. Nebulized solutions may be breathed directly from the nebulizing device or the nebulizing device may be attached to a face mask, tent, or intermittent positive pressure breathing machine. Solution, suspension, or powder compositions may be administered, preferably orally or nasally, from devices which deliver the formulation in an appropriate manner.

Method of Treating Diseases/Disorders

Some aspects of the disclosure provide HLA-DQ8 binding proteins (e.g., polypeptides), that are capable of modulating a disease or disorder associated with HLA-DQ8 (e.g., T1D). In some embodiments, anti-HLA-DQ8 binding proteins (e.g., polypeptides described herein) are effective in treating a disease, disorder, or injury associated with HLA-DQ8, such as T1D. T1D, is a form of diabetes mellitus in which not enough insulin is produced. This results in high blood sugar levels in the body, and symptoms may include frequent urination, increased thirst, increased hunger, and weight loss. Additional symptoms may include blurry vision, feeling tired, and poor wound healing. Without treatment T1D can be fatal.

Some aspects of the disclosure include methods of treating a subject having a disease or disorder associated with HLA-DQ8 (e.g., T1D), the method comprising administering to the subject an effective amount of a polypeptides described herein. In some embodiments, the subject has, is suspected of having, or is at risk of having T1D.

To practice any of the methods disclosed herein, an effective amount of the polypeptide, or pharmaceutical composition thereof, described above can be administered to a subject (e.g., a human) in need of the treatment via a suitable route, such as intravenous administration, e.g., as a bolus or by continuous infusion over a period of time, by intramuscular, intraperitoneal, intracerebrospinal, subcutaneous, intra-articular, intrasynovial, intrathecal, oral, inhalation, or topical routes. Commercially available nebulizers for liquid formulations, including jet nebulizers, and ultrasonic nebulizers are useful for administration. Liquid formulations can be directly nebulized and lyophilized powder can be nebulized after reconstitution. Alternatively, the polypeptides, or pharmaceutical compositions thereof, can be aerosolized using a fluorocarbon formulation and a metered dose inhaler, or inhaled as a lyophilized and milled powder.

The subject to be treated by the methods described herein can be a mammal, more preferably a human. Mammals include, but are not limited to, farm animals, sport animals, pets, primates, horses, dogs, cats, mice and rats. A human subject who needs the treatment may be a human patient having, at risk for, or suspected of having T1D. A subject having T1D can be identified by routine medical examination (e.g., laboratory tests, organ functional tests, CT scans, or ultrasounds). A subject suspected of having any of such disorder might show one or more symptoms of the disorder. A subject at risk for the disorder can be a subject having one or more of the risk factors for that disorder.

In some embodiments, "an effective amount" refers to the amount of each active agent (e.g., polypeptides described herein) required to confer therapeutic effect on the subject, either alone or in combination with one or more other active agents. Effective amounts vary, as recognized by those skilled in the art, depending on the particular condition being treated, the severity of the condition, the individual patient parameters including age, physical condition, size, gender and weight, the duration of the treatment, the nature of concurrent therapy (if any), the specific route of administration and like factors within the knowledge and expertise of the health practitioner. These factors are well known to those of ordinary skill in the art and can be addressed with no more than routine experimentation. It is generally preferred that a maximum dose of the individual components or combinations thereof be used, that is, the highest safe dose according to sound medical judgment. It will be understood by those of ordinary skill in the art, however, that a patient may insist upon a lower dose or tolerable dose for medical reasons, psychological reasons or for virtually any other reasons.

Empirical considerations, such as the half-life, generally will contribute to the determination of the dosage. For example, proteins and pharmaceutical compositions that are compatible with the human immune system, may be used to prolong half-life of the protein and to prevent the protein from being attacked by the host's immune system. Frequency of administration may be determined and adjusted over the course of therapy, and is generally, but not necessarily, based on treatment and/or suppression and/or amelioration and/or delay of a T1D. Alternatively, sustained continuous release formulations of a polypeptide, or pharmaceutical composition thereof, may be appropriate. Various formulations and devices for achieving sustained release, for example those provided herein, would be apparent to the skilled artisan and are within the scope of this disclosure.

In one example, dosages for a polypeptide as described herein may be determined empirically in individuals who have been given one or more administration(s) of the polypeptide. Individuals are given incremental dosages of the polypeptide. To assess efficacy of the polypeptide, an indicator of the disease/disorder can be followed.

Generally, for administration of any of the polypeptides described herein, an initial candidate dosage can less than about 10 mg/kg, however, due to organ specific administration, the dose based on body weight may be misleading. For the purpose of the present disclosure, a typical daily dosage might range from about any of 0.1 µg/kg to 3 µg/kg to 30 µg/kg to 300 µg/kg to 3 mg/kg, to 30 mg/kg to 100 mg/kg or more, depending on the factors mentioned above. For repeated administrations over several days or longer, depending on the condition, the treatment is sustained until a desired suppression of symptoms occurs or until sufficient therapeutic levels are achieved to alleviate T1D, or a symptom thereof. An exemplary dosing regimen comprises administering an initial dose of about 2 mg/kg, followed by a weekly maintenance dose of about 1 mg/kg of the polypeptide, or followed by a maintenance dose of about 1 mg/kg every other week. However, other dosage regimens may be useful, depending on the pattern of pharmacokinetic decay that the practitioner wishes to achieve. For example, dosing from one-four times a week is contemplated. In some embodiments, dosing ranging from about 3 µg/mg to about 2 mg/kg (such as about 3 µg/mg, about 10 µg/mg, about 30 µg/mg, about 100 µg/mg, about 300 µg/mg, about 1 mg/kg, and about 2 mg/kg) may be used. In some embodiments, dosing frequency is once every week, every 2 weeks, every 4 weeks, every 5 weeks, every 6 weeks, every 7 weeks, every 8 weeks, every 9 weeks, or every 10 weeks; or once every month, every 2 months, or every 3 months, or longer. The progress of this therapy is easily monitored by conventional techniques and assays. The dosing regimen (including the polypeptide used) can vary over time.

In some embodiments, for an adult patient of normal weight, doses ranging from about 0.3 to 5.00 mg/kg may be administered. The particular dosage regimen, e.g., dose, timing, and repetition, will depend on the particular individual and that individual's medical history, as well as the properties of the individual agents (such as the half-life of the agent, and other relevant considerations).

For the purpose of the present disclosure, the appropriate dosage of a polypeptide as described herein will depend on the specific polypeptide employed, the type and severity of the T1D, whether the polypeptide is administered for preventive or therapeutic purposes, previous therapy, the patient's clinical history and response to the antagonist, and the discretion of the attending physician. In some embodiments, a clinician will administer a polypeptide, until a dosage is reached that achieves the desired result. Administration of a polypeptide can be continuous or intermittent, depending, for example, upon the recipient's physiological condition, whether the purpose of the administration is therapeutic or prophylactic, and other factors known to skilled practitioners. The administration of a polypeptide may be essentially continuous over a preselected period of time or may be in a series of spaced dose, e.g., either before, during, or after developing T1D.

As used herein, the term "treating" refers to the application or administration of a composition including one or more active agents to a subject, who has T1D, a symptom of T1D, or a predisposition toward T1D, with the purpose to cure, heal, alleviate, relieve, alter, remedy, ameliorate, improve, or affect T1D, or the predisposition toward T1D.

Alleviating T1D includes delaying the development or progression of the T1D, or reducing severity of the T1D. Alleviating the T1D does not necessarily require curative results. As used therein, "delaying" the development of T1D means to defer, hinder, slow, retard, stabilize, and/or postpone progression of T1D. This delay can be of varying lengths of time, depending on the history of the T1D and/or individuals being treated. A method that "delays" or alleviates the development of T1D, or delays the onset T1D, is a method that reduces probability of developing one or more symptoms of the T1D in a given time frame and/or reduces extent of the symptoms in a given time frame, when compared to not using the method. Such comparisons are typically based on clinical studies, using a number of subjects sufficient to give a statistically significant result.

"Development" or "progression" of T1D means initial manifestations and/or ensuing progression of T1D. Development of T1D can be detectable and assessed using standard clinical techniques. However, development also refers to progression that may be undetectable. For purpose of this disclosure, development or progression refers to the biological course of the symptoms. "Development" includes occurrence, recurrence, and onset. As used herein "onset" or "occurrence" of a disease/disorder associated with T1D includes initial onset and/or recurrence.

In some aspects, the disclosure relates to a method of treating a subject having, suspected of having, or at risk of having T1D, the treatment comprising administering to the subject any of the polypeptides of the disclosure, or the composition thereof. In some embodiments, any of the polypeptides, complexes, compositions, or combinations thereof, is administered to a subject. In some embodiments, the polypeptide is administered to a subject. In some embodiments, the complex is administered to a subject. In some embodiments, the composition is administered to a subject. In some embodiments, the subject is human. In some embodiments, the treatment is administered to the subject parenterally. In some embodiments, the treatment is administered to the subject non-parenterally. In some embodiments, the treatment is administered once daily, twice daily, thrice daily, once per week, twice per week, thrice per week, once per month, twice per month, thrice per week, once per year, every other week, or by some other suitable dosing schedule.

In some embodiments, the polypeptides described herein are administered to a subject in need of the treatment at an amount sufficient to inhibit the activity of an HLA-DQ8 in activating T-cells to islets and beta cells by at least 10% (e.g., 10%, 30%, 40%, 50%, 60%, 70%, 75%, 80%, 85%, 90%, 95%, 96%, 97%, 98%, 99%, or greater) in vivo. In some embodiments, the polypeptides described herein are administered to a subject in need of the treatment at an amount sufficient to inhibit binding of HLA-DQ8 to an HLA-DQ8 receptor by at least 10% (e.g., 10%, 30%, 40%, 50%, 60%, 70%, 75%, 80%, 85%, 90%, 95%, 96%, 97%, 98%, 99%, or greater) in vivo. In some embodiments, the polypeptides described herein are administered to a subject in need of the treatment at an amount sufficient to T-cell activation by at least 10% (e.g., 10%, 30%, 40%, 50%, 60%, 70%, 75%, 80%, 85%, 90%, 95%, 96%, 97%, 98%, 99%, or greater) in vivo.

Conventional methods, known to those of ordinary skill in the art of medicine, can be used to administer the polypeptides or pharmaceutical composition thereof to the subject, depending upon the type of disease to be treated or the site of the disease. The polypeptide or pharmaceutical composition thereof can also be administered via other conventional routes, e.g., administered orally, parenterally, by inhalation spray, topically, rectally, nasally, buccally, vaginally or via an implanted reservoir. The term "parenteral" as used herein includes subcutaneous, intracutaneous, intravenous, intramuscular, intraarticular, intraarterial, intrasynovial, intrasternal, intrathecal, intralesional, and intracranial injection or infusion techniques. In addition, it can be administered to the subject via injectable depot routes of administration such as using 1-, 3-, or 6-month depot injectable or biodegradable materials and methods.

Injectable polypeptides or pharmaceutical compositions thereof may contain various carriers such as vegetable oils, dimethylactamide, dimethyformamide, ethyl lactate, ethyl carbonate, isopropyl myristate, ethanol, and polyols (glycerol, propylene glycol, liquid polyethylene glycol, and the like). For intravenous injection, water soluble polypeptides can be administered by the drip method, whereby a pharmaceutical formulation containing the polypeptides and a physiologically acceptable excipients is infused. Physiologically acceptable excipients may include, for example, 5% dextrose, 0.9% saline, Ringer's solution or other suitable excipients. Intramuscular preparations, e.g., a sterile formulation of a suitable soluble salt form of the polypeptides, can be dissolved and administered in a pharmaceutical excipient such as Water-for-Injection, 0.9% saline, or 5% glucose solution.

In one embodiment, a polypeptides is administered via site-specific or targeted local delivery techniques, for example, to the pancreas. Examples of site-specific or targeted local delivery techniques include various implantable depot sources of the polypeptides, or local delivery catheters, such as infusion catheters, an indwelling catheter, or a needle catheter, synthetic grafts, adventitial wraps, shunts and stents or other implantable devices, site specific carriers, direct injection, or direct application. See, e.g., PCT Publication No. WO 00/53211 and U.S. Pat. No. 5,981,568.

Targeted delivery of therapeutic compositions containing a polynucleotide, or expression vector can also be used. Receptor-mediated DNA delivery techniques are described in, for example, Findeis et al., Trends Biotechnol. (1993) 11:202; Chiou et al., Gene Therapeutics: Methods And Applications Of Direct Gene Transfer (J. A. Wolff, ed.) (1994); Wu et al., J. Biol. Chem. (1988) 263:621; Wu et al., J. Biol. Chem. (1994) 269:542; Zenke et al., Proc. Natl. Acad. Sci. USA (1990) 87:3655; Wu et al., J. Biol. Chem. (1991) 266:338.

The particular dosage regimen, e.g., dose, timing and repetition, used in the method described herein will depend on the particular subject and that subject's medical history.

In some embodiments, more than one polypeptide and/or another suitable therapeutic agent, may be administered to a subject in need of the treatment. The polypeptides and/or therapeutic agents can be the same type or different from each other. The polypeptide can also be used in conjunction with other agents that serve to enhance and/or complement the effectiveness of the agents.

Exemplary Sequences

The following sequences form part of the specification and are referenced herein by their sequence identifiers.

TABLE 1

Exemplary Sequences

| SEQ ID NO. | Sequence | Name/Designation |
|---|---|---|
| 1 | NH2-EGCX1LYX2AEV-COOH | |
| 2 | NH2-GGREGCX1LYX2AEVX3X4-COOH | |
| 3 | NH2-GGREGCVLYLAEVLH-COOH | RI peptide |
| 4 | NH2-GGREGCVLYLAEVGG-COOH | RI-CT |
| 5 | NH2-GGREGCLLYLAEVGG-COOH | RI-CT-P6L |
| 6 | NH2-GGREGCFLYLAEVGG-COOH | RI-CT-P6F |
| 7 | NH2-GGREGCYLYLAEVGG-COOH | RI-CT-P6Y |
| 8 | NH2-GGREGCVLYAAEVGG-COOH | RI-CT-P3A |
| 9 | NH2-GGREGCVLYSAEVGG-COOH | RI-CT-P3S |
| 10 | NH2-GGREGCVLYCAEVGG-COOH | RI-CT-P3C |
| 11 | NH2-GGREGCVLYGAEVGG-COOH | RI-CT-P3G |
| 12 | NH2-FFGGREGCVLYLAEVLHSG-COOH | RI-EXT |
| 13 | NH2-HSGGREGCVLYLAEVGGDF-COOH | RI-EXT1 |
| 14 | NH2-SHGGREGCVLYLAEVGGFD-COOH | RI-EXT2 |
| 15 | NH2-RSGGREGCVLYLAEVGGES-COOH | RI-EXT3 |
| 16 | NH2-KSGGREGCVLYLAEVGGSF-COOH | RI-EXT4 |
| 17 | MILNKALMLGALALTTVMSPCGGEDIVADHVASYGVNLY QSYGPSGQYSHEFDGDEEFYVDLERKETVWQLPLFRRFRR FDPQFALTNIAVLKHNLNIVIKRSNSTAATNEVPEVTVFSKS PVTLGQPNTLICLVDNIFPPVVNITWLSNGHSVTEGVSETSF LSKSDHSFFKISYLTFLPSADEIYDCKVEHVVGLDEPLLKHVV EPEIPTPMSELTEENLYFQGVDGGGLTDTLQAETDQLEDEK SALQTEIANLLKEKEKLEFILAAHR | |
| 18 | MSWKKALRIPGGLRVATVTLMLAMLSTPVAEGRDSPEDFV YQFKGMCYFTNGTERVRLVTRYIYNREEYARFDSDVGVYR AVTPLGPPAAEYWNSQKEVLERTRAELDTVCRHNYQLELR TTLQRRVEPTVTISPSRTEALNEHNLLVCSVTDFYPAQIKVR WFRNDQEETTGVVSTPLIRNGDWTFQILVMLEMTPQRGDV YTCHVEHPSLQNPIIVEWRAQSESAQSKENLYFQGVDGGG RIARLEDKVKTLKAENAGLSSTAGLLREQVAQLKQKVMN | |
| 19 | MILNKALMLGALALTTVMSPCGGEDIVADHVASYGVNLY QSYGPSGQYTHEFDGDEQFYVDLGRKETVWCLPVLRQFRF DPQFALTNIAVLKHNLNSLIKRSNSTAATNEVPEVTVFSKSP VTLGQPNILICLVDNIFPPVVNITWLSNGHSVTEGVSETSFLS KSDHSFFKISYLTLLPSAEESYDCKVEHVVGLDKPLLKHWEP EIPAPMSELTETVVCALGLSVGLVGIVVGTVFIIRGLRSVGA SRHQGPL | |
| 20 | SHLVEALYLVCGERG | InsB: 9-23 |
| 21 | MILNKALMLGALALTTVMSPCGGEDIVADHVASYGVNLY QSYGPSGQYSHEFDGDEEFYVDLERKETVWQLPLFRRFRR FDPQFALTNIAVLKHNLNIVIKRSNSTAATNEVPEVTVFSKS PVTLGQPNTLICLVDNIFPPVVNITWLSNGHSVTEGVSETSF LSKSDHSFFKISYLTFLPSADEIYDCKVEHVVGLDEPLLKHVV EPEIPTPMSELTEENLYFQGVDGGGLTDTLQAETDQLEDEK SALQTEIANLLKEKEKLEFILAAHR | |
| 22 | MSWKKALRIPGGLRVATVTLMLAMLSTPVAEGRDSPEDFV YQFKGMCYFTNGTERVRLVTRYIYNREEYARFDSDVGVYR AVTPLGPPAAEYWNSQKEVLERTRAELDTVCRHNYQLELR TTLQRRVEPTVTISPSRTEALNEIHNLLVCSVTDFYPAQIKVR WFRNDQEETTGVVSTPLIRNGDWTFQILVMLEMTPQRGDV YTCHVEHPSLQNPIIVEWRAQSESAQSKENLYFQGVDGGG RIARLEDKVKTLKAENAGLSSTAGLLREQVAQLKQKVMN | |

TABLE 1-continued

Exemplary Sequences

| SEQ ID NO. | Sequence | Name/Designation |
|---|---|---|
| 23 | 5' - A GGG ATC CCC GCA GAG GAT TTC GTG - 3' | |
| 24 | 5' - CACC TGC AGT GCG GAG CTC CAA CTG GTA - 3' | |
| 25 | MSWKKALRIPGGLRAATVTLMLAMLSTPVAEGRDSPEDFV YQFKAMCYFTNGTERVRYVTRYIYNREEYARFDSDVEVYR AVTPLGPPDAEYWNSQKEVLERTRAELDTVCRHNYQLELR TTLQRRVEPTVTISPSRTEALNEIHNLLVCSVTDFYPAQIKVR WFRNDQEETTGVVSTPLIRNGDWTFQILVMLEMTPQHGDV YTCHVEHPSLQNPITVEWRAQSESAQSKMLSGIGGFVLGLI FLGLGLIIHHRSQKGLLH | sp\|P01920\|DQB1_HUMAN HLA class II histocompatibility antigen, DQ beta 1 chain OS = Homo sapiens OX = 9606 GN = HLA-DQB1 PE = 1 SV = 2 |
| 26 | MSWKKALRIPGGLRAATVTLMLAMLSTPVAEGRDSPEDFV YQFKAMCYFTNGTERVRYVTRYIYNREEYARFDSDVEVYR AVTPLGPPDAEYWNSQKEVLERTRAELDTVCRHNYQLELR TTLQRRVEPTVTISPSRTEALNEIHNLLVCSVTDFYPAQIKVR WFRNDQEETTGVVSTPLIRNGDWTFQILVMLEMTPQHGDV YTCHVEHPSLQNPITVEWRAQSESAQSKMLSGIGGFVLGLI FLGLGLIIHHRSQKGLLH | |
| 27 | HLVEALYLVCGERGG | INSB9-23 |

EXAMPLES

Example 1

Blocking Autoantigen Presentation in T1D Using D-Peptides: A Novel Therapeutic Approach Introduction T1D is one of the most common autoimmune endocrine disorders, and is associated with significant morbidity and mortality in children and adults (1). Each year ~15,000 children are diagnosed with T1D only in the US; moreover, the prevalence of the disease has been increasing by 2-4% in recent decades especially in children resulting in doubling the frequency of T1D every 2 decades (2, 3). These rapid trends are alarming and underscore the urgent need for newer therapies for T1D.

There is currently no curative or preventive therapy for T1D and the only available treatment is insulin replacement. Substantial recent data demonstrate a strong association between the MHC Class II molecule DQ8 and the development of T1D. Moreover, HLA-DQ8 has been shown to present antigenic islet peptides in a manner that drives activation of CD4+ T-cells in T1D patients. Specifically, the diabetogenic insulin peptide InsB:9-23 activates self-reactive CD4+ T-cells driving pancreatic beta cell destruction. Here it is shown that blocking the binding of InsB:9-23 to HLA-DQ8 can prevent the continuous CD4+ T-cell activation in T1D needed to initiate and maintain the autoimmune response to the beta-cells. The aim of this Example was to identify D-amino acid based peptides (D-peptides) that can block T-cell activation by InsB:9-23 peptide presented within the HLA-DQ8 pocket. One D-peptide (RI-EXT; SEQ ID NO: 12) was identified that was able to block InsB:9-23 binding to HLA-DQ8 and its concomitant presentation to T-cells. RI-EXT inhibited binding of InsB:9-23 to recombinant HLA-DQ8 molecule, using an ELISA assay newly developed by us; RI-EXT also inhibited the binding of InsB:9-23 to DQ8 expressed on B-cells by flow cytometry. Functionally, RI-EXT inhibited T-cell activation in a mixed lymphocyte reaction containing human HLA-DQ8 cells loaded with InsB:9-23 peptide and murine T-cells expressing a human TCR specific for the InsB:9-23—DQ8 complex. Furthermore, RI-EXT significantly inhibited T-cell activation in transgenic DQ8 mice immunized with InsB:9-23 both ex vivo and in vivo, as shown by decreased production of pro-inflammatory cytokines IL-2 and IFN-γ and reduced T-cell proliferation by CFSE. Finally, RI-EXT significantly inhibited the ability of InsB:9-23 to stimulate T-cell activation in PBMCs from DQ8 positive T1D patients with recent onset disease. Without being bound by theory, the inventors have discovered that D-peptides can block InsB:9-23 binding to HLA-DQ8 and its presentation to T-cells in T1D. These data set the stage for using the present approach of blocking antigen presentation by D-peptides as a novel therapeutic approach for autoimmune diseases.

Materials and Methods

Designing the D-Peptides (Retro-Inverso Peptides)

The design of D-peptides in this work was based on the original sequence of InsB:9-23, which has been shown to bind in the groove of the HLA-DQ8 (10). The specificity of peptide binding to HLA proteins resides in part from the insertion of their side chains into specific binding pockets. Thus, the P1 pocket in the HLA-DQ8 protein is very polar and comfortably accommodates a glutamic acid (E) that interacts with Arg-52$^α$. Pocket P4 is very deep and holds in it the side chain of tyrosine (Y). Finally, in pocket P9 of HLA-DQ8 Ala-57β binds strongly with a glutamic acid (E) in position 9 of the peptide. With the goal of maintaining the positions of these side chains in their respective pockets, the stereochemistry of the L-configuration of InsB:9-23 was modified to incorporate D-amino acids in an inverted order (e.g., retro-inverso (RI)) which resulted in the positions of the N—H and C═O backbone groups being reversed. Such a transformation inverts the stereochemistry of Cα while maintaining the positions of the side chains in their respective pockets, but reverses the direction of the chain. Since the peptide is also held by H-bonds between the main chain and the protein, the RI peptide will tend to create alternative H-bonds. Using the program SIMULAID (20) the original InsB:9-23 was converted into the RI form (FIG. 3A). The RI-CT variant was designed by replacing the C-term end from leucine-histidine to glycine-glycine to reduce potential repulsion with the protein (note that the C-terminus of the RI-peptide resides in the same position as the N-terminus of the original InsB:9-23). Variants #3-#5 of FIG. 3A were designed by replacing the original valine with the residues listed in the figure, and in variants #6-#9 of FIG. 3A the leucine residue was replaced by the residues listed. The RI-EXT series was designed by extending the N-termini and C-termini by two residues on each side to enhance the effect of flanking residues.

Molecular Dynamics Simulations and Energy Decomposition Analysis

Molecular Dynamics (MD) simulations were conducted with AMBER v.16 (21). InsB:9-23 peptide in complex with HLA-DQ8 (constructed from the crystal structure 1JK8.pdb) was converted to a RI-peptide by using Simulaid (20); the original peptide was replaced by the RI-peptide and the initial structure served to construct the complete system with tleap in AMBER. Water was added to create a truncated octahedron and ions were added to neutralize the system. The entire system was contained within a truncated octahedron of ~100 angstroms with approximately 70,000 atoms. The system was minimized, heated and equilibrated with positional restraints on the solute that were reduced gradually. The MD simulations were carried out at normal temperature and pressure conditions. Analysis was conducted with cpptraj and the energy decomposition was calculated with the mmgbsa module.

Production of Recombinant HLA-DQ8 Protein

Figure 12A:
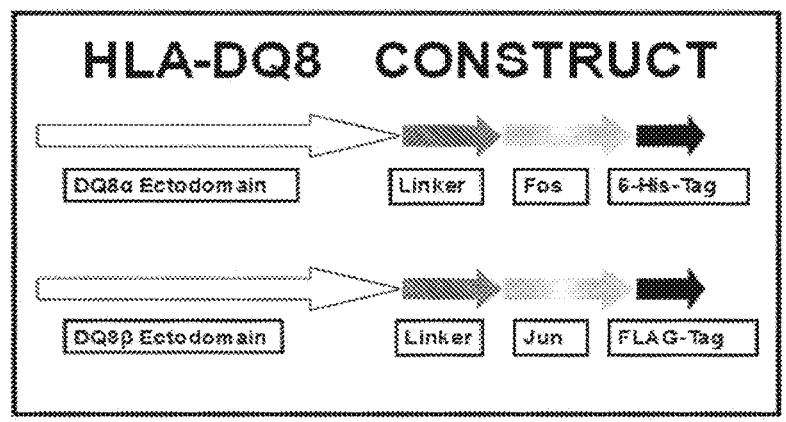
FIGS. 12A-12B show the binding inhibition assay used to test D-peptides inhibition of peptide binding to HLA-DQ8. The α chain construct contained the DQ α chain fused to the coiled-coil region of the basic leucine zipper domain of Fos. The β chain construct contained the coiled-coil region of the basic leucine zipper domain of JunB. The Jun and Fos dimerization motifs allowed the protein to dimerize to form the HLA-DQ8 protein. The α chain has a His6 tag, whereas the β chain has a FLAG epitope tag for purification purposes (FIG. 12A). Recombinant HLA-DQ8 protein was incubated with biotinylated InsB:9-23 peptide, either with or without D-peptides. The ELISA plate was coated with nickel, which captured the 6 histidines of the HLA-DQ8 α chain. If the tested D-peptide blocked the HLA pocket, it prevented the binding of the InsB:9-23 peptide. Europium-streptavidin was added and gave the fluorescence signal. The level of fluorescence signal was reduced when InsB:9-23 binding to HLA-DQ8 was inhibited by the tested D-peptides (FIG. 12B).

HLA-DQ8 protein was produced using the baculovirus system. Two constructs were designed for both the α and the β chains of HLA-DQ8. The β chain construct contained the extracellular portion of the DQB1*0302 β chain fused to the coiled-coil region of the basic leucine zipper domain of JunB, and the α chain construct contained the extracellular portion of the DQA1*0301 α chain fused to the coiled-coil region of the basic leucine zipper domain of Fos. The β chain had a histidine (22) tag at the C-terminus in order to enable binding to nickel coated plates. A tobacco etch virus protease cutting site was introduced in each chain to allow removal of the dimerization motif. The JunB and Fos dimerization motifs were added in order to allow the α and β chains to dimerize and form the final HLA-DQ8 protein (FIG. 12A). These constructs were used to produce the HLA-DQ8 protein in a baculovirus system using the Life Technologies Baculovirus protein production custom services (Carlsbad, CA).

In Vitro Testing of D-Peptides Designed by MD Simulations

Figure 12B:
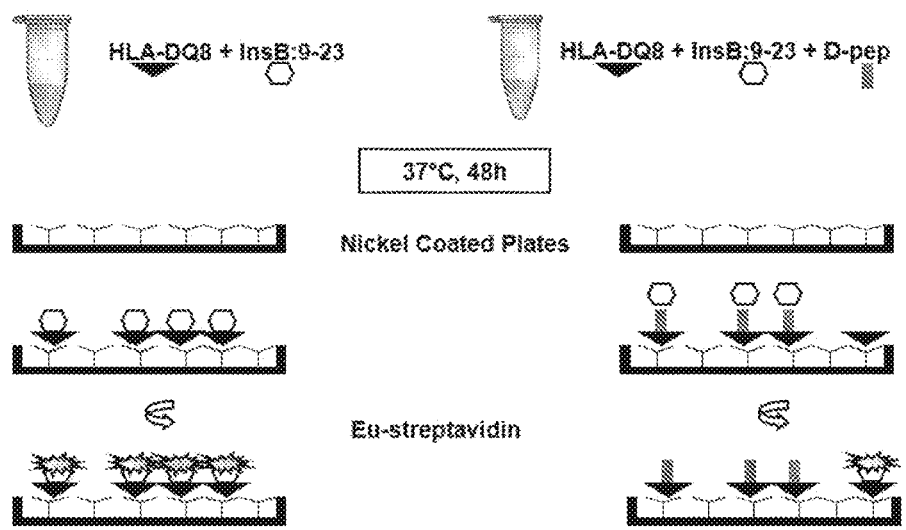

D-peptides were produced by Fisher Scientific (Hanover Park, IL) in dry form and dissolved in PBS. All D-peptides were screened at a concentration of 10 µM for their ability to bind to the HLA-DQ8 pocket and block it from binding the InsB:9-23 peptide using a unique immunoassay (23). In this assay 0.012 mg/ml of recombinant HLA-DQ8 protein was incubated with 10 µM biotinylated InsB:9-23 peptide (Genscript, Piscataway, NJ), with or without the tested D-peptide, for 48 hours, at 37° C., in binding buffer (0.1% BSA/PBS with 0.05% Triton (PBST), (Sigma). After 48 hours incubation, a 100 µl solution containing HLA-DQ8 protein and InsB:9-23, with or without D-peptides, was added onto nickel coated plates (Sigma) and shaken at slow speed for 2 hours at room temperature. Since the β chain of the HLA-DQ8 protein has a histidine tag the DQ8 protein complexed with the InsB:9-23 peptide bound to the plate. After washing 4 times, DELFIA Europium-labeled streptavidin (PerkinElmer) diluted in DELFIA assay buffer (PerkinElmer) was added for 30 minutes and shaken at slow speed at room temperature. Since the InsB:9-23 peptide was biotinylated the complex HLA-DQ8-InsB:9-23 peptide could be detected using the Europium-labeled streptavidin. After washing for 6 times, DELFIA Enhancement Solution was added for 1 hour or until the optimal signal was reached. Time-resolved fluorescence was measured using the BMG reader (BMG Labtech, Cary, NC). The experiment was performed in triplicate. As a negative control biotinylated InsB:9-23 peptide that was not pre-incubated with HLA-DQ8 was added to the nickel coated plates. Percent inhibition of InsB:9-23 binding to HLA-DQ8 by the D-peptides was calculated by the following formula: 100−100×(HLA-DQ8-InsB:9-23 (with D-peptide)/HLA-DQ8-InsB:9-23 (no D-peptide) (24). FIG. 12B depicts the outline of the in vitro binding assay.

Determining Potency of Identified D-Peptides

To determine the potency of the D-peptides that showed inhibition of InsB:9-23 peptide binding to HLA-DQ8 the percent-inhibition was tested at decreasing concentrations of D-peptides. Two of the D-peptide hits, RI-CT and RI-EXT, were serially diluted to 0.5 µM final concentration and incubated with the HLA-DQ8-InsB:9-23 complex for 48 hours at 37 C to assess the percentage of inhibition. Immunoassay was performed as described above.

Cell Culture

BSM cells homozygous for HLA-DQ8 (European Collection of Authenticated Cell Cultures) were cultured in RPMI growth medium (ATCC, Manassas, VA) supplied with 10% fetal bovine serum (FBS) (Sigma), 1% penicillin-streptomycin (Corning, NY), and 2 mM glutamine (Corning). Cells were grown at 37° C., 5% $CO_2$, and passaged 1-2 times a week. 5KC cells (generously provided by Dr. Maki Nakayama, University of Colorado, Denver) were produced and cultured as described (25, 26).

Flow Cytometric Analysis of Inhibition of InsB:9-23 Peptide Binding to APCs by Hit D-Peptides N-terminal biotinylated peptide InsB:9-23 (or gliadin) were used to test for binding to BSM cells that express HLA-DQ8 on their surface. APC-streptavidin (BD Biosciences, Franklin Lakes, NJ) were used to detect the biotinylated peptides. BSM cells were seeded at $2.5 \times 10^6$ cells/ml in a 24-well plate (BD Biosciences) and pre-incubated overnight with 10 µM RI-CT or RI-EXT D-peptides. Scrambled RI-CT/RI-EXT D-peptides were used as negative controls. After 24 hours incubation, cells were stained with PE-mouse anti-human HLA-DQ8 (BD Biosciences) and APC-streptavidin to detect the percent binding of the peptide to BSM cells with or without D-peptides. Percent binding was analyzed by flow cytometry.

Mixed Lymphocyte Reaction to Test In Vitro Functional Inhibition of T-Cell Activation by Hit D-Peptides To functionally test in vitro D-peptides ability to block T-cell activation, $10^6$ BSM cells were incubated over night with 200 µg/ml InsB:9-23 (or with scrambled InsB:9-23 or gliadin as negative peptides); on the following day InsB:9-23 loaded BSM cells were washed twice with phosphate buffered saline (PBS) to remove excess peptide and RI-CT or RI-EXT peptides (or scrambled RI-CT/RI-EXT, as negative controls) were added to the cells. Following 2 hours of incubation at 37° C. 5KC cells were added to the mixture BSM-InsB:9-23-D-peptides (1:1 proportion) and incubated overnight. 5KC cells are transfected with human T-cell receptor that is activated only upon engagement with HLA-DQ8-InsB:9-23 complex. Upon activation by HLA-DQ8-InsB:9-23 complex 5KC cells produce and secrete IL-2. After overnight incubation of the 5KC cells with BSM cells loaded with InsB:9-23 and with different D-peptides IL-2 production was measured in the supernatants by Luminex assay. 5KC cells incubated with anti CD3-CD28 beads (which activate IL-2 production in non-antigen dependent fashion) were used as positive control.

Mice

Mice transgenic for HLA-DQ8 (DQA1*0301/DQB1*0302) were originally generated by Dr. C. S. David and co-workers as previously described (27-29). These mice do not develop autoimmune responses to InsB:9-23 peptide (data not shown), likely because their background is mostly C57B1/6 which is autoimmune resistant. These mice were crossed into the SJL background (which is highly autoimmune prone) (30) to produce the SJL-DQ8 mice. Mice were bred in a pathogen-free facility (Albert Einstein College of Medicine, Bronx, NY). The expression of HLA-DQ8 was tested by PCR using DQ8-specific primers: forward primer, 5'-A GGG ATC CCC GCA GAG GAT TTC GTG-3' (SEQ ID NO: 23) and reverse primer 5'-CACC TGC AGT GCG GAG CTC CAA CTG GTA-3' (SEQ ID NO: 24) and by flow using anti human PE-DQ8 antibody (Abcam, Cambridge, UK). Anti-mouse biotin-CD3 antibody (BioLegend, San Diego, CA), anti-mouse biotin-CD2 antibody, anti-mouse biotin-B220 antibody (both eBioscience, Hanover Park, IL) anti-mouse biotin-CD11c antibody, were used by flow to check the subpopulation of cells expressing DQ8 in splenocytes isolated from DQ8 transgenic mice. APC-conjugated avidin was used as secondary antibody (Both CD11c antibody and APC-conjugated avidin are from BD, Franklin Lakes, NJ).

Induction of Autoimmune T-Cell Responses to InsB:9-23 in SJL-DQ8 Humanized Mice

Twenty female SJL-DQ8 mice, 6-8 weeks old, were injected subcutaneously with InsB:9-23 (150 µg/mouse) in Complete Freund's Adjuvant (Sigma) and boosted on day 7 to induce T-cell activation. Mice were sacrificed on day 14 and their spleens and draining lymph nodes removed. Wild type (WT) SJL mice were used as controls.

T-Cell Stimulation Analysis Using CFSE

Spleen and draining lymph nodes were collected from mice upon sacrifice. Cells from spleens and draining lymph nodes were harvested in complete RPMI (Corning) supplemented with 10% FBS (Sigma) and 1 mM sodium pyruvate (Sigma) as described previously (31). The harvested cells were re-suspended at $2 \times 10^6$ cells/ml in 0.1% bovine serum albumin (BSA)/PBS. $10^6$ cells were labeled with 1.5 µM carboxyfluorescein diacetate succinimidyl ester (CFSE) (Life Technologies). After incubating for 10 minutes at 37° C., the staining was terminated by the addition of 4 volumes of ice-cold RPMI, 10% FBS. After 5 minutes of incubation on ice, the cells were washed 3 times with fresh RPMI and re-suspended in fresh medium for counting. The CFSE-labeled cells were plated at $2 \times 10^5$ cells/well in 100 µl of medium (RPMI, 10% FBS). The cells were treated with medium (RPMI 1640 [Corning, catalog #: 10-040-CV]+10% Fetal Bovine Serum), InsB:9-23 (with or without D-peptides or scrambled D-peptides), or scrambled InsB:9-23, (all peptides at 50 µg/ml). The cells were collected after 5 days for flow cytometry analysis. All experiments were performed at least in triplicate. The results were analyzed using Flowjo (Tree Star, Ashland, OR). The stimulation index was calculated by using the following formula: stimulation index=[% proliferating lymphocytes (InsB:9-23, D-peptide-treated)]/[% proliferating lymphocytes (medium-treated)].

T-Cell Activation Analysis Using Cytokine Assays

Splenocytes/lymphocytes from immunized mice were plated at $2 \times 10^5$ cells/well in 100 µl of medium (RPMI, 10% FBS). The cells were treated with medium, InsB:9-23 (with or without D-peptides or scrambled D-peptides), or scrambled InsB:9-23, (all peptides at 50 µg/ml). Supernatants from stimulated lymphocytes were collected 48 hours after stimulation and stored at −80° C. until the Luminex assay was performed. The Milliplex mouse cytokines/chemokine magnetic panel (EMD Millipore Corporation, Billerica, MA) and a Luminex 200 with xPONENT software (Luminex, Austin, Texas) were used to assay the cytokines following the manufacturer's instructions.

Validation of D-Peptides' Ability to Block T-Cell Stimulation in PBMCs from T1D Donors Subjects with a diagnosis of T1D within the previous 2 years were recruited from the Pediatric Endocrine clinic at Children Hospital at Montefiore and from the adult Endocrine clinics at Montefiore and Mount Sinai Hospitals (New York). Peripheral blood mononuclear cells (PBMCs) were isolated from heparinized blood using Ficoll-Paque (GE Healthcare); freshly isolated PBMCs were used for T-cell activation studies and for genotyping. DNA purified from the blood of the patients was typed for HLA-DQ as previously described (32). PBMCs isolated from DQ8 positive patients were seeded in 96 well plates with 200 μl medium (RPMI, 10% FBS). The cells were stimulated with InsB:9-23, scrambled InsB:9-23, with or without the D-peptides RI-CT or scrambled RI-CT, RI-EXT or scrambled RI-EXT for 48 hours (all peptides at 50 μg/ml). The stimulated PBMCs were assessed for cytokine production and T-cell proliferation as described above for mouse splenocytes. DQ8 typed patients with long standing T1D (>10 years) were used as negative controls in the experiments (no T-cell responses to islet peptides).

Confirmation of D-Peptide Activity In Vivo Using SJL-DQ8 Humanized Mice

Twenty SJL-DQ8 mice were immunized with InsB:9-23 and CFA on day 1, and then injected with 200 μg of the D-peptides RI-EXT or scrambled RI-EXT (as negative control) intraperitoneally on days 4 and 7. The mice were boosted with InsB:9-23 and CFA on day 8, and were injected with 200 μg of the D-peptides on days 11 and 14. Mice were sacrificed on day 17 as described in FIG. 8A.

Statistics

Prism 5 software was used to perform statistical analysis. Student's t-tests (paired t and unpaired t-tests, one tailed) were used for the comparison of normally distributed values between two groups of samples. A p value<0.05 was considered statistically significant.

Results

Designing D-Peptides that Block InsB:9-23 Binding to the HLA-DQ8 Pocket

An in silico approach was used to rank D-peptides predicted to bind structural pockets in the HLA-DQ8 peptide-binding groove. First, a retro-inverso InsB:9-23 (RI-InsB:9-23 or "RI" in FIG. 3A) was designed (i.e., a D-peptide in which the sequence of InsB:9-23 was reversed) (FIG. 3A). The resulting side chains of the peptide resided in nearly identical pockets but the backbone direction was reversed creating different H-bonds with the protein. MD simulations were used to generate RI-peptides that can block InsB:9-23 binding to HLA-DQ8 pockets and inhibit T-cell stimulation.

An example of the structural alignment of the RI-CT and the original peptide is shown in FIG. 10. Clearly the side chains are nearly in the same position filling the usual binding pockets. The reversal of the direction of the backbone changes the positions of the C═O and N—H groups giving rise to rearranged H-bonds. The groove of DQ8 is lined with several polar residues, e.g., Asn62α, Asn69α, Tyr30β, Trp61β and Asn82β. The rearrangement of the backbone causes overall a loss of approximately one H-bond as well as a shift in the polarity of the H-bonds (the backbone N—H groups now interacting with H-bond acceptors and vice versa). In addition, several small shifts in the positions of the side chains change the overall H-bonding. The notable changes are the appearance of additional H-bonding in the N-terminus of the original peptide (C-terminus of the RI-peptide) and two significant changes at Val in position 6 and Leu in position 3 (numbering according to the original peptide).

Figure 11:
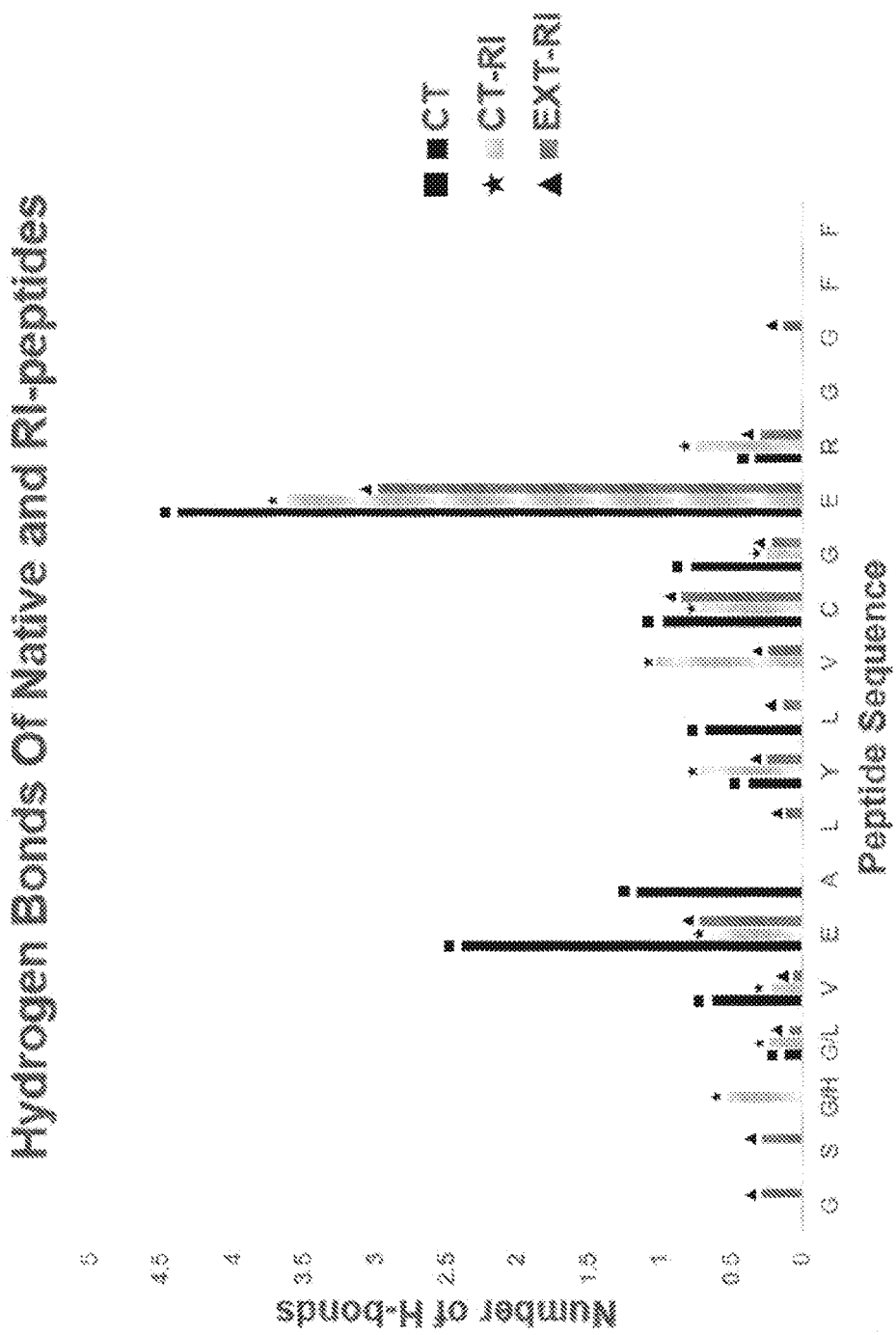
FIG. 11 shows a comparison of H-bonds in L-peptide (CT) and D-peptides (RI-CT and RI-EXT). The bars represent the total number of H-bonds between the particular residue and the HLA-DQ8. Notable changes are a complete absence of H-bonds in L3 as well as an appearance of H-bonds in V6. Also note the appearance of H-bonds at the termini both in RI-CT and additional H-bonds in RI-EXT.

These changes led to the design of several RI-peptides that were expected to exhibit better binding and inhibitory power. The gain of H-bonding in valine6 led to the design of sequences #3-#5 of FIG. 3A where valine was replaced by other residues. The loss of H-bonding in leucine3 suggested the sequences #7-#9 of FIG. 3A in which leucine was replaced by other side chains. These changes did not improve the inhibitory activity in vitro in either case. However, the changes in the H-bonding at the termini suggested that extending the flanking regions may improve the affinity of the peptides to HLA-DQ8. Among the sequences #10-#14 of FIG. 3A the best extended sequence was #10. An analysis of the interaction energies of the RI-EXT compared to RI-CT showed that the affinity is better by about 0.8 kcal/mol, which translates to a factor of 3.6 (FIG. 11). Analysis of the H-bonds in RI-EXT showed that the flanking residues at both termini added small amounts of stability through H-bonds. In addition, the phenylalanine at the N-terminus (C-terminus in the L-peptide) adds stabilization by van der Waals interactions with the hydrophobic portions of lysine75α. The early (and incomplete) attempt to design more potent inhibitors by modifying the sequences of the RI-peptides was not successful. However, the extension of the RI-peptides by the flanking residues enhance the potency of the peptide by a factor of about 3.6 through the addition of H-bond and hydrophobic interactions.

In Vitro Testing of D-Peptides Designed by the Virtual Screen

Figure 3C:
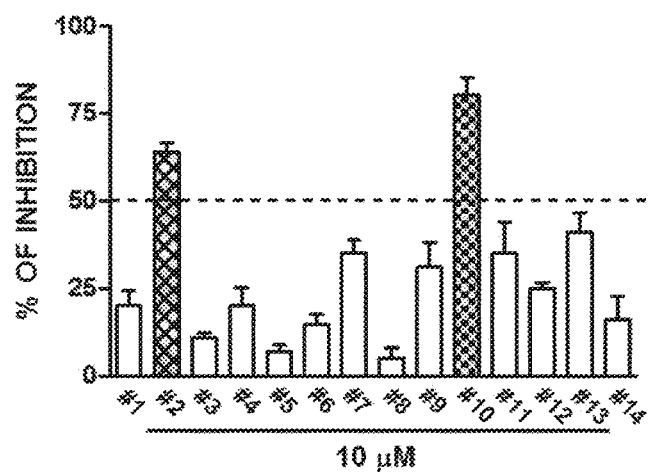
Figure 3D:
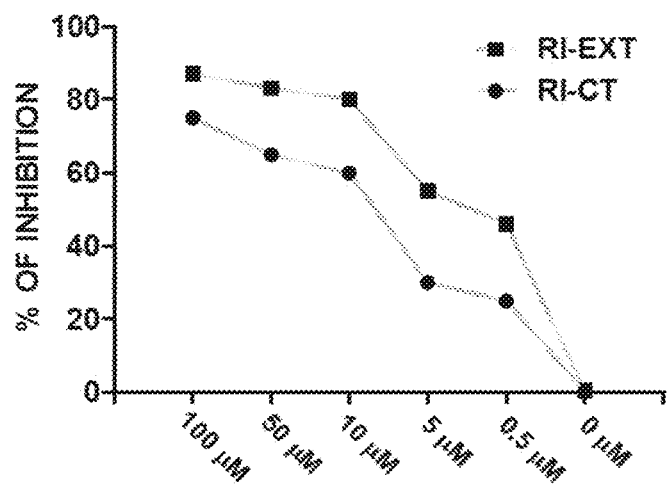

Fourteen D-peptides designed using molecular dynamic simulations to block the HLA-DQ8 pocket (FIG. 3A) were tested in vitro using a recombinant HLA-DQ8 protein in a unique DELFIA immunoassay (FIGS. 12A-12B). Briefly, to first establish that the immunoassay detects significant binding of InsB:9-23 to HLA-DQ8 recombinant HLA-DQ8 protein was incubated with biotinylated InsB:9-23 or biotinylated scrambled InsB:9-23 as a negative control. Using this immunoassay significant binding of InsB:9-23 to the recombinant HLA-DQ8 protein was detected compared to scrambled InsB:9-23 (FIG. 3B). Next the in silico designed 14 D-peptides were incubated with the HLADQ8-InsB:9-23 complex to evaluate whether they could block InsB:9-23 binding to HLA-DQ8; two peptides, RI-CT (SEQ ID NO: 4) and RI-EXT (SEQ ID NO: 12) showed significant inhibition of InsB:9-23 binding to HLADQ8 (FIG. 3C). Furthermore, for both peptides the inhibition of the InsB:9-23 binding to HLADQ8 was dose-dependent (FIG. 3D).

Confirmation of RI-CT and RI-EXT Using Cell-Based Binding Inhibition Assays

Figure 4A:
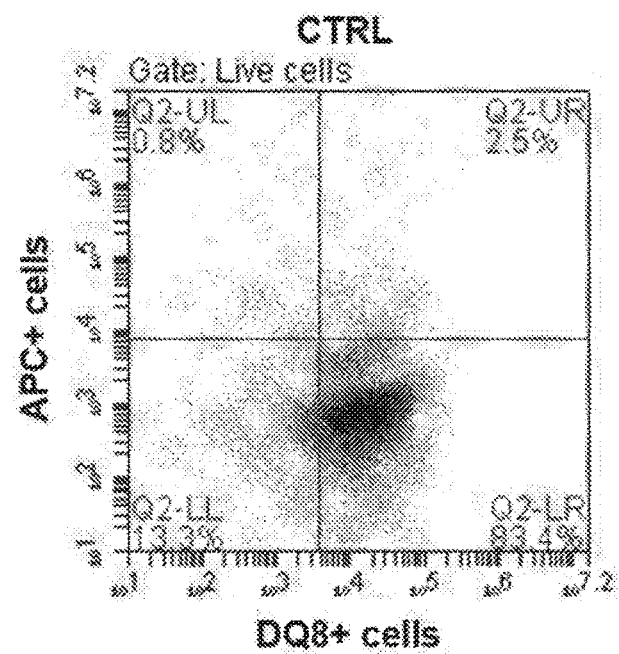
FIGS. 4A-4F show RI-CT and RI-EXT inhibits the binding of InsB:9-23 to HLADQ8 expressed on BSM cells. HLADQ8 expression on BSM cells was evaluated using a PE-DQ8 antibody and APC-streptavidin was used to detect the peptide binding (cells double positive for PE and APC are shown in the upper-right quadrant) (FIGS. 4A-4F). BSM cells were loaded or not with InsB:9-23 (FIGS. 4A, 4B), in the presence of RI-CT and RI-EXT (FIGS. 4C, 4D) or scrambled RI-CT and RI-EXT (FIGS. 4E, 4F). Inhibition of binding was analyzed by flow cytometry. These results have been replicated three times.
Figure 4B:
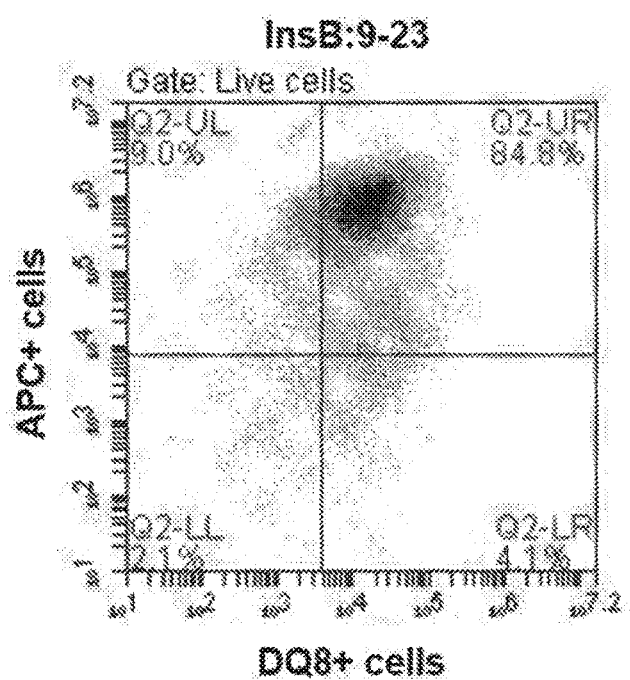
Figure 4C:
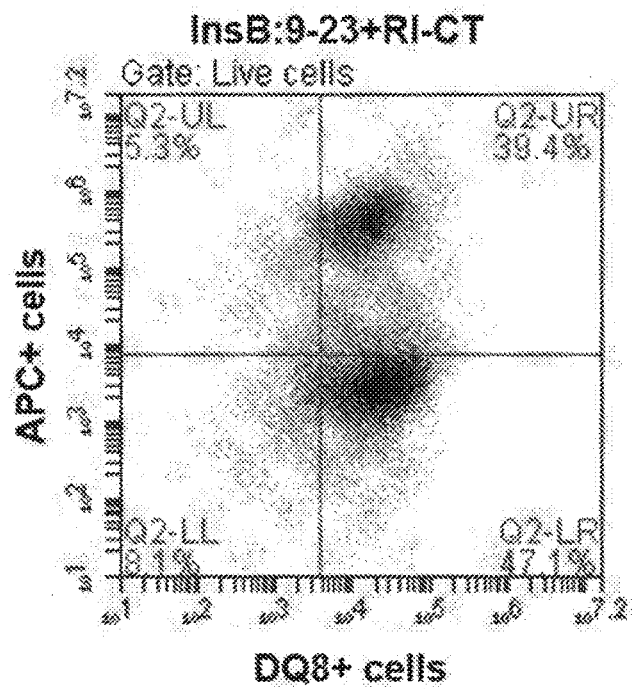
Figure 4D:
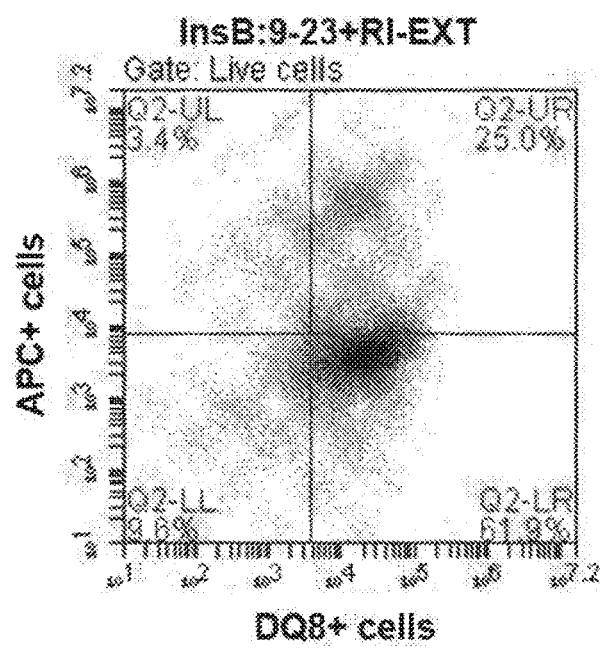
Figure 4E:
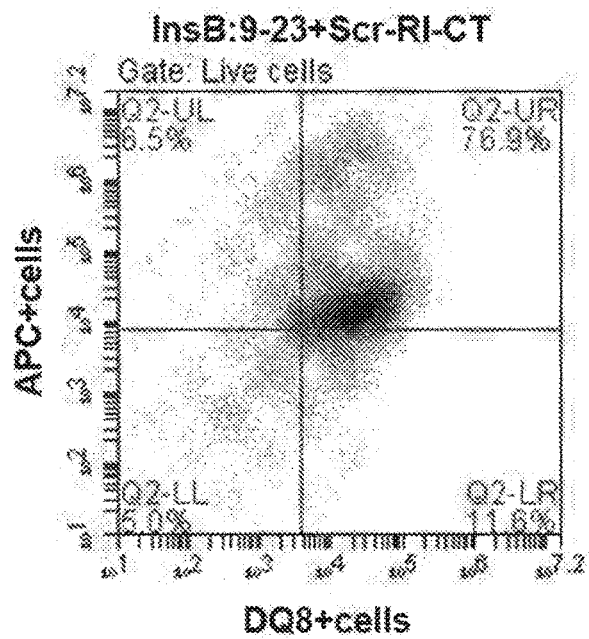
Figure 4F:
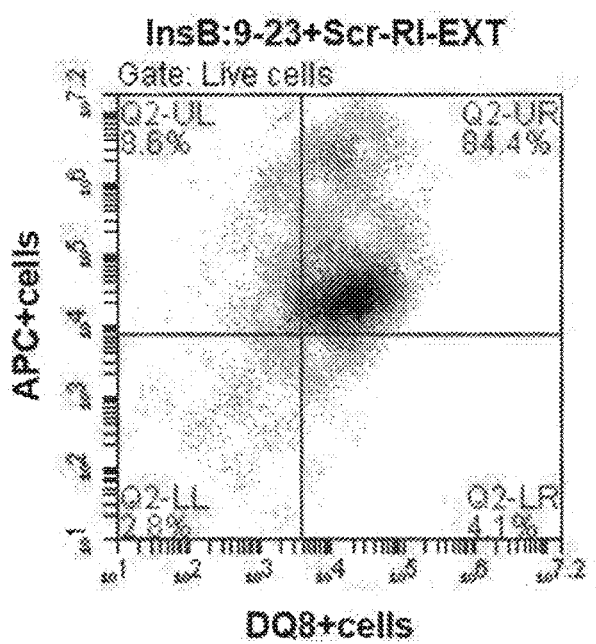

To validate that the two D-peptide hits can also block InsB:9-23 binding to HLA-DQ8 expressed on APCs a cell-based in vitro assay was used. Briefly, BSM cells (a B-cell line homozygous for HLADQ8) were incubated with biotinylated InsB:9-23 with or without unlabeled RI-CT and RI-EXT (FIGS. 4A-4D). Scrambled RI-CT and scrambled RI-EXT were used as negative controls, and as expected did not inhibit the binding of InsB:9-23 to DQ8 expressed on BSM cells (FIGS. 4E-4F). To confirm HLA-DQ8 expression on BSM cells, they were incubated with PE-labeled anti-DQ8 antibody or PE-labeled IgG antibody (negative controls); in addition, BSM cells were incubated with APC-labeled Streptavidin for detection of biotinylated InsB:9-23 binding. Binding of InsB:9-23 peptide to HLA-DQ8 and inhibition by D-peptides was evaluated by flow cytometry. The binding of InsB:9-23 to HLA-DQ8 positive BSM cells was 84.8%, when incubated without D-peptides, whereas in the presence of RI-CT or RI-EXT (but not in the presence of scrambled RI-CT or scrambled RI-EXT) the binding was reduced to 39.4% and 25%, respectively (FIGS. 4A-4F). These results suggest that both D-peptides can block the binding and presentation of InsB:9-23 within HLA-DQ8 to T-cells.

Validation of RI-CT and RI-EXT Using Functional In Vitro Assays

Figure 5A:
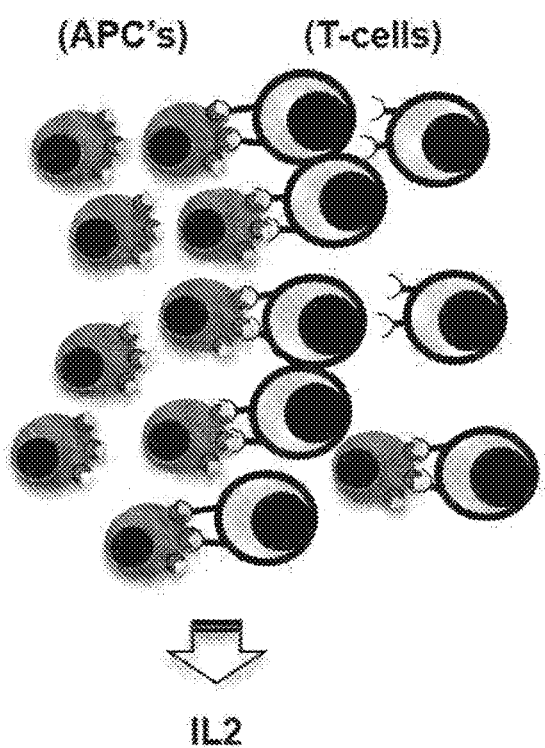
FIGS. 5A-5C show RI-CT and RI-EXT inhibits the production of IL-2 in a mixed lymphocyte reaction (MLR) with BSM cells and 5KC cells. Mixed lymphocyte reaction (MLR) containing BSM cell line (APC's) loaded with InsB:9-23 peptide and a murine T-cell clone (T-cells) expressing a human TCR specific for the InsB:9-23—DQ8 complex (5KC cells) was used to test functionally in vitro the presently disclosed D-peptides (FIG. 5A). In the present system, IL-2 was detected only when BSM cells and 5KC cells were incubated together with InsB:9-23 (FIG. 5B). Both RI-CT or RI-EXT inhibited significantly IL-2 production in the MLR, starting at a concentration of 100 µg/ml and 50 µg/ml respectively (FIG. 5C). CD3/CD28 beads were used as positive control; supernatants were analyzed by Luminex for IL2. Bars represent means±SEM from four to five independent experiments. *$p<0.001$; $p<0.01$; *$p<0.001$ compared to cells not treated with RI-CT or RI-EXT.
Figure 5B:
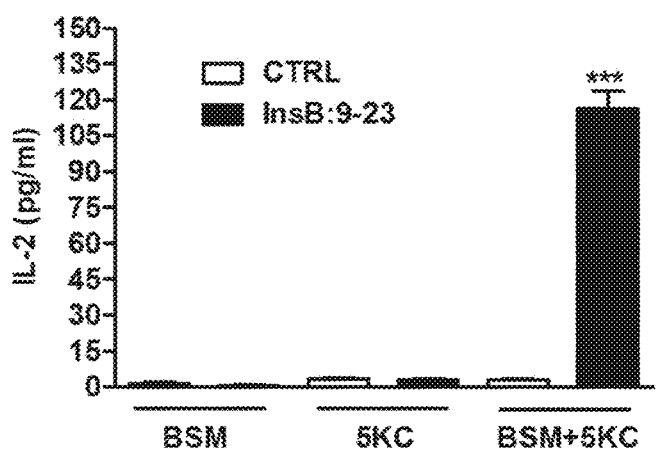
Figure 5C:
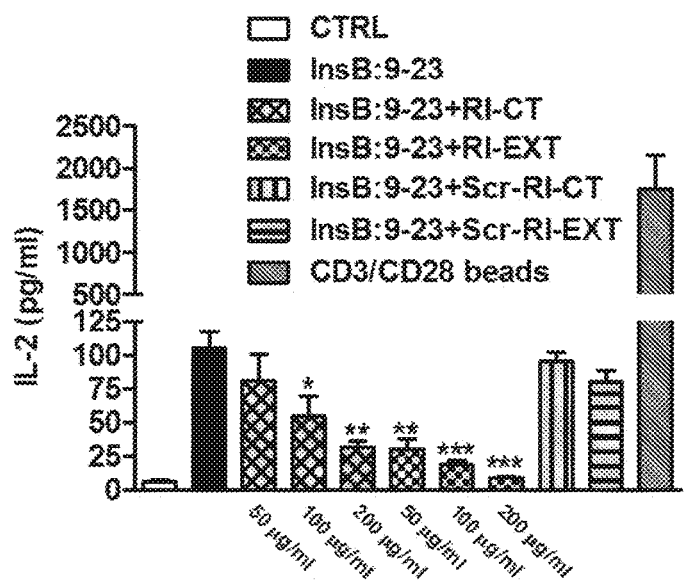
Figure 13A:
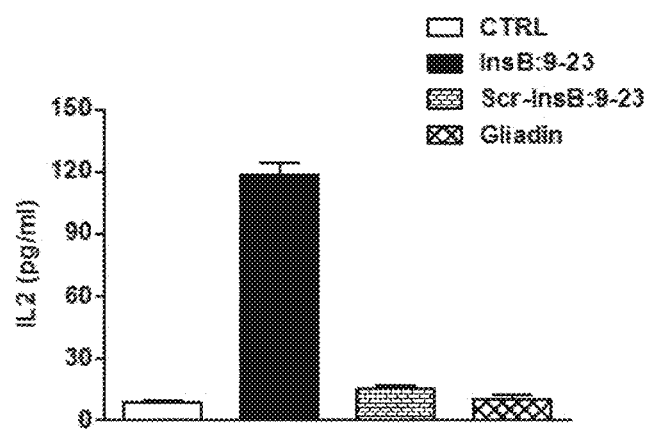
FIGS. 13A-13C show InsB:9-23 activates 5KC cells specifically and dose-dependently. BSM cells were loaded with InsB:9-23 or scrambled-InsB:9-23 or gliadin peptide and 5KC cells were added to the system. IL-2 was detected only when BSM cells and 5KC cells were incubated together with InsB:9-23, and not with scrambled-InsB:9-23 or gliadin (FIG. 13A). Flow assay showing binding of gliadin to DQ8 molecule expressed on BSM cells (FIG. 13B). Dose-dependent InsB:9-23 binding to BSM-DQ8 molecule and 5KC activation (FIG. 13C).
Figure 13B:
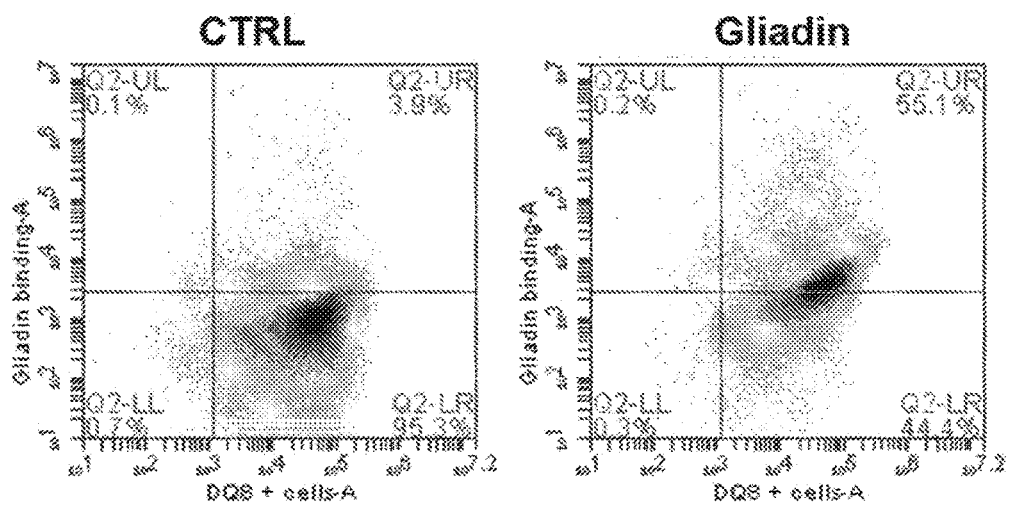
Figure 13C:
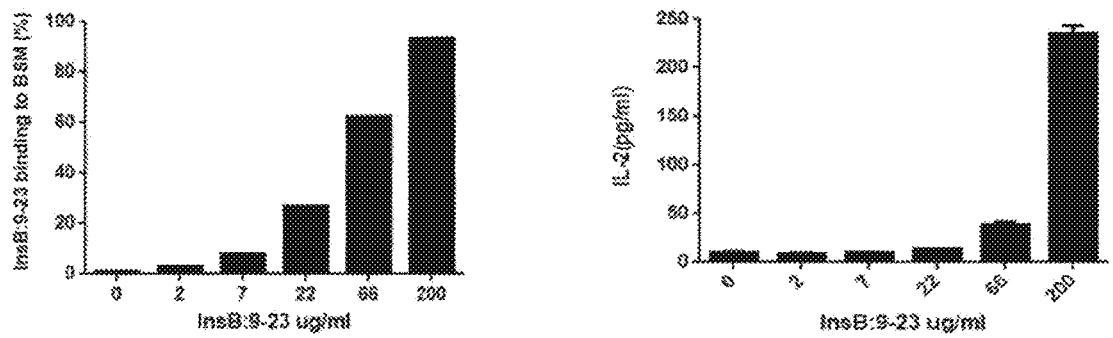

RI-CT and RI-EXT were also tested for their functional activity in inhibiting T-cell activation using an in vitro mixed lymphocyte reaction (MLR) assay. In this MLR assay a murine T-cell clone expressing a human TCR specific was used for the InsB:9-23-DQ8 complex (5KC cells, kindly provided by Dr. Maki Nakayama, University of Colorado School of Medicine, Denver, CO), and the BSM cell line loaded with InsB:9-23 peptide (FIG. 5A). When co-incubated with InsB:9-23 loaded BSM cells the 5KC T-cell clone secreted IL-2 upon engaging the InsB:9-23—DQ8 complex; however, no IL-2 production was seen when BSM cells or 5KC cells were incubated alone with InsB:9-23 (FIG. 5B). As control peptides scrambled InsB:9-23 and gliadin were used, and neither induced IL-2 secretion in 5KC cells (FIG. 13A); interestingly, even though gliadin was able to bind DQ8 expressed on BSM cells it did not activate 5KC cells to produce IL-2 (FIG. 13B), confirming the specificity of the present system. Moreover, InsB:9-23 bound to HLA-DQ8 expressed on BSM cells and activated 5KC cells in a dose-dependent manner (FIG. 13C). Both RI-CT or RI-EXT significantly inhibited IL-2 production in this MLR system at concentrations of >100 µg/ml and >50 µg/ml, respectively, confirming their ability to block TCR engagement to the InsB:9-23—DQ8 complex. Therefore, both peptides were further tested using mouse models.

Figure 6A:
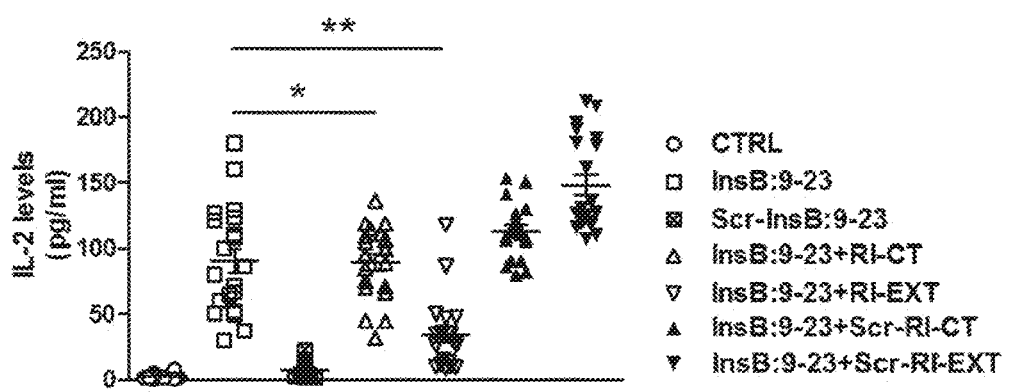
FIGS. 6A-6C show the ex vivo effect of RI-CT and RI-EXT. SJL-DQ8 mice were immunized subcutaneously with InsB:9-23 in CFA on day 1 and on day 8. 9 days after the second immunization (day 17) mice were sacrificed (FIGS. 6A-6C). Splenocytes isolated from SJL-DQ8 mice were stimulated with InsB:9-23 or with scrambled InsB:9-23 as negative peptide and incubated with RI-CT or RI-EXT (scrambled RI-CT or RI-EXT were used as negative peptides). Supernatants were analyzed by Luminex for IL-2 and IFN-γ (FIGS. 6A, 6B). Inhibition of T-cell proliferation by RI-CT or RI-EXT was analyzed by the CFSE assay after stimulation of splenocytes with InsB:9-23 with or without addition of RI-CT or RI-EXT. Both D-peptides significantly decreased proliferation induced by InsB:9-23 (FIG. 6C).
Figure 6B:
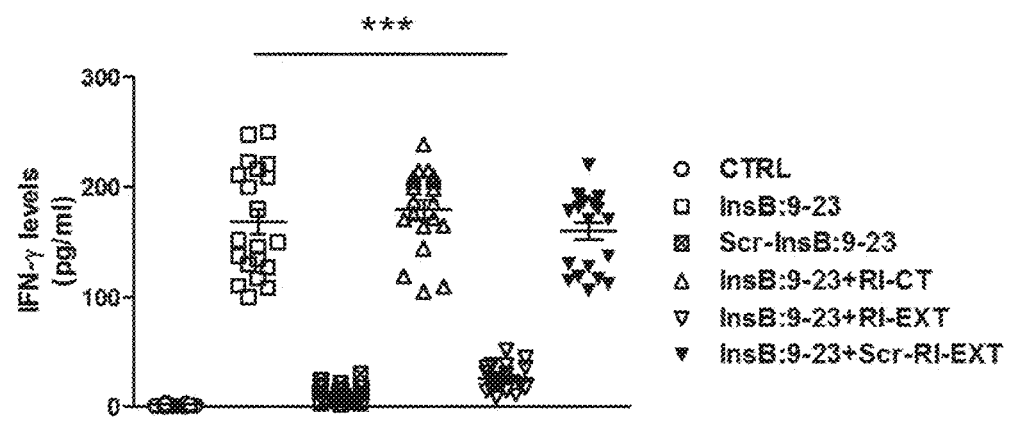
Figure 6C:
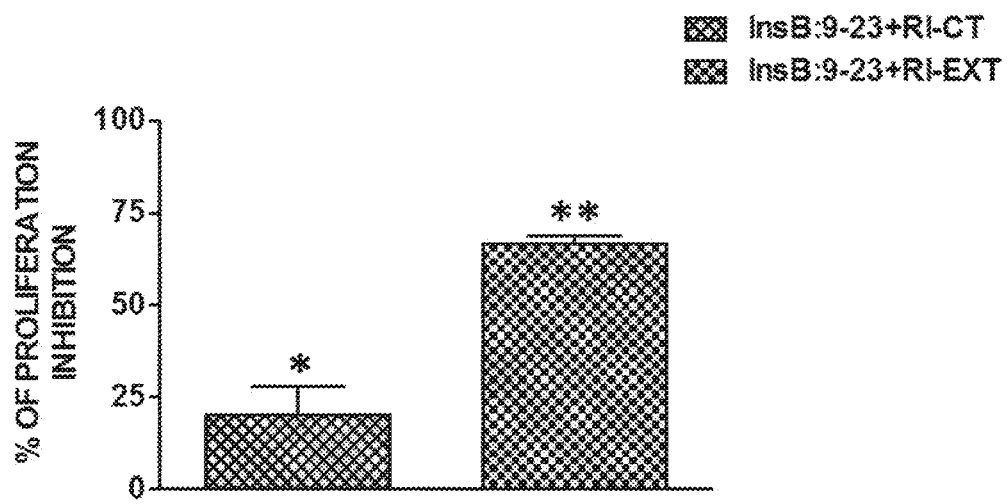
Figure 7A:
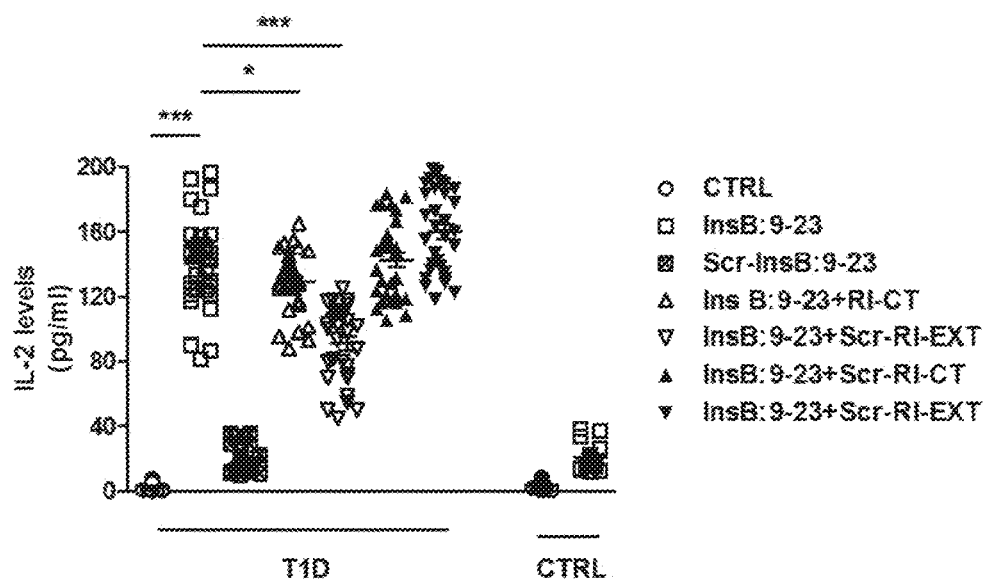
FIGS. 7A-7C show the effect of RI-CT and RI-EXT in hPBMCs. hPBMCs were isolated from new onset DQ8 positive T1D patients or DQ8 positive controls and were stimulated for 48 h with InsB:9-23, with or without RI-CT and RI-EXT (scrambled InsB:9-23, RI-CT or RI-EXT were used as negative peptides). The production of IL-2 and IFN-γ were assessed by Luminex. RI-CT and RI-EXT significantly decreased T-cells activation induced by InsB:9-23, whereas scrambled RI-CT or RI-EXT had no effect. *$p<0.001$; $p<0.01$; *$p<0.001$ compared to cells not treated with RI-CT or RI-EXT (FIGS. 7A, 7B). Inhibition of T-cell proliferation by RI-CT or RI-EXT was analyzed by the CFSE assay after stimulation of hPBMCs with InsB:9-23 with or without addition of RI-CT or RI-EXT. Both D-peptides significantly decreased proliferation induced by InsB:9-23 in PBMCs isolated from DQ8-T1D patients (FIG. 7C).
Figure 7B:
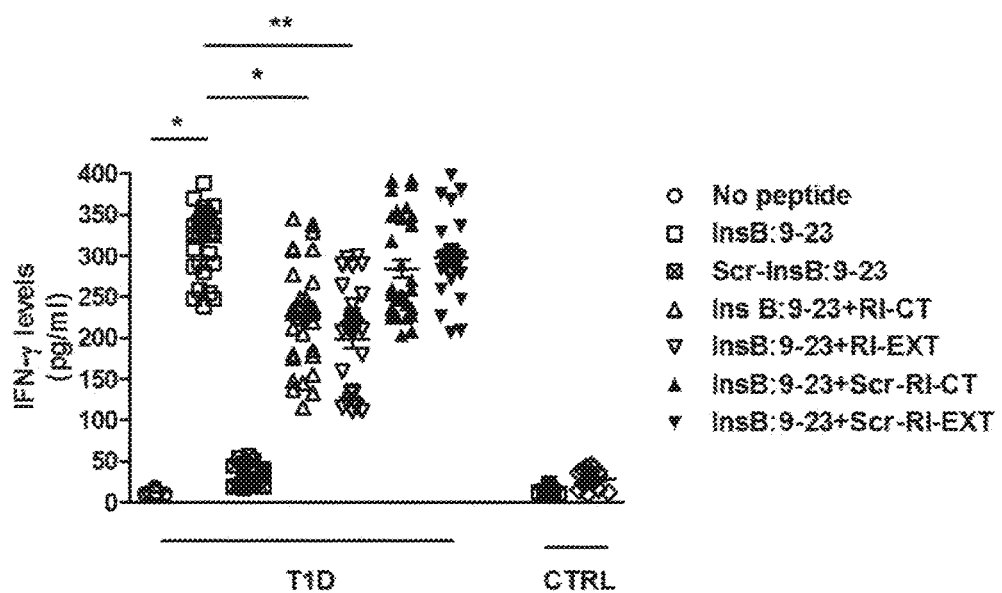
Figure 7C:
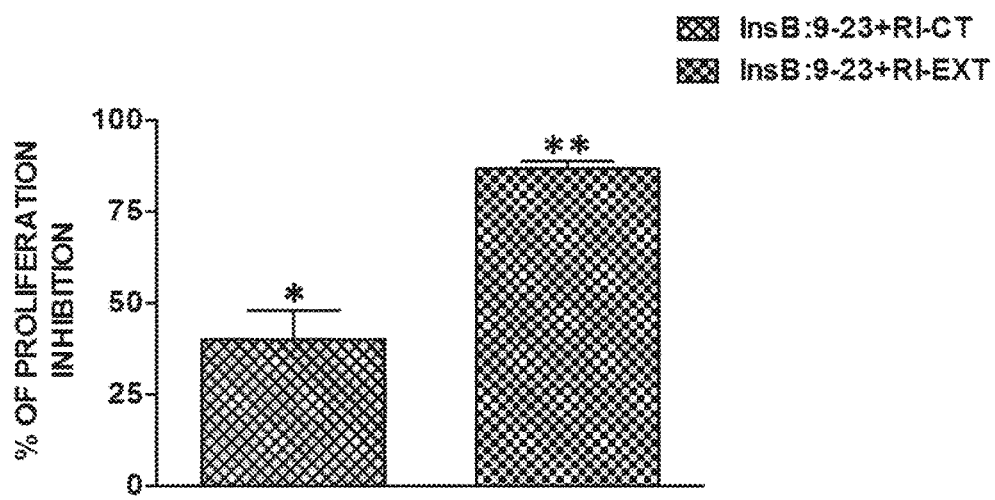
Figure 14A:
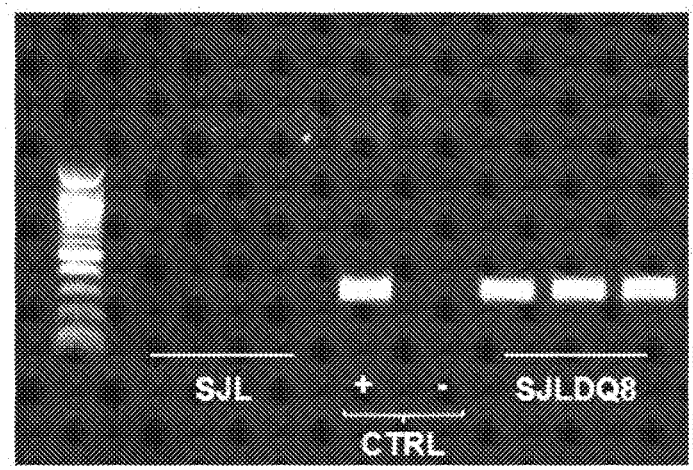
FIGS. 14A-14C show the HLA-DQ8 molecule is mainly expressed on APC cells in SJL-DQ8 mice. PCR and flow analysis confirming the presence of the transgene in SJL-DQ8 mice compared to wt SJL mice (FIGS. 14A, 14B). Flow assay showing the expression of HLA-DQ8 molecule in splenocytes isolated from SJL-DQ8 mice (FIG. 14C).
Figure 14B:
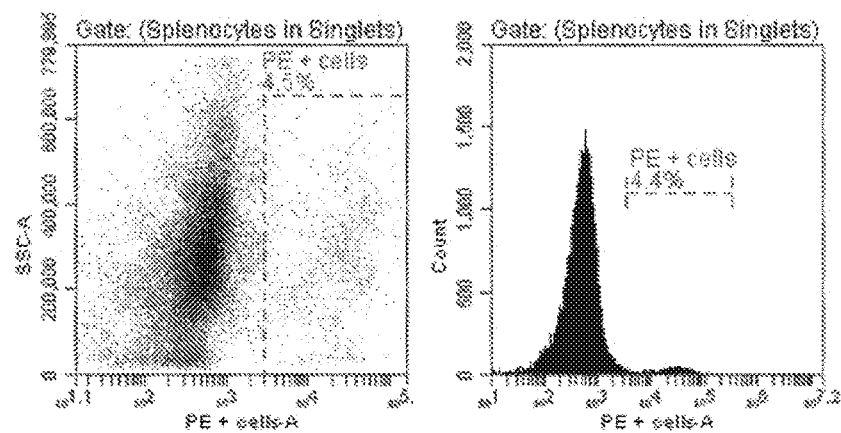
Figure 14B:
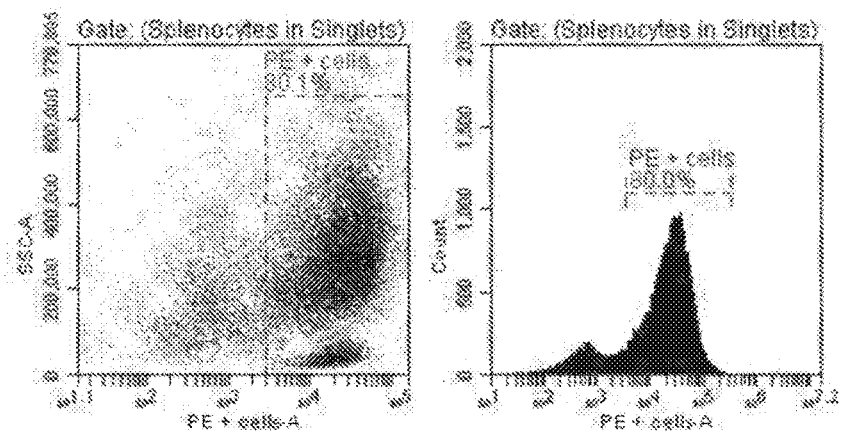
Figure 14C:
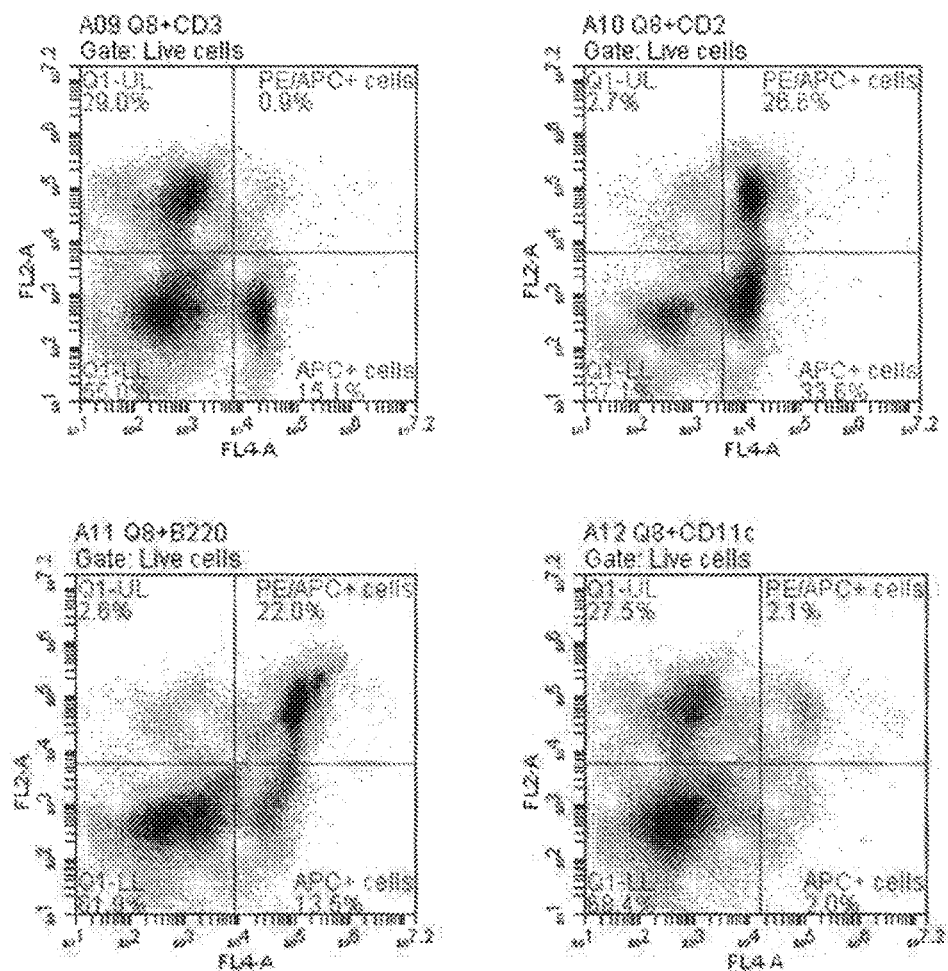
Figure 15A:
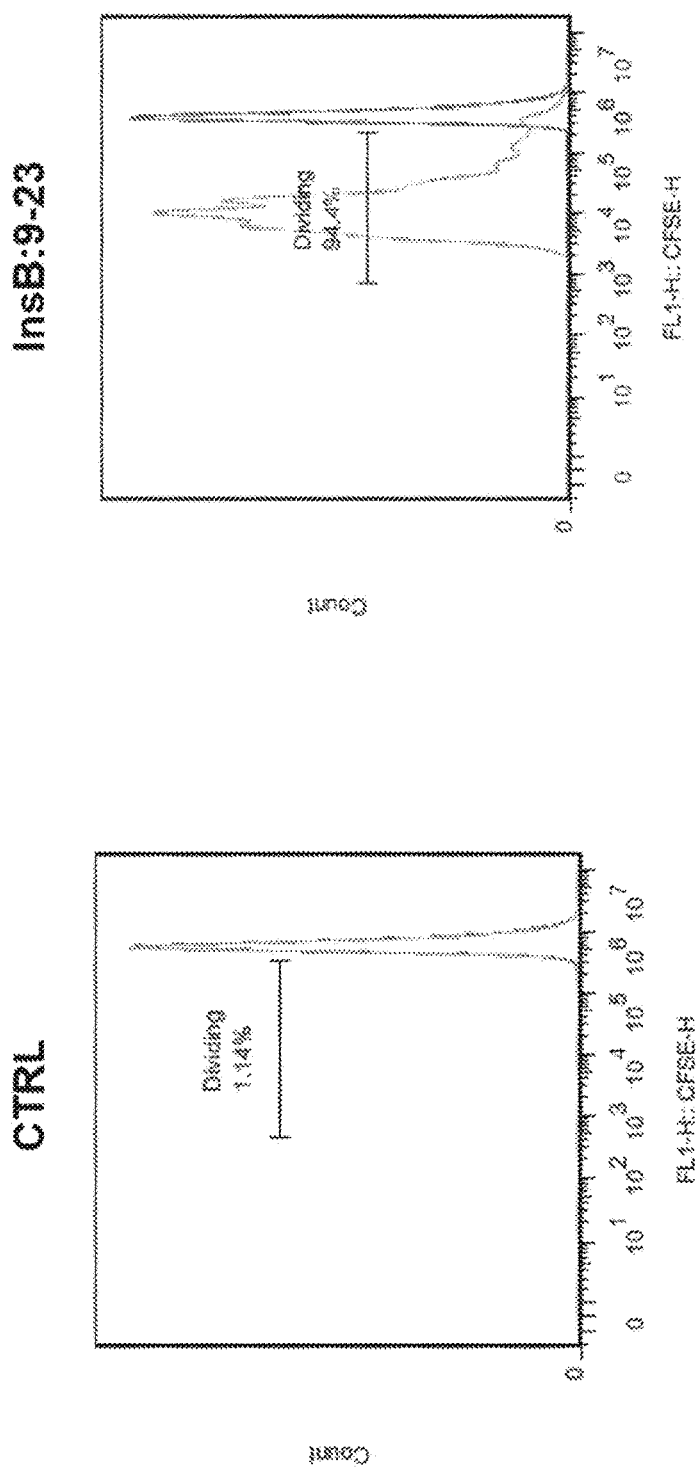
FIGS. 15A-15B show RI-CT and RI-EXT significantly suppressed InsB:9-23 induced cell proliferation in DQ8-splenocytes. Flow cytometry results of inhibition of T-cell proliferation by RI-CT or RI-EXT from a representative mouse injected with InsB:9-23. T-cell proliferation was analyzed by the CFSE assay after stimulation with InsB:9-23 with or without addition of D-peptides. Both RI-CT and RI-EXT significantly suppressed InsB:9-23 induced cell proliferation (FIGS. 15A, 15B).
Figure 15B:
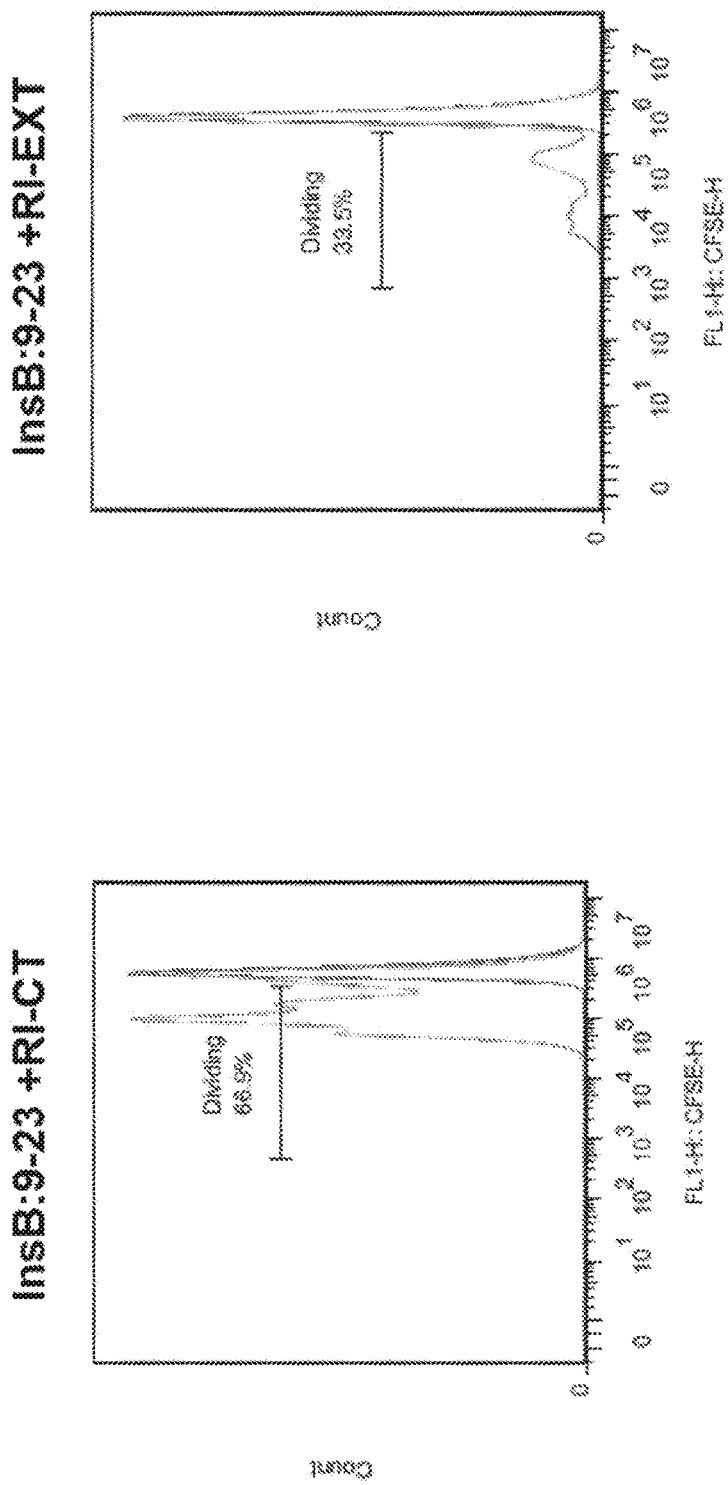
Figure 16A:
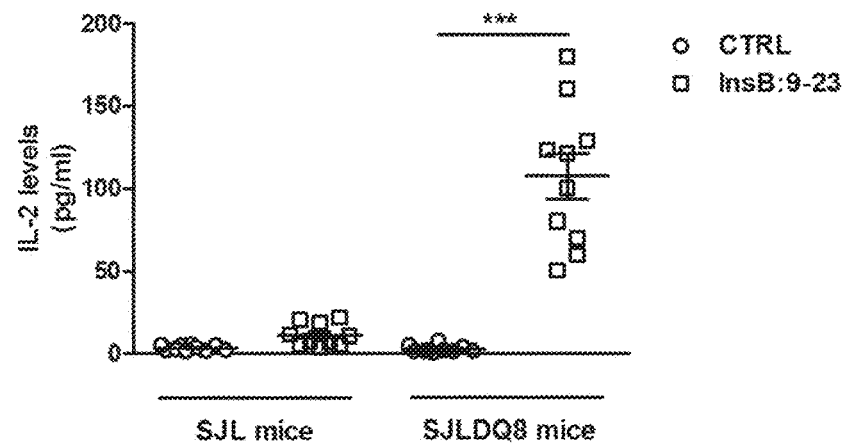
FIGS. 16A-16B show InsB:9-23 is specifically presented to T-cells by human HLA-DQ8. SJL and SJL-DQ8 mice were immunized subcutaneously with InsB:9-23 in CFA on day 1 and on day 8. 9 days after the second immunization (day 17) mice were sacrificed (FIGS. 16A, 16B). Splenocytes isolated from SJL or SJL-DQ8 mice were stimulated with InsB:9-23 and the supernatants were analyzed by Luminex for IL-2 (FIG. 16A) and IFN-γ (FIG. 16B). Only in SJL-DQ8 mice InsB:9-23 significantly induced T-cells activation.
Figure 16B:
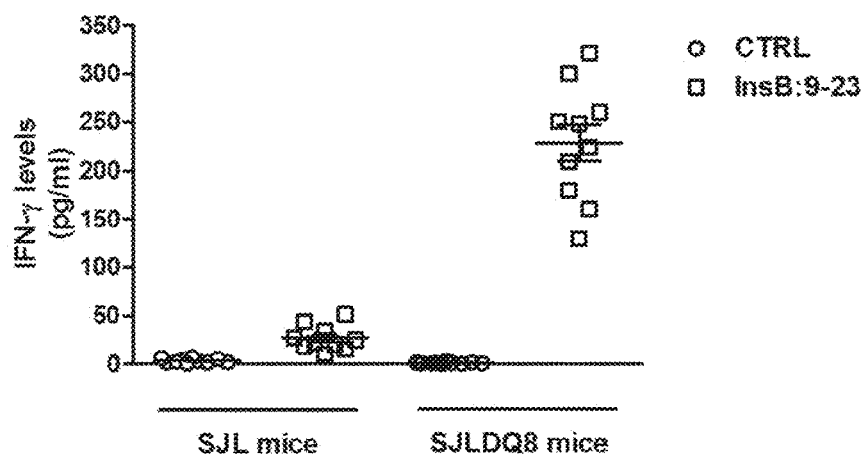
Figure 17A:
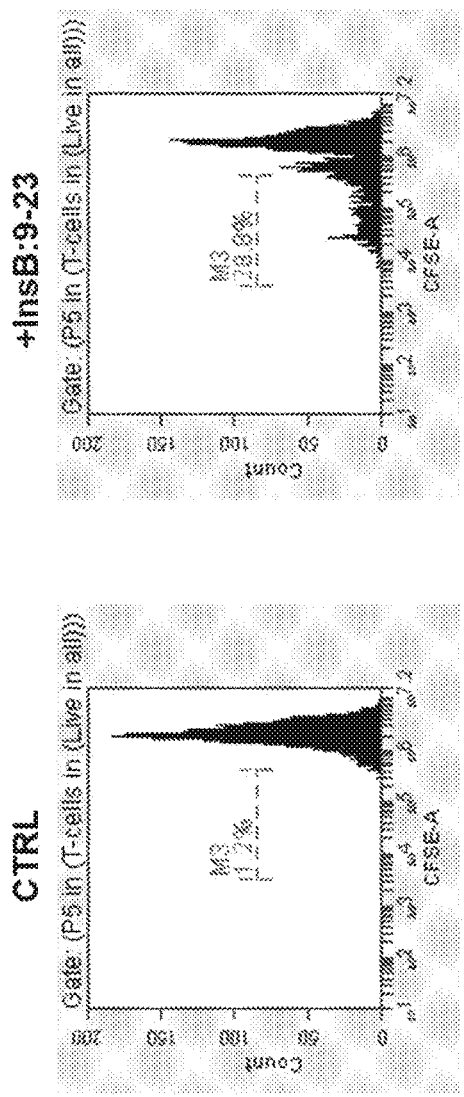
FIGS. 17A-17B show RI-CT and RI-EXT significantly suppressed InsB:9-23 induced cell proliferation in DQ8-PBMCs isolated from T1D patients. Flow cytometry results of inhibition of T-cell proliferation by RI-CT or RI-EXT from DQ8-PBMCs isolated from a new onset T1D patient. T-cell proliferation was analyzed by the CFSE assay after stimulation with InsB:9-23 with or without the addition of D-peptides. Both RI-CT and RI-EXT significantly suppressed InsB:9-23 induced cell proliferation in DQ8-hPBMCs (FIGS. 17A, 17B).
Figure 17B:
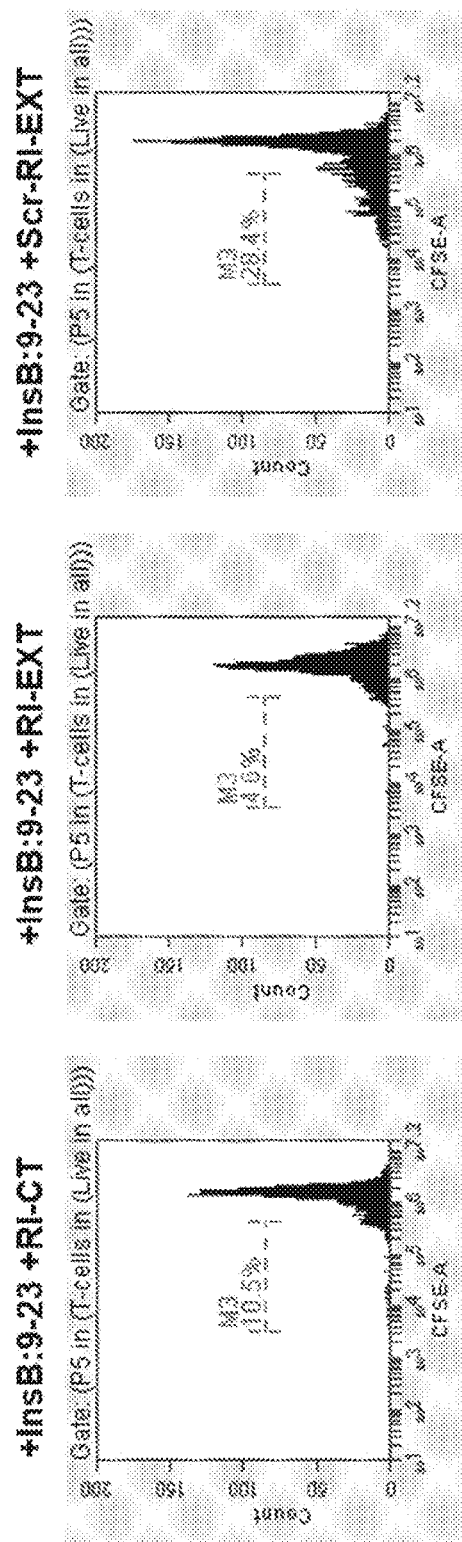

RI-CT and RI-EXT Block T-Cell Activation by InsB:9-23 Ex Vivo in a Humanized Mouse Model of Autoimmunity to Islet Antigens To test the effects of the RI-CT and RI-EXT D-peptides ex vivo T-cell activation was induced to the insulin peptide in SJL-DQ8 mice by immunizing them with InsB:9-23 peptide in CFA. The presence of the HLA-DQ8 transgene in SJL-DQ8 mice was confirmed by PCR and by flow cytometry analysis (FIGS. 14A-14B). Moreover, it was confirmed by flow cytometry that in splenocytes isolated from SJL-DQ8 mice the HLA-DQ8 molecule was expressed mostly on APCs (FIG. 14C). Splenocytes from immunized SJL-DQ8 mice were incubated with InsB:9-23 with or without RI-CT or RI-EXT. As negative control for splenocyte stimulation by InsB:9-23 the splenocytes were stimulated with scrambled InsB:9-23, and as negative control for the D-peptides scrambled RI-CT and RI-EXT were used. Both D-peptides significantly blocked IL-2 production by splenocytes isolated from InsB:9-23-immunized mice but only RI-EXT significantly blocked IFN-γ production; scrambled D-peptides had no effect in inhibiting cytokine production (FIGS. 6A-6B). In addition, T-cell proliferation (analyzed by the CFSE assay) was significantly suppressed by both RI-CT and RI-EXT (FIGS. 6C, 15A, and 15B). Of note, using wild type (WT) SJL mice as a control mouse line, it was demonstrated that InsB:9-23 is specifically presented to T-cells by the human HLA-DQ8 and not by the murine MHC class II; indeed in WT SJL mice immunized with InsB:9-23 a significant T-cell activation was not observed when compared to SJL-DQ8 mice (FIGS. 16A-16B).

RI-CT and RI-EXT Block T-Cell Activation by InsB:9-23 in PBMCs Isolated from Recent-Onset T1D Patients To test the effects of RI-CT and RI-EXT on human T-cells from T1D patients an ex vivo functional MLR assay was used. Briefly, PBMCs were isolated from HLA-DQ8 positive T1D patients with no longer than 2-year duration, (in order to maximize the likelihood that they retain strong T-cell responses to InsB:9-23) (33); T1D patients with longstanding disease that lost their T-cell responses to islet antigens were used as controls. Thirty T1D patients and 17 control patients (all typed and confirmed to be HLA-DQ8 positive) were recruited at the Pediatric Endocrine clinic at Children Hospital at Montefiore and at the Mount Sinai Diabetes Center, NY (34); their PBMCs were isolated and stimulated with InsB:9-23 with or without RI-CT or RI-EXT. Scrambled InsB:9-23 and scrambled RI-CT and scrambled RI-EXT were used as control peptides. T-cell activation was assessed by their proliferative responses (using the CFSE assay) and by their cytokine production (using the Luminex assay) in an MLR assay as previously described (35). Both RI-CT and RI-EXT significantly suppressed pro-inflammatory cytokine production (IL-2 and IFN-γ) and T-cell proliferation, while scrambled D-peptides had no effect on cytokine production and T-cell proliferation (FIGS. 7A-7C and 17A-17B). Taken together, the results indicate that these D-peptides specifically inhibit InsB:9-23 presentation by HLA-DQ8 to T-cells in cells from T1D patients.

RI-EXT Blocks T-Cell Activation by InsB:9-23 In Vivo

Figure 8A:
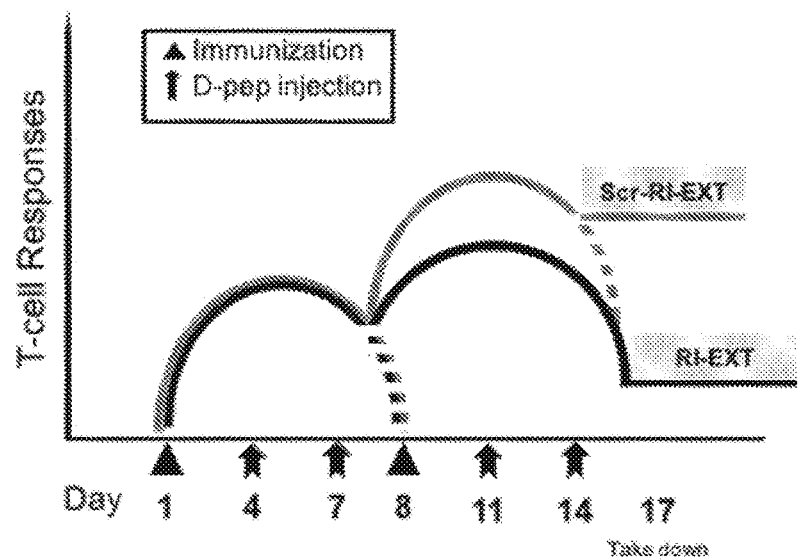
FIGS. 8A-8C show RI-EXT blocks activation of T-cells to InsB:9-23 in vivo. 20 DQ8 mice were immunized subcutaneously with InsB:9-23 in CFA on day 1 and on day 8. At days 4, 7, 11, and 14 mice were injected with RI-EXT or scrambled RI-EXT (as controls). 9 days after the second immunization (day 17) mice were sacrificed (FIGS. 8A-8C). Splenocytes isolated from SJL-DQ8 mice were stimulated with InsB:9-23 or with scrambled InsB:9-23 as negative peptide (PMA/Ionomycin was used as positive control). Supernatants were analyzed by Luminex for IL-2 and IFN-γ. RI-EXT significantly blocked the InsB:9-23 induced activation of T-cells of InsB:9-23-immunized mice. There was no significant decrease of T-cell proliferation in response to scrambled RI-EXT (FIGS. 8B, 8C).
Figure 8B:
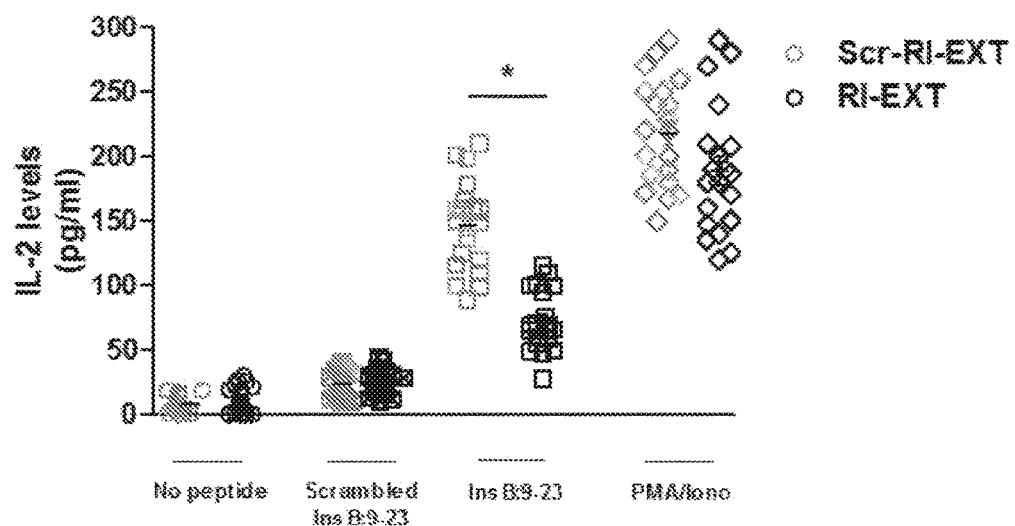
Figure 8C:
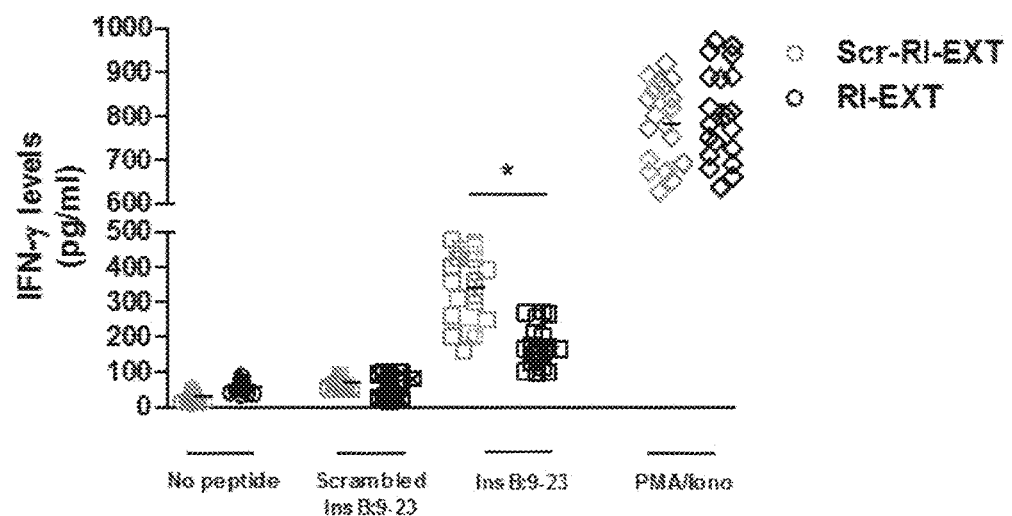
Figure 9:
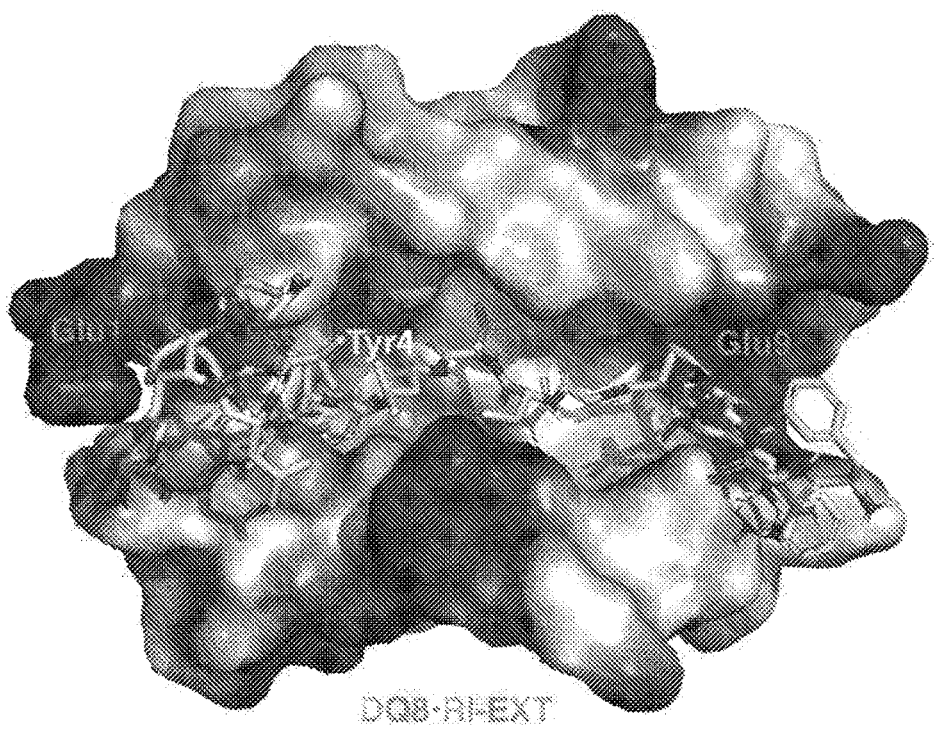
FIG. 9 shows a representative structure of RI-EXT bound to the groove of DQ8. The critical residues Glu1, Tyr4, and Glu9 are labeled. The surface of the groove depicts the electrostatic potential. Clearly, the electrostatic potential in pockets of Glu1 and Glu9 is positive consistent with the selectivity of these pockets for negatively charged residues. The deep pocket of Tyr4 is neutral and mostly consists of hydrophobic residues.
Figure 10:
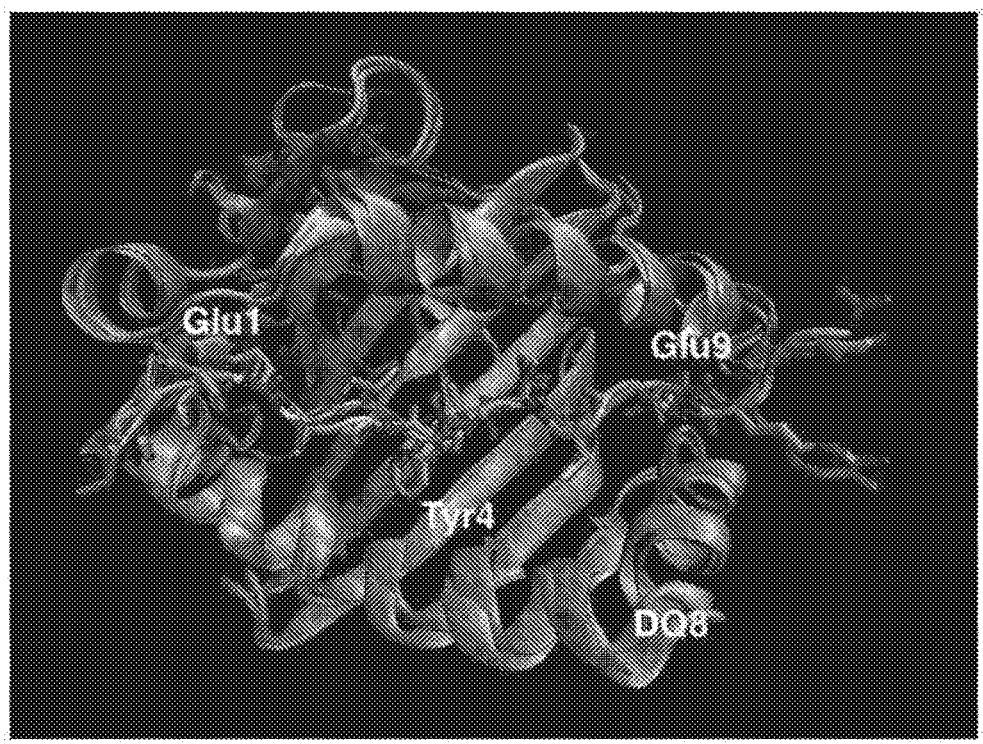
FIG. 10 shows the representative structure of INS-CT-DQ8 (purple/grey) complex superimposed on the RI-CT-DQ8 complex. Highlighted are the three important residues Glu1, Tyr4 and Glu9, which are superimposed in both complexes. Note that the backbones run in opposite direction.

The inhibitory effects of the most active D-peptide, RI-EXT, were tested in vivo using the SJL-DQ8 humanized mouse model of islet autoimmunity. Mice were injected with RI-EXT (or scrambled RI-EXT as negative control peptide) intraperitoneally (IP) at days 4, 7, 11, and 14 after immunizing them twice with InsB:9-23 in CFA on days 1 and 8 (FIG. 8A). Mice were sacrificed on day 17 and splenocytes were isolated and tested for their responses to InsB:9-23 or scrambled InsB:9-23. Treating the mice with RI-EXT IP after immunizations significantly blocked the activation of T-cells by InsB:9-23 in the mice immunized with InsB:9-23 As predicted, IP injections of scrambled RI-EXT peptide did not block T-cell activation in vivo (FIGS. 8B-8C). A representative structure of RI-EXT bound to the groove of DQ8 is represented in FIG. 9.

Discussion

T1D is caused by autoimmune responses targeting the β-cells that lead to the killing and/or silencing of beta cells by various immune effectors mechanisms, including CD8+ cytotoxic T-cells, macrophages, and cytokines (36). Therefore, the best approach to cure and/or prevent the disease will have to be through immune modulation to suppress the immune effector mechanisms that target the β-cells. Indeed several non-targeted immune therapies have been examined in pre-clinical and clinical testing (20-22), such as anti-CD3 MAb (37) and Rituximab (38). However, they have unacceptable toxicity from generalized immunosuppression and/or were ineffective (39). Moreover, in some organ-specific autoimmune diseases, such as multiple sclerosis, non-targeted immune therapies resulted in devastating complications (40), demonstrating that this approach has a limited role in organ specific autoimmune diseases such as T1D. To avoid the toxicity and improve efficacy new targeted approaches to block the immune attack on β-cells are needed. For the first time, it is shown herein that uniquely designed D-peptides can block pathogenic TCR activation by self-antigen-MHC class II complexes. The present approach may provide a novel tool for preventing and potentially reversing T1D as well as other autoimmune conditions that are strongly associated with HLA class II. Such an approach is both specific as only the pathogenic peptides will be blocked from activating T-cells, and personalized since only individuals carrying the HLA-DQ8 allele will be treated.

There are many advantages of the instant method, which utilizes D-peptides: (1) their unique properties enable them to bind to the HLA-DQ8 pocket with higher affinity compared to L-peptides because their backbone forms alternate hydrogen bonding with the HLA pocket; (2) D-peptides are resistant to degradation by proteases and have a much longer half-life than L-peptides; (3) the contact residues of D-peptides with the T-cell receptor (TCR) will not activate the TCR and instead block T-cell activation; (4) D-peptides are much less likely to be antigenic in vivo (17, 41) compared to L-peptides (37) and therapeutic antibodies; and (5) D-peptides are manufactured chemically and can be engineered to improved stability, affinity, and pharmacokinetic profiles (ADME). Thus, D-peptide have significant advantages over small molecules based drugs or therapeutic monoclonal antibodies (42). These results demonstrate the instant approach inhibits specific pockets of HLA-DQ8. Moreover, rational refinement based on physical principles may lead to even better inhibitors. This approach can also use D-peptides to block other HLA proteins involved in autoimmune diseases.

Here are shown peptides to prevent and/or reverse the autoimmune response targeting the beta cells in T1D, by focusing on blocking HLA-DQ8 in view of the well-known association of HLA class II, and specifically HLA-DQ8, with T1D. The HLA class II locus confers ~40-50% of the heritable risk for T1D (43, 44), and the key haplotypes associated with T1D in Caucasians are DQ2-DRB1*03 and DQ8-DRB1*04 (16, 44, 45). These haplotypes confer about 5% lifetime risk for T1D in the general population and approximately 20% risk in siblings of T1D patients (46, 47). These genetic associations reflect the key role that HLA class II proteins, DQ2 and DQ8, play in the etiology of T1D, specifically in the presentation of pathogenic islet peptides to CD4+ T-cells (48). Furthermore, the focus was on blocking the InsB:9-23 peptide since it binds selectively to HLA-DQ8 and it has been shown to be a major T-cell epitope in T1D (10, 15, 49). Studies performed by Eisenbarth and colleagues (49-51) and confirmed by others (52), have shown that the insulin peptide InsB:9-23 is a major peptide activating diabetogenic CD4+ T-cells, that escaped tolerance, and triggering the autoimmune response to the beta-cells. Even though several GAD65 peptides have also been implicated in the etiology of T1D transfer of anti-GAD65 T-cells does not transfer disease in mouse models (53-55). These results notwithstanding, GAD65 is believed to play a role in modulating (e.g., influencing, increasing or decreasing the severity of) T1D. Indeed, insulin antibodies are significantly associated with young age of onset of T1D with the highest frequency seen in patients<6-year-old (56), further supporting the notion that insulin-producing cells are the earliest target of the immune response in T1D. Also, epidemiological studies have shown a significant association between the presence of insulin antibodies and HLA-DQ8, corroborating the key role played by HLA-DQ8 in the presentation of insulin peptides to CD4+ T-cells (56). These findings suggest that the HLA-DQ8-InsB:9-23 complex is a key trigger of T1D in HLA-DQ8 positive individuals, and is therefore a potential target to block the activation of diabetogenic T-cells. The present results confirm the importance of the InsB:9-23-HLA-DQ8 complex in triggering T1D in DQ8 carrying individuals, and demonstrate that blocking this complex by D-peptides shows promise as a new therapeutic and/or prevention strategy in T1D.

The most potent D-peptide identified herein is RI-EXT; it was able to bind the HLA-DQ8 molecule and block InsB: 9-23 peptide presentation by HLA-DQ8 and T-cell activation both ex vivo and in vivo in a "humanized" (DQ8) mouse. Moreover, RI-EXT significantly inhibited T-cell islet peptide recall responses of T-cells when incubated with PBMCs from recent-onset T1D patients. If the results can be extended to treating humans in vivo, RI-EXT or a modification of it could potentially be used for the treatment of T1D in individuals that are positive for DQ8. Thus, the data lay the foundation for selective targeting of Class II molecules as a novel therapeutic approach in T1D as well as other autoimmune diseases. Importantly, this therapy would be specific to the cause of T1D, without triggering a general immunosuppression, and could be tailored to a specific patient population.

D-peptides have shown great promise as a novel approach to target different proteins in several diseases. For example, Uppalapati et al. have designed an effective D-peptide antagonist of VEGF-A (57). Similarly, D-peptides have been designed to target p53 as a potential therapy for certain cancers (58), amyloid-β peptide as a therapy for Alzheimer's disease (AD) (59), c-Myc as inhibitors of proliferation (60), and α-synuclein as a potential therapy for Parkinson's disease (61). Moreover, D-peptides have been developed for autoimmune diseases by targeting co-stimulatory molecules (62). However, this may be the first study to use D-peptides to target MHC class II molecules as a potential therapy for autoimmune diseases. Indeed, in principle the present approach can be extended beyond T1D into any autoimmune disease in which MHC class II was shown to play a critical role, such as autoimmune thyroid diseases (63).

There are several potential negative effects to using D-peptides to block MHC class II as a novel approach to treating/preventing autoimmunity. First, the D-peptides themselves may potentially amplify the autoimmune response. While this is a potential concern, most studies have shown that retro-inverso D-peptides are significantly less immunogenic than the corresponding L-peptides (57, 64, 65). This is also supported by the results showing that D-peptides do not activate TCR. Another concern is that blocking MHC class II will create generalized immunosuppression. However, this is unlikely because heterozygote individuals carry 6 HLA class II alleles (2 DR, 2 DQ, and 2 DP) and in the present approach only one allele is blocked out of the 6 or 17%. Even in homozygote individuals this approach will not block more than 33% of the alleles. Therefore, it is unlikely that blocking HLA-DQ8 with the presently disclosed D-peptides will induce a generalized immunosuppression.

It is well-established that autoimmune responses (as well as normal immune responses) propagate by epitope spreading (66) resulting in T-cell targeting of additional islet antigens and epitopes in T1D (67). Therefore, one might argue that targeting only the HLA-DQ8-InsB:9-23 peptide may not be effective since T-cells targeting other antigens and epitopes will not be blocked. However, epitope spreading is the result of tissue damage but does not trigger or perpetuate the autoimmune attack on the islets. In fact, Prasad and colleagues have recently shown that blocking InsB:9-23 can reverse the autoimmune response in NOD mice even after epitope spreading has begun (68). This is also evident in the case of Celiac disease where the autoimmune response propagates from gliadin to tissue transglutaminase (TTG) as epitope spreading develops (69), yet removal of gliadin from the diet reverses the autoimmune responses against all antigens and epitopes, and results in complete remission even in late stages of the disease (70). Similarly, Ji et al. have shown that blocking the dominant epitope in multiple sclerosis (MOG35-55 peptide) reverses experimental autoimmune encephalitis even after epitope spreading has occurred and the disease was established (71).

Taken together, these data strongly support the possible outcome that targeting the dominant epitope in T1D, i.e., InsB:9-23 peptide, and blocking its presentation to T-cells will halt the autoimmune responses in T1D even when other antigens such as GAD, IA-2, and ZnT8 (72) become targeted by epitope spreading (73). Because of epitope spreading, the timing of the therapeutic intervention using the D-peptide RI-EXT is an important consideration, because patients at earlier stages of the disease would likely have greater clinical benefit.

In summary, a novel therapeutic approach has been developed to block the autoimmune responses in T1D using D-peptides targeting the HLA-DQ8-InsB:9-23 interaction. Such an approach is both specific and personalized and will most likely not result in global immunosuppression. Moreover, it can be expanded to patients with other autoimmune diseases associated with HLA class II alleles (e.g., DR3, DQ2). Therefore, the present approach holds great promise as a new strategy to treat T1D and potentially autoimmunity in general.

Example 2

Effect of D-Peptides Ex Vivo in SJL-DQ8 Mice Injected with GAD65

Interpretation of Results

The aim of these experiments was to test whether RI-EXT and RI-CT block other type 1 diabetes peptides from binding to HLA-DQ8 and stimulating T-cells. It has been shown that they block activation of T-cells by InsB:9-23, which is the main insulin peptide that triggers type 1 diabetes. Another peptide derived from GAD65 was tested and the results described herein.

Figure 18:
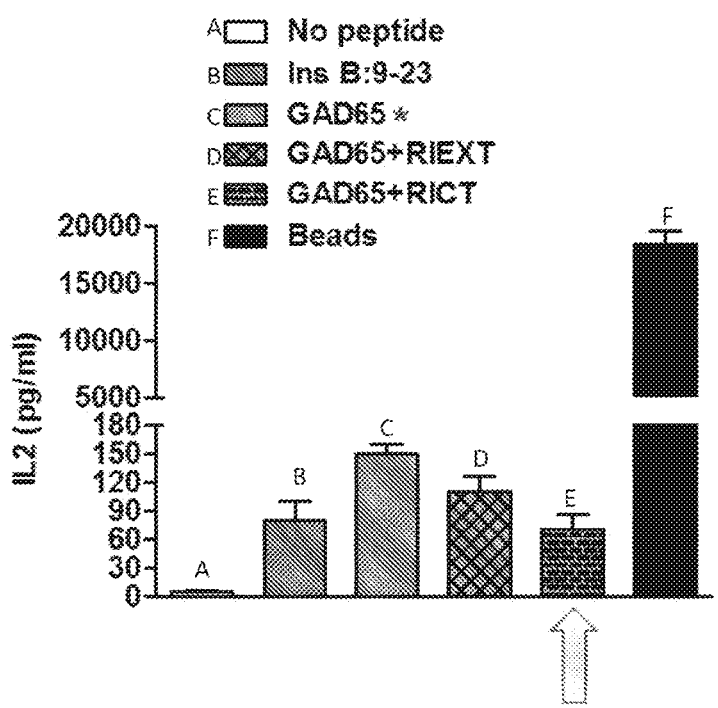
FIG. 18 shows the effect of D-peptides in blocking ex vivo T-cell activation to GAD65 peptide that was used to immunize SJL-DQ8 mice (T-cell activation was measured by their IL-2 production).
Figure 19:
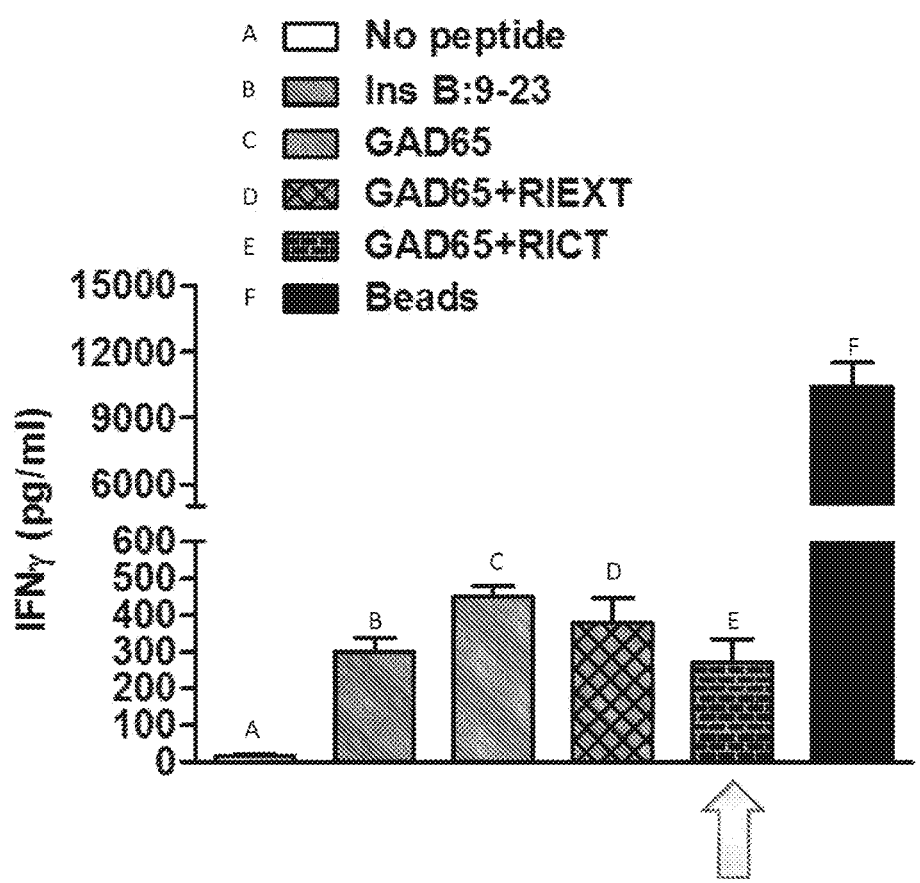
FIG. 19 shows the effect of D-peptides in blocking ex vivo T-cell activation to GAD65 peptide that was used to immunize SJL-DQ8 mice (T-cell activation was measured by their IFNγ production).
Figures 20, 21:
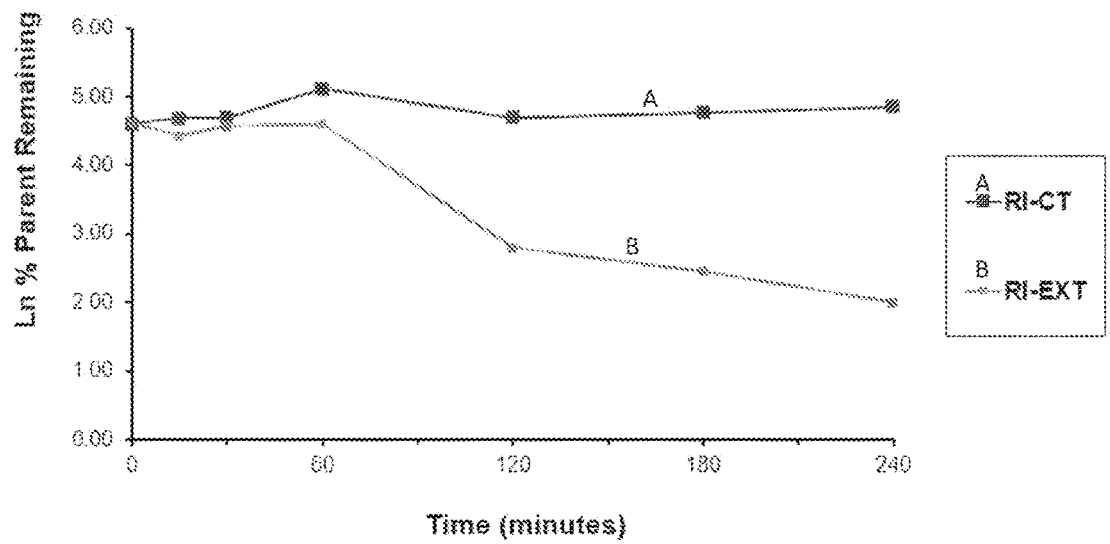
FIG. 20 is a table showing the half-life and intrinsic clearance of RI-CT and RI-EXT (1 μM) after incubation with mouse hepatocytes. Interpretation of the data: RI-CT has higher metabolic stability compared to RI-EXT and there is little/no consumption of the peptide after 4 hours of incubation with murine hepatocytes. RI-EXT has a half-life of nearly 1 hour which is also excellent and much longer than L-peptides that usually have half-lives of <30 minutes.
FIG. 21 is a graph showing the Ln of % RI-CT and RI-EXT remaining after incubation with mouse hepatocytes vs. time plot.
Figure 22A:
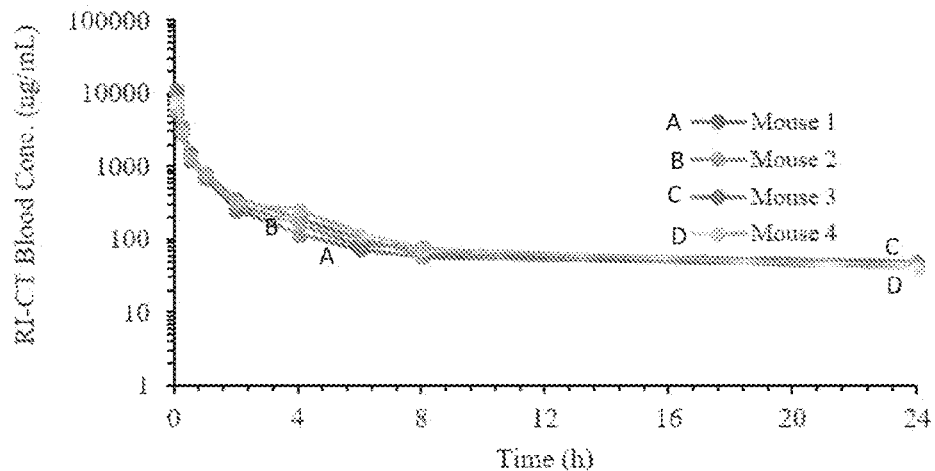
FIGS. 22A-22B shows the pharmacokinetics of RI-CT in male CD-1 mice following a single discrete intravenous bolus. Dose of 10 mg/kg and a single discrete subcutaneous dose of 10 mg/kg.
Figure 22B:
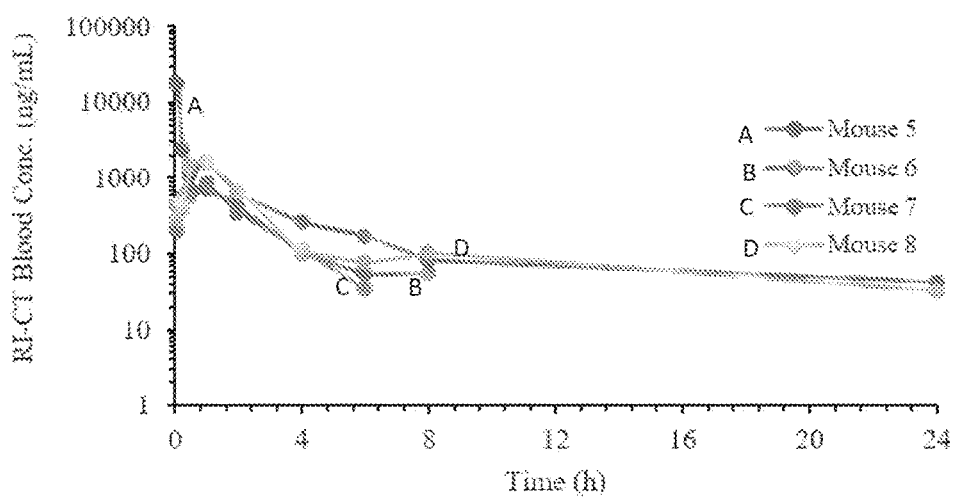
Figures 23A, 23B:
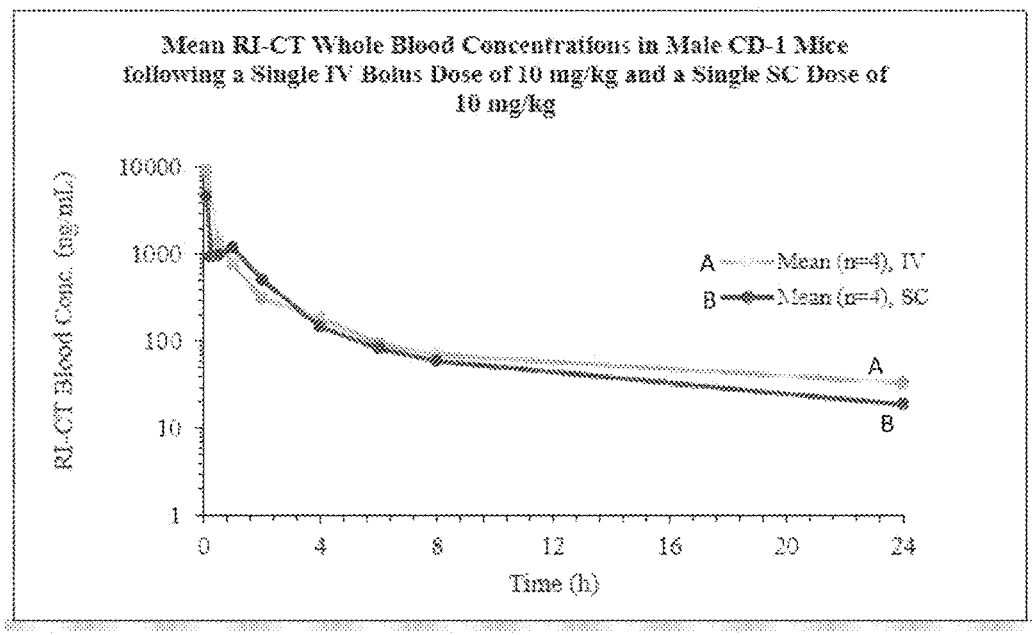
FIG. 23A shows the pharmacokinetics of RI-CT in male CD-1 mice following a single discrete intravenous bolus. Data from a dose of 10 mg/kg and a single discrete subcutaneous dose of 10 mg/kg are shown.
FIG. 23B is a graph showing mean RI-CT whole blood concentrations in male CD-1 mice following a single IV bolus dose of 10 mg/kg and a single SC dose of 10 mg/kg. Conclusions: The half-life (t½) of RI-CT is 7.46 hours when given IV and 6.02 hours when given SC. This is a long half-life that will make it feasible to use RI-CT in a clinical setting with a once daily dose.

The mouse model used in this experiment was SJL-DQ8 mice. When immunized with different type 1 diabetes associated peptides, they developed strong T-cell responses to these peptides. In the ex vivo model, lymphocytes were taken from the spleen of these mice after immunization with an Insulin or GAD65 peptide. They were then stimulated with the peptide used for immunizations and the tested D-peptide was added to see if it blocked T-cell stimulation as measured by IL-2 and interferon γ (IFNγ) production (FIGS. 18 and 19).

RI-CT showed some activity in blocking T cell activation ex vivo in lymphocytes isolated from SJL-DQ8 mice immunized with GAD65.

These data suggest that RI-CT may potentially block the presentation of different diabetogenic peptides by HLADQ8 to T cells and not only InsB:9-23. RI-CT may be more effective in blocking the autoimmune T-cell response in type 1 diabetes (FIGS. 18 and 19).

Methods
Effect of D-Peptides Ex Vivo in SJLDQ8 Mice Injected with GAD65 (IL-2/IFNγ)

Five SJL-DQ8 mice (3 females and 2 males), 8 weeks old, were injected subcutaneously with GAD65 (150 µg/mouse) in Complete Freund's Adjuvant (CFA, from Sigma) and boosted on day 7 in Incomplete Freund's Adjuvant (IFA, from Sigma) to induce T-cell activation. Mice were sacrificed on day 14 and their spleens and draining lymph nodes removed.

Lymphocytes from immunized mice were plated at $2 \times 10^5$ cells/well in 100 µl of medium (RPMI, 10% FBS). The cells were treated with medium or GAD65 (with or without D-peptides), all peptides at 20 µg/ml. Supernatants from stimulated lymphocytes were collected 48 hours after stimulation and stored at −80° C. until the Luminex assay was performed. The Milliplex mouse cytokines/chemokines magnetic panel (EMD Millipore Corporation, Billerica, MA) and a Luminex 200 with xPONENT software (Luminex, Austin, Texas) were used to assay the cytokines following the manufacturer's instructions.

Additional Methods

Cryopreserved mouse hepatocytes were thawed at 37° C. in water bath until the ice was almost melted (~90 seconds). The suspensions from the each were immediately transferred to 50 mL centrifuge tubes containing pre-warmed thawing media (VitroGRO HT Medium, Thawing) at 37° C. The cell suspensions were centrifuged at 50 g for 5 minutes at 4° C. (SYS679). Supernatants were discarded and the pellets were re-suspended in pre-warmed 3 mL incubation media (from in vitroGRO HT Medium, Incubation) at 37° C. The percentages of viable cells in the suspension were determined by using the Trypan Blue stain method (20 µL of tryptan blue and 20 µL of cell suspension) DF=2. Cryo mouse hepatocyte (Bioreclamation, lot #CHV) viability was 72.62% (viable/dead=305/115), and the total cells were 4.57 million. 1.57 mL of incubation media was added to cell concentration to get 1 million cells/mL. 10 µl of 100 µM test compounds stock in ACN:H2O (v:v, 1:1) was added to 990 µl of hepatocyte suspension/incubation media in a 24-well plate. 10 µl of 20 µM Midazolam was added to 990 µl of hepatocyte suspension as a positive control in a 24-well plate. The cells were incubated in a 37° C. incubator (SYS431) for 4 hours. 50 µl of aliquots (n=2) were added to 800 µl of MeOH:water (v:v, 5:95) at 0, 15, 30, 60, 120, 180 and 240 minutes. For all samples, 20 µL of internal standard (200 ng/mL tolbutamide) was added to the solution in water. The samples were vortexed vigorously for 5 minutes and then loaded onto a pre-conditioned Oasis HLB 96-well SPE plate (10 mg, 30 µM). The Oasis HLB 96-well SPE plate was conditioned with 1 mL of methanol and then rinsed with 1 mL of water before the samples were loaded. Once loaded onto the Oasis HLB 96-well SPE plate, residual solution was removed by vacuum. The samples were eluted into a clean 96-well plate with 800 µL of 0.1% formic acid in 70% acetonitrile. The samples were evaporated to dryness under nitrogen at ambient temperature using a TurboVap 96 Concentration Workstation (Caliper Life Sciences). The residues were reconstituted in 150 µL of 25% aqueous acetonitrile with 0.1% formic acid and 10 ul of TCEP. The plate was vortexed for approximately 10 minutes and then aliquots were injected for LC/MS/MS analysis.

Pharmacokinetics of RI-CT Study: Results and Data Interpretation

RI-CT given IV has low clearance (27 mL/min/kg), high volume of distribution (6.9 L/kg) and a long elimination half-life (7.46 h) in male CD-1 mice following a single dose of 10 mg/kg (FIGS. 20-23B). RI-CT given SC also has a long elimination half-life (6.02 h). Mean $t_{max}$, $C_{max}$, $AUC_{Inf}$ and bioavailability were 0.77 h, 5120 ng/mL, 4140 h*ng/mL and 47%, respectively (FIGS. 20-23B). Assuming human pharmacokinetics is similar to the pharmacokinetics in mice, RI-CT if proven clinically useful, will be able to be dosed at once daily sub-cutaneous (SC) injection. The detailed methods of the experiment are provided below.

Blood Sample Preparation

30 µL of each STD, QC sample and matrix for blanks was added to separate wells of a 96 well plate. 800 µL of water:MeOH (95:5, v/v) was added to the STDs, QCs and blanks. For study samples, 400 µL of water:MeOH (95:5, v/v) was added to each. Mouse whole blood samples were diluted 1:2 with 0.1% formic acid in an aqueous 25 mM EDTA solution when samples were collected; consequently, there was an initial dilution factor of 3. Additionally, 400 µL of water:MeOH (95:5, v/v) was added to each diluted sample. To all samples, 20 µL of internal standard (200 ng/mL tolbutamide) solution in water was added. The samples were vortexed vigorously for 5 minutes and then loaded onto a pre-conditioned Oasis HLB 96-well SPE plate. The Oasis HLB 96-well SPE plate was conditioned with 1 mL of methanol and then rinsed with 1 mL of water before the samples were loaded. Once loaded onto the Oasis HLB 96-well SPE plate, residual solution was removed by vacuum. The samples were eluted into a clean 96-well plate with 800 µL of ACN: 0.1% aqueous formic acid (70:30, v/v). The samples were evaporated to dryness under nitrogen at ambient temperature using a TurboVap 96 Concentration Workstation (Caliper Life Sciences). The residues were reconstituted in 150 µL of ACN: 0.1% aqueous formic acid (25:75, v/v) and 10 µL of 0.1 M TCEP. The samples were vortexed for approximately 10 minutes and then aliquots were injected for LC-MS/MS analysis.

Instrumentation
LC System: System #731
HPLC Pump: Shimadzu LC-30AD
Autosampler: Shimadzu SIL-30AC MP
HPLC Conditions:
Mobile Phase A=0.1% Aqueous Formic Acid
Mobile Phase B=0.1% Formic Acid in ACN
Column Temperature=Ambient
Injection Volume=8 µL
Column=ACE C8, 2.1×50 mm, 5 µm
Flow rate=0.6 mL/min
MS/MS System: System #730
SCIEX API 5500 Triple Quad (S/N 213451604)
MS Conditions:
Scan Type=MRM
Polarity=Positive
Ion Source=ESI
CAD=10
CUR=20
GS1/GS2=50/50
IS=2500
TEM=550

Other Embodiments

Embodiment 1. A polypeptide comprising, the amino acid sequence of SEQ ID NO: 1, wherein: $X_1$ is V, L, F, or Y; $X_2$ is L, A, S, C, or G; and wherein each amino acid of the amino acid sequence is a D-amino acid.

Embodiment 2. A polypeptide comprising, the amino acid sequence of SEQ ID NO: 2, wherein: $X_1$ is V, L, F, or Y; $X_2$ is L, A, S, C, or G; $X_3$ is L or G; $X_4$ is H or G; and wherein each amino acid of the amino acid sequence is a D-amino acid.

Embodiment 3. The polypeptide of any one of embodiments 1-2 further comprising, one or more additional D-amino acid residues at the $NH_2$ terminus of the amino acid sequence.

Embodiment 4. The polypeptide of any one of embodiments 1-2 further comprising, two additional D-amino acid residues at the $NH_2$ terminus of the amino acid sequence.

Embodiment 5. The polypeptide of any one of embodiments 1-2 further comprising, two additional D-amino acid residues selected from the group consisting of: FF, HS, SH, RS, and KS at the $NH_2$ terminus of the amino acid sequence.

Embodiment 6. The polypeptide of any one of embodiments 1-5 further comprising, one or more additional D-amino acid residues at the COOH terminus of the amino acid sequence.

Embodiment 7. The polypeptide of any one of embodiments 1-5 further comprising, two additional D-amino acid residues at the COOH terminus of the amino acid sequence.

Embodiment 8. The polypeptide of any one of embodiments 1-5 further comprising, two additional D-amino acid residues selected from the group consisting of: SG, DF, FD, ES, and SF at the COOH terminus of the amino acid sequence.

Embodiment 9. The polypeptide of any one of embodiments 1-8 comprising, the amino acid sequence of SEQ ID NO: 3, wherein each amino acid of the amino acid sequence is a D-amino acid.

Embodiment 10. The polypeptide of any one of embodiments 1-8 comprising, the amino acid sequence of SEQ ID NO: 4, wherein each amino acid of the amino acid sequence is a D-amino acid.

Embodiment 11. The polypeptide of any one of embodiments 1-8 comprising, the amino acid sequence of SEQ ID NO: 5, wherein each amino acid of the amino acid sequence is a D-amino acid.

Embodiment 12. The polypeptide of any one of embodiments 1-8 comprising, the amino acid sequence of SEQ ID NO: 6, wherein each amino acid of the amino acid sequence is a D-amino acid.

Embodiment 13. The polypeptide of any one of embodiments 1-8 comprising, the amino acid sequence of SEQ ID NO: 7, wherein each amino acid of the amino acid sequence is a D-amino acid.

Embodiment 14. The polypeptide of any one of embodiments 1-8 comprising, the amino acid sequence of SEQ ID NO: 8, wherein each amino acid of the amino acid sequence is a D-amino acid.

Embodiment 15. The polypeptide of any one of embodiments 1-8 comprising, the amino acid sequence of SEQ ID NO: 9, wherein each amino acid of the amino acid sequence is a D-amino acid.

Embodiment 16. The polypeptide of any one of embodiments 1-8 comprising, the amino acid sequence of SEQ ID NO: 10, wherein each amino acid of the amino acid sequence is a D-amino acid.

Embodiment 17. The polypeptide of any one of embodiments 1-8 comprising, the amino acid sequence of SEQ ID NO: 11, wherein each amino acid of the amino acid sequence is a D-amino acid.

Embodiment 18. The polypeptide of any one of embodiments 1-8 comprising, the amino acid sequence of SEQ ID NO: 12, wherein each amino acid of the amino acid sequence is a D-amino acid.

Embodiment 19. The polypeptide of any one of embodiments 1-8 comprising, the amino acid sequence of SEQ ID NO: 13, wherein each amino acid of the amino acid sequence is a D-amino acid.

Embodiment 20. The polypeptide of any one of embodiments 1-8 comprising, the amino acid sequence of SEQ ID NO: 14, wherein each amino acid of the amino acid sequence is a D-amino acid.

Embodiment 21. The polypeptide of any one of embodiments 1-8 comprising, the amino acid sequence of SEQ ID NO: 15, wherein each amino acid of the amino acid sequence is a D-amino acid.

Embodiment 22. The polypeptide of any one of embodiments 1-8 comprising, the amino acid sequence of SEQ ID NO: 16, wherein each amino acid of the amino acid sequence is a D-amino acid.

Embodiment 23. The polypeptide of any one of embodiments 1-22, wherein the polypeptide specifically binds to an HLA-DQ8.

Embodiment 24. The polypeptide of embodiment 23, wherein the HLA-DQ8 is comprised on a cell.

Embodiment 25. A complex comprising: (i) the polypeptide of any one of embodiments 1-24; and (ii) an HLA-DQ8.

Embodiment 26. The complex of embodiment 25, wherein the HLA-DQ8 is a human HLA-DQ8.

Embodiment 27. The complex of embodiment 25 or 26, wherein the HLA-DQ8 comprises an alpha chain that is at least 80%, 85%, 90%, 95%, 96%, 97%, 98%, 99%, or 99.5% identical to the amino acid sequence of SEQ ID NO: 17.

Embodiment 28. The complex of any one of embodiments 25-27, wherein the HLA-DQ8 comprises an alpha chain comprising the amino acid sequence of SEQ ID NO: 17.

Embodiment 29. The complex of any one of embodiments 25-28, wherein the HLA-DQ8 comprises a beta chain that is at least 80%, 85%, 90%, 95%, 96%, 97%, 98%, 99%, or 99.5% identical to the amino acid sequence of SEQ ID NO: 18.

Embodiment 30. The complex of any one of embodiments 25-28, wherein the HLA-DQ8 comprises a beta chain comprising the amino acid sequence SEQ ID NO: 18.

Embodiment 31. The complex of any one of embodiments 25-30, wherein the complex is on an antigen presenting cell (APC).

Embodiment 32. The complex of embodiment 31, wherein the APC is a professional APC.

Embodiment 33. The complex of any one of embodiments 31-32, wherein the APC is a macrophage, dendritic cell, B-cell, or T-cell.

Embodiment 34. The complex of any one of embodiments 31-33, wherein the APC expresses an MHC class II molecule.

Embodiment 35. The complex of any one of embodiments 31-34, wherein the APC is human.

Embodiment 36. The complex of any one of embodiments 31-35, wherein the APC has a decreased ability to induce T-cell activation as compared to a second APC comprising HLA-DQ8 that is bound to InsB:9-23.

Embodiment 37. The complex of embodiment 36, wherein the APC has a 10%, 20%, 30%, 40%, 50%, 60%, 70%, 80%, 85%, 90%, 95%, 98%, or 99% decreased ability to induce T-cell activation.

Embodiment 38. The complex of embodiment 36 or 37, wherein the APC has a decreased ability to induce T-cell activation in vivo.

Embodiment 39. The complex of embodiment 36 or 37, wherein the APC has a decreased ability to induce T-cell activation in vitro.

Embodiment 40. The complex of any one of embodiments 25-39, wherein the complex is in a subject.

Embodiment 41. The complex of embodiment 40, wherein the subject is a human.

Embodiment 42. A pharmaceutical composition comprising the polypeptide of any one of embodiments 1-24, and a pharmaceutically acceptable carrier.

Embodiment 43. A method of inhibiting activation of a cytotoxic T-cell, the method comprising, contacting an APC with the polypeptide of any one of embodiments 1-24, wherein the APC comprises HLA-DQ8.

Embodiment 44. The method of embodiment 43, wherein the method is performed in vitro.

Embodiment 45. The method of embodiments 43, wherein the method is performed in vivo.

Embodiment 46. A method for treating a subject having or suspected of having T1D comprising, administering to the subject the polypeptide of any one of embodiments 1-24, or the pharmaceutical composition of embodiment 42.

Embodiment 47. The method of embodiment 46, wherein the subject is a human.

Embodiment 48. The method of any one of embodiments 46-47, wherein the polypeptide or the pharmaceutical composition is administered to the subject parenterally.

Embodiment 49. The method of any one of embodiments 46-47, wherein the polypeptide or the pharmaceutical composition is administered to the subject non-parenterally.

Embodiment 50. A method of making an HLA-DQ8 inhibiting peptide, the method comprising: (a) identifying a peptide that binds to HLA-DQ8 in a subject; and (b) synthesizing a retro-inverso peptide of the peptide identified in step (a) embodiment 50.

Embodiment 51. The method of embodiment 50, wherein the identifying comprises: (i) isolating APCs that express HLA-DQ8 from a subject; and (ii) obtaining the amino acid sequence of a peptide bound to the HLA-DQ8 of step (i) of embodiment 51.

In addition to the embodiments expressly described herein, it is to be understood that all of the features disclosed in this disclosure may be combined in any combination (e.g., permutation, combination). Each element disclosed in the disclosure may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, and can make various changes and modifications of the invention to adapt it to various usages and conditions. Thus, other embodiments are also within the claims.

General Techniques

The practice of the subject matter of the disclosure will employ, unless otherwise indicated, conventional techniques of molecular biology (including recombinant techniques), microbiology, cell biology, biochemistry and immunology, which are within the skill of the art. Such techniques are explained fully in the literature, such as, but without limiting, Molecular Cloning: A Laboratory Manual, second edition (Sambrook, et al., 1989) Cold Spring Harbor Press; Oligonucleotide Synthesis (M. J. Gait, ed., 1984); Methods in Molecular Biology, Humana Press; Cell Biology: A Laboratory Notebook (J. E. Cellis, ed., 1998) Academic Press; Animal Cell Culture (R. I. Freshney, ed., 1987); Introduction to Cell and Tissue Culture (J. P. Mather and P. E. Roberts, 1998) Plenum Press; Cell and Tissue Culture: Laboratory Procedures (A. Doyle, J. B. Griffiths, and D. G. Newell, eds., 1993-8) J. Wiley and Sons; Methods in Enzymology (Academic Press, Inc.); Handbook of Experimental Immunology (D. M. Weir and C. C. Blackwell, eds.); Gene Transfer Vectors for Mammalian Cells (J. M. Miller and M. P. Calos, eds., 1987); Current Protocols in Molecular Biology (F. M. Ausubel, et al., eds., 1987); PCR: The Polymerase Chain Reaction, (Mullis, et al., eds., 1994); Current Protocols in Immunology (J. E. Coligan et al., eds., 1991); Short Protocols in Molecular Biology (Wiley and Sons, 1999); Immunobiology (C. A. Janeway and P. Travers, 1997); Antibodies (P. Finch, 1997); Antibodies: a practical approach (D. Catty., ed., IRL Press, 1988-1989); Monoclonal antibodies: a practical approach (P. Shepherd and C. Dean, eds., Oxford University Press, 2000); Using antibodies: a laboratory manual (E. Harlow and D. Lane (Cold Spring Harbor Laboratory Press, 1999); The Antibodies (M. Zanetti and J. D. Capra, eds., Harwood Academic Publishers, 1995).

Equivalents and Scope

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The disclosure includes embodiments in which exactly one member of the group is present in, employed in, or otherwise relevant to a given product or process. The disclosure includes embodiments in which more than one, or all of the group members are present in, employed in, or otherwise relevant to a given product or process.

Furthermore, the disclosure encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the disclosure, or embodiments of the disclosure, is/are referred to as comprising particular elements and/or features, certain embodiments of the disclosure or embodiments of the disclosure consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the disclosure, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the present disclosure, the specification shall control. In addition, any particular embodiment of the present disclosure that falls within the prior art may be explicitly excluded from any one or more of the claims. Because such embodiments are deemed to be known to one of ordinary skill in the art, they may be excluded even if the exclusion is not set forth explicitly herein. Any particular embodiment of the disclosure can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present disclosure, as defined in the following claims.

REFERENCES

The following references are incorporated herein by reference in their entireties.
1. Herold K C, Vignali D A, Cooke A, and Bluestone J A. T1D: translating mechanistic observations into effective clinical outcomes. *Nature reviews Immunology.* 2013; 13(4):243-56.
2. Group D P. Incidence and trends of childhood T1D worldwide 1990-1999. *Diabetic medicine: a journal of the British Diabetic Association.* 2006; 23(8):857-66.
3. Dabelea D, Mayer-Davis E J, Saydah S, Imperatore G, Linder B, Divers J, Bell R, Badaru A, Talton J W, Crume T, et al. Prevalence of type 1 and type 2 diabetes among children and adolescents from 2001 to 2009. *Jama.* 2014; 311(17):1778-86.
4. Bach J F. Insulin-dependent diabetes mellitus as an autoimmune disease. *Endocrine reviews.* 1994; 15(4): 516-42.
5. Brownlee M. Glycation products and the pathogenesis of diabetic complications. *Diabetes Care.* 1992; 15(12): 1835-43.
6. Clark C M, Jr., and Lee D A. Prevention and treatment of the complications of diabetes mellitus. *The New England journal of medicine.* 1995; 332(18):1210-7.
7. Juvenile Diabetes Research Foundation Continuous Glucose Monitoring Study G. Prolonged nocturnal hypoglycemia is common during 12 months of continuous glucose monitoring in children and adults with T1D. *Diabetes Care.* 2010; 33(5):1004-8.
8. Diabetes C, Complications Trial Research G, Nathan D M, Genuth S, Lachin J, Cleary P, Crofford O, Davis M, Rand L, and Siebert C. The effect of intensive treatment of diabetes on the development and progression of long-term complications in insulin-dependent diabetes mellitus. *The New England journal of medicine.* 1993; 329 (14):977-86.
9. Borus J S, and Laffel L. Adherence challenges in the management of T1D in adolescents: prevention and intervention. *Curr Opin Pediatr.* 2010; 22(4):405-11.
10. Lee K H, Wucherpfennig K W, and Wiley D C. Structure of a human insulin peptide-HLA-DQ8 complex and susceptibility to T1D. *Nature immunology.* 2001; 2(6):501-7.
11. Bresson D, Fousteri G, Manenkova Y, Croft M, and von Herrath M. Antigen-specific prevention of T1D in NOD mice is ameliorated by OX40 agonist treatment. *Journal of autoimmunity.* 2011; 37(4):342-51.
12. Nakayama M, Abiru N, Moriyama H, Babaya N, Liu E, Miao D, Yu L, Wegmann D R, Hutton J C, Elliott J F, et al. Prime role for an insulin epitope in the development of T1D in NOD mice. *Nature.* 2005; 435(7039):220-3.
13. Yoshida K, Corper A L, Herro R, Jabri B, Wilson I A, and Teyton L. The diabetogenic mouse MHC class II molecule I—Ag7 is endowed with a switch that modulates TCR affinity. *The Journal of clinical investigation.* 2010; 120(5): 1578-90.
14. Corper A L, Stratmann T, Apostolopoulos V, Scott C A, Garcia K C, Kang A S, Wilson I A, and Teyton L. A structural framework for deciphering the link between I—Ag7 and autoimmune diabetes. *Science.* 2000; 288 (5465):505-11.
15. Wucherpfennig K W. Insights into autoimmunity gained from structural analysis of MHC-peptide complexes. *Curr Opin Immunol.* 2001; 13(6):650-6.
16. Cucca F, Dudbridge F, Loddo M, Mulargia A P, Lampis R, Angius E, De Virgiliis S, Koeleman B P, Bain S C, Barnett A H, et al. The HLA-DPB1-associated component of the IDDM1 and its relationship to the major loci HLA-DQB1, -DQA1, and -DRB1. *Diabetes.* 2001; 50(5): 1200-5.
17. Teyton L. The saga of MHC-bound peptides: a renaissance for antigen presentation? *J Clin Invest.* 2007; 117 (11):3164-6.
18. Sanjeevi C B, Sedimbi S K, Landin-Olsson M, Kockum I, Lernmark A, Swedish Childhood D, and the Diabetes Incidence in Sweden Study G. Risk conferred by HLA-DR and DQ for T1D in 0-35-year age group in Sweden. *Ann N Y Acad Sci.* 2008; 1150(106-11.
19. Owerbach D, Gunn S, and Gabbay K H. Primary association of HLA-DQw8 with T1D in DR4 patients. *Diabetes.* 1989; 38(7):942-5.
20. Mezei M. Simulaid: a simulation facilitator and analysis program. *Journal of computational chemistry.* 2010; 31(14):2658-68.
21. D. A. Case D S C, T. E. Cheatham, III, T. A. Darden, R. E. Duke, T. J. Giese, H. Gohlke, A. W. Goetz, D. Greene, N. Homeyer, S. Izadi, A. Kovalenko, T. S. Lee, S. LeGrand, P. Li, C. Lin, J. Liu, T. Luchko, R. Luo, D. Mermelstein, K. M. Merz, G. Monard, H. Nguyen, I. Omelyan, A. Onufriev, F. Pan, R. Qi, D. R. Roe, A. Roitberg, C. Sagui, C. L. Simmerling, W. M. Botello-Smith, J. Swails, R. C. Walker, J. Wang, R. M. Wolf, X. Wu, L. Xiao, D. M. York and P. A. Kollman AMBER 2017, University of California, San Francisco. 2017.
22. Kaneto H, Matsuoka T A, Katakami N, Kawamori D, Miyatsuka T, Yoshiuchi K, Yasuda T, Sakamoto K, Yamasaki Y, and Matsuhisa M. Oxidative stress and the JNK pathway are involved in the development of type 1 and type 2 diabetes. *Current molecular medicine.* 2007; 7(7): 674-86.
23. Jacobson E M, Yang H, Menconi F, Wang R, Osman R, Skrabanek L, Li C W, Fadlalla M, Gandhi A, Chaturvedi V, et al. Employing a recombinant HLA-DR3 expression system to dissect major histocompatibility complex II-thyroglobulin peptide dynamism: a genetic, biochemical, and reverse immunological perspective. *J Biol Chem.* 2009; 284(49):34231-43.
24. Geluk A, Taneja V, van Meijgaarden K E, Zanelli E, Abou-Zeid C, Thole J E, de Vries R R, David C S, and Ottenhoff T H. Identification of HLA class II-restricted determinants of Mycobacterium tuberculosis-derived proteins by using HLA-transgenic, class II-deficient mice. *Proc Natl Acad Sci USA.* 1998; 95(18):10797-802.
25. Michels A W, Ostrov D A, Zhang L, Nakayama M, Fuse M, McDaniel K, Roep B O, Gottlieb P A, Atkinson M A, and Eisenbarth G S. Structure-based selection of small molecules to alter allele-specific MHC class II antigen presentation. *Journal of immunology*. 2011; 187(11): 5921-30.
26. White J, Pullen A, Choi K, Marrack P, and Kappler J W. Antigen recognition properties of mutant V beta 3+ T-cell receptors are consistent with an immunoglobulin-like structure for the receptor. *J Exp Med*. 1993; 177(1):119-25.
27. Kudva Y C, Rajagopalan G, Raju R, Abraham R S, Smart M, Hanson J, and David C S. Modulation of insulitis and T1D by transgenic HLA-DR3 and DQ8 in NOD mice lacking endogenous MHC class II. Hum Immunol. 2002; 63(11):987-99.
28. Bradley D S, Nabozny G H, Cheng S, Zhou P, Griffiths M M, Luthra H S, and David C S. HLA-DQB1 polymorphism determines incidence, onset, and severity of collagen-induced arthritis in transgenic mice. Implications in human rheumatoid arthritis. J Clin Invest. 1997; 100(9): 2227-34.
29. Nabozny G H, Baisch J M, Cheng S, Cosgrove D, Griffiths M M, Luthra H S, and David C S. HLA-DQ8 transgenic mice are highly susceptible to collagen-induced arthritis: a novel model for human polyarthritis. *J Exp Med*. 1996; 183(1):27-37.
30. Tzou S C, Lupi I, Landek M, Gutenberg A, Tzou Y M, Kimura H, Pinna G, Rose N R, and Caturegli P. Autoimmune hypophysitis of SJL mice: clinical insights from a new animal model. *Endocrinology*. 2008; 149(7):3461-9.
31. Li C W, Menconi F, Osman R, Mezei M, Jacobson E M, Concepcion E, David C S, Kastrinsky D B, Ohlmeyer M, and Tomer Y. Identifying a Small Molecule Blocking Antigen Presentation in Autoimmune Thyroiditis. *J Biol Chem*. 2016; 291(8):4079-90.
32. Sengar D P, and Goldstein R. Comprehensive typing of DQB1 alleles by PCR-RFLP. *Tissue Antigens*. 1994; 43(4):242-8.
33. Long S A, Rieck M, Sanda S, Bollyky J B, Samuels P L, Goland R, Ahmann A, Rabinovitch A, Aggarwal S, Phippard D, et al. Rapamycin/IL-2 combination therapy in patients with T1D augments Tregs yet transiently impairs beta-cell function. *Diabetes*. 2012; 61(9):2340-8.
34. Lande R, Ganguly D, Facchinetti V, Frasca L, Conrad C, Gregorio J, Meller S, Chamilos G, Sebasigari R, Riccieri V, et al. Neutrophils activate plasmacytoid dendritic cells by releasing self-DNA-peptide complexes in systemic lupus erythematosus. *Sci Transl Med*. 2011; 3(73):73ra19.
35. Menconi F, Huber A, Osman R, Concepcion E, Jacobson E M, Stefan M, David C S, and Tomer Y. Tg.2098 is a major human thyroglobulin T-cell epitope. *Journal of autoimmunity*. 2010; 35(1):45-51.
36. Atkinson M A, Eisenbarth G S, and Michels A W. T1D. *Lancet*. 2014; 383(9911):69-82.
37. Herold K C, Hagopian W, Auger J A, Poumian-Ruiz E, Taylor L, Donaldson D, Gitelman S E, Harlan D M, Xu D, Zivin R A, et al. Anti-CD3 monoclonal antibody in new-onset T1D mellitus. *The New England journal of medicine*. 2002; 346(22):1692-8.
38. Pescovitz M D, Greenbaum C J, Krause-Steinrauf H, Becker D J, Gitelman S E, Goland R, Gottlieb P A, Marks J B, McGee P F, Moran A M, et al. Rituximab, B-lymphocyte depletion, and preservation of beta-cell function. *The New England journal of medicine*. 2009; 361(22): 2143-52.
39. Michels A W, and Eisenbarth G S. Immune intervention in T1D. *Seminars in immunology*. 2011; 23(3):214-9.
40. Bloomgren G, Richman S, Hotermans C, Subramanyam M, Goelz S, Natarajan A, Lee S, Plavina T, Scanlon J V, Sandrock A, et al. Risk of natalizumab-associated progressive multifocal leukoencephalopathy. *The New England journal of medicine*. 2012; 366(20):1870-80.
41. Van Regenmortel M H, and Muller S. D-peptides as immunogens and diagnostic reagents. *Curr Opin Biotechnol*. 1998; 9(4):377-82.
42. Craik D J, Fairlie D P, Liras S, and Price D. The future of peptide-based drugs. *Chemical biology & drug design*. 2013; 81(1): 136-47.
43. Onengut-Gumuscu S, and Concannon P. The genetics of T1D: lessons learned and future challenges. *Journal of autoimmunity*. 2005; 25 Suppl(34-9.
44. Jahromi M M, and Eisenbarth G S. Genetic determinants of T1D across populations. *Ann N Y Acad Sci*. 2006; 1079(289-99.
45. Steenkiste A, Valdes A M, Feolo M, Hoffman D, Concannon P, Noble J, Schoch G, Hansen J, Helmberg W, Dorman J S, et al. 14th International HLA and Immunogenetics Workshop: report on the HLA component of T1D. *Tissue antigens*. 2007; 69 Suppl 1(214-25.
46. Ilonen J, Sjoroos M, Knip M, Veijola R, Simell O, Akerblom H K, Paschou P, Bozas E, Havarani B, Malamitsi-Puchner A, et al. Estimation of genetic risk for T1D. *Am J Med Genet*. 2002; 115(1):30-6.
47. Pociot F, and McDermott M F. Genetics of T1D mellitus. *Genes Immun*. 2002; 3(5):235-49.
48. Buus S, Sette A, and Grey H M. The interaction between protein-derived immunogenic peptides and Ia. *Immunological reviews*. 1987; 98(115-41.
49. Nakayama M, Beilke J N, Jasinski J M, Kobayashi M, Miao D, Li M, Coulombe M G, Liu E, Elliott J F, Gill R G, et al. Priming and effector dependence on insulin B:9-23 peptide in NOD islet autoimmunity. *J Clin Invest*. 2007; 117(7):1835-43.
50. Eisenbarth G S, Moriyama H, Robles D T, Liu E, Yu L, Babu S, Redondo M J, Gottlieb P, Wegmann D, and Rewers M. Insulin autoimmunity: prediction/precipitation/prevention type 1A diabetes. *Autoimmun Rev*. 2002; 1(3):139-45.
51. Eisenbarth G S. Insulin autoimmunity: immunogenetics/immunopathogenesis of type 1A diabetes. *Ann N Y Acad Sci*. 2003; 1005(109-18.
52. Achenbach P, Koczwara K, Knopff A, Naserke H, Ziegler A G, and Bonifacio E. Mature high-affinity immune responses to (pro)insulin anticipate the autoimmune cascade that leads to T1D. *J Clin Invest*. 2004; 114(4):589-97.
53. Boyton R J, Lohmann T, Londei M, Kalbacher H, Halder T, Frater A J, Douek D C, Leslie D G, Flavell R A, and Altmann D M. Glutamic acid decarboxylase T lymphocyte responses associated with susceptibility or resistance to T1D: analysis in disease discordant human twins, non-obese diabetic mice and HLA-DQ transgenic mice. *Int Immunol*. 1998; 10(12):1765-76.
54. Yu B, Gauthier L, Hausmann D H, and Wucherpfennig K W. Binding of conserved islet peptides by human and murine MHC class II molecules associated with susceptibility to T1D. *Eur J Immunol*. 2000; 30(9):2497-506.
55. Kwok W W, Domeier M L, Raymond F C, Byers P, and Nepom G T. Allele-specific motifs characterize HLA-DQ interactions with a diabetes-associated peptide derived from glutamic acid decarboxylase. *J Immunol*. 1996; 156(6):2171-7.
56. Graham J, Hagopian W A, Kockum I, Li L S, Sanjeevi C B, Lowe R M, Schaefer J B, Zarghami M, Day H L, 56. Landin-Olsson M, et al. Genetic effects on age-dependent onset and islet cell autoantibody markers in T1D. *Diabetes.* 2002; 51(5):1346-55.
57. Uppalapati M, Lee D J, Mandal K, Li H, Miranda L P, Lowitz J, Kenney J, Adams J J, Ault-Riche D, Kent S B, et al. A Potent d-Protein Antagonist of VEGF-A is Non-immunogenic, Metabolically Stable, and Longer-Circulating in vivo. *ACS chemical biology.* 2016; 11(4):1058-65.
58. Liu M, Li C, Pazgier M, Li C, Mao Y, Lv Y, Gu B, Wei G, Yuan W, Zhan C, et al. D-peptide inhibitors of the p53-MDM2 interaction for targeted molecular therapy of malignant neoplasms. *Proceedings of the National Academy of Sciences of the United States of America.* 2010; 107(32): 14321-6.
59. Gregori M, Taylor M, Salvati E, Re F, Mancini S, Balducci C, Forloni G, Zambelli V, Sesana S, Michael M, et al. Retro-inverso peptide inhibitor nanoparticles as potent inhibitors of aggregation of the Alzheimer's Abeta peptide. *Nanomedicine: nanotechnology, biology, and medicine.* 2017; 13(2):723-32.
60. Pescarolo M P, Bagnasco L, Malacarne D, Melchiori A, Valente P, Millo E, Bruno S, Basso S, and Parodi S. A retro-inverso peptide homologous to helix 1 of c-Myc is a potent and specific inhibitor of proliferation in differenT-cellular systems. *FASEB journal: official publication of the Federation of American Societies for Experimental Biology.* 2001; 15(1): 31-3.
61. Shaltiel-Karyo R, Frenkel-Pinter M, Egoz-Matia N, Frydman-Marom A, Shalev D E, Segal D, and Gazit E. Inhibiting alpha-synuclein oligomerization by stable cell-penetrating beta-synuclein fragments recovers phenotype of Parkinson's disease model flies. *PloS one.* 2010; 5(11): e13863.
62. Srinivasan M, Wardrop R M, Gienapp I E, Stuckman S S, Whitacre C C, and Kaumaya P T. A retro-inverso peptide mimic of CD28 encompassing the MYPPPY motif adopts a polyproline type II helix and inhibits encephalitogenic T-cells in vitro. *Journal of immunology.* 2001; 167(1):578-85.
63. Jacobson E M, Huber A, and Tomer Y. The HLA gene complex in thyroid autoimmunity: from epidemiology to etiology. *Journal of autoimmunity.* 2008; 30(1-2):58-62.
64. Herve M, Maillere B, Mourier G, Texier C, Leroy S, and Menez A. On the immunogenic properties of retro-inverso peptides. Total retro-inversion of T-cell epitopes causes a loss of binding to MHC II molecules. *Molecular immunology.* 1997; 34(2):157-63.
65. Sela M, and Zisman E. Different roles of D-amino acids in immune phenomena. *FASEB journal: official publication of the Federation of American Societies for Experimental Biology.* 1997; 11(6):449-56.
66. Craft J, and Fatenejad S. Self antigens and epitope spreading in systemic autoimmunity. *Arthritis Rheum.* 1997; 40(8):1374-82.
67. Sohnlein P, Muller M, Syren K, Hartmann U, Bohm B O, Meinck H M, Knip M, Akerblom H K, and Richter W. Epitope spreading and a varying but not disease-specific GAD65 antibody response in T1D. The Childhood Diabetes in Finland Study Group. *Diabetologia.* 2000; 43(2): 210-7.
68. Prasad S, Kohm A P, McMahon J S, Luo X, and Miller S D. Pathogenesis of NOD diabetes is initiated by reactivity to the insulin B chain 9-23 epitope and involves functional epitope spreading. *Journal of autoimmunity.* 2012; 39(4):347-53.
69. Freitag T, Schulze-Koops H, Niedobitek G, Melino G, and Schuppan D. The role of the immune response against tissue transglutaminase in the pathogenesis of coeliac disease. *Autoimmun Rev.* 2004; 3(2):13-20.
70. Green P H, and Cellier C. Celiac disease. *The New England journal of medicine.* 2007; 357(17): 1731-43.
71. Ji N, Somanaboeina A, Dixit A, Kawamura K, Hayward N J, Self C, Olson G L, and Forsthuber T G. Small molecule inhibitor of antigen binding and presentation by HLA-DR2b as a therapeutic strategy for the treatment of multiple sclerosis. *J Immunol.* 2013; 191(10):5074-84.
72. Tiberti C, Yu L, Lucantoni F, Panimolle F, Spagnuolo I, Lenzi A, Eisenbarth G S, and Dotta F. Detection of four diabetes specific autoantibodies in a single radioimmunoassay: an innovative high-throughput approach for autoimmune diabetes screening. *Clin Exp Immunol.* 2011; 166(3):317-24.
73. Steinman L. Despite epitope spreading in the pathogenesis of autoimmune disease, highly restricted approaches to immune therapy may still succeed [with a hedge on this bet]. *Journal of autoimmunity.* 2000; 14(4):278-82.

What is claimed is:

1. A polypeptide comprising,
   (i) the amino acid sequence of SEQ ID NO: 1, wherein:
      $X_1$ is V, L, F, or Y;
      $X_2$ is L, A, S, C, or G; or
   (ii) the amino acid sequence of SEQ ID NO: 2, wherein:
      $X_1$ is V, L, F, or Y;
      $X_2$ is L, A, S, C, or G;
      $X_3$ is L or G;
      $X_4$ is H or G; and
   wherein each amino acid of the amino acid sequence is a D-amino acid.

2. The polypeptide claim 1, further comprising:
   (i) one or more additional D-amino acid residues at the $NH_2$ terminus of the amino acid sequence, or
   (ii) two additional D-amino acid residues at the $NH_2$ terminus of the amino acid sequence, or
   (iii) two additional D-amino acid residues selected from the group consisting of: FF, HS, SH, RS, and KS at the $NH_2$ terminus of the amino acid sequence.

3. The polypeptide of claim 1, further comprising:
   (i) one or more additional D-amino acid residues at the COOH terminus of the amino acid sequence, or
   (ii) two additional D-amino acid residues at the COOH terminus of the amino acid sequence, or
   (iii) two additional D-amino acid residues selected from the group consisting of: SG, DF, FD, ES, and SF at the COOH terminus of the amino acid sequence.

4. The polypeptide of claim 1 comprising, the amino acid sequence of any of SEQ ID NOs: 3-16.

5. The polypeptide of claim 1, wherein the polypeptide specifically binds to an HLA-DQ8.

6. The polypeptide of claim 5, wherein the HLA-DQ8 is comprised on a cell.

7. A complex comprising:
   (i) the polypeptide of claim 1; and
   (ii) an HLA-DQ8, optionally wherein the HLA-DQ8 is a human HLA-DQ8.

8. The complex of claim 7, wherein the HLA-DQ8 comprises:
   (i) an alpha chain that is at least 80%, 85%, 90%, 95%, 96%, 97%, 98%, 99%, or 99.5% identical to the amino acid sequence of SEQ ID NO: 17 or an alpha chain comprising the amino acid sequence of SEQ ID NO: 17; and/or,
   (ii) a beta chain that is at least 80%, 85%, 90%, 95%, 96%, 97%, 98%, 99%, or 99.5% identical to the amino acid sequence of SEQ ID NO: 18 or a beta chain comprising the amino acid sequence SEQ ID NO: 18.

9. The complex of claim 7, wherein the complex is on an antigen presenting cell (APC), optionally, wherein the APC is a professional APC, a macrophage, dendritic cell, B-cell, or T-cell.

10. The complex of claim 9, wherein the APC:
    (i) expresses an MHC class II molecule; and/or,
    (ii) is human; and/or,
    (iii) has a decreased ability to induce T-cell activation as compared to a second APC comprising HLA-DQ8 that is bound to InsB: 9-23, optionally, wherein the APC has a 10%, 20%, 30%, 40%, 50%, 60%, 70%, 80%, 85%, 90%, 95%, 98%, or 99% decreased ability to induce T-cell activation.

11. The complex of claim 10 (iii), wherein the APC has a decreased ability to induce T-cell activation in vivo or in vitro.

12. The complex of claim 7, wherein the complex is in a subject, optionally, wherein the subject is a human.

13. A method, comprising:
    (i) inhibiting activation of a cytotoxic T-cell, comprising contacting an APC with the polypeptide of claim 1, wherein the APC comprises HLA-DQ8, optionally wherein the method is performed in vitro, or in vivo; or
    (ii) treating a subject having or suspected of having TID comprising, comprising administering to the subject the polypeptide of claim 1, optionally complexed with HLA-DQ8, optionally comprising a pharmaceutically acceptable carrier, optionally, wherein the subject is human, optionally wherein the polypeptide or the complex is administered to the subject parenterally or non-parenterally; or
    (iii) making an HLA-DQ8 inhibiting peptide, comprising:
        (a) identifying a peptide that binds to HLA-DQ8 in a subject; and
        (b) synthesizing a retro-inverso peptide of the peptide identified in step (a), optionally, wherein the identifying comprises:
            (i) isolating APCs that express HLA-DQ8 from a subject; and
            (ii) obtaining the amino acid sequence of a peptide bound to the HLA-DQ8 of step (i).

14. A polypeptide comprising,
    an amino acid sequence of SEQ ID NO: 4 or an amino acid sequence of SEQ ID NO: 12, wherein each amino acid of the amino acid sequence is a D-amino acid.

15. The polypeptide of claim 14, wherein the polypeptide specifically binds to an HLA-DQ8.

16. A complex comprising:
    (i) the polypeptide of claim 14; and
    (ii) an HLA-DQ8, optionally wherein the HLA-DQ8 is a human HLA-DQ8.

17. The complex of claim 16, wherein the complex is on an antigen presenting cell (APC), optionally, wherein the APC is a professional APC, a macrophage, dendritic cell, B-cell, or T-cell.

18. The complex of claim 17, wherein the APC:
    (i) expresses an MHC class II molecule; and/or,
    (ii) is human; and/or,
    (iii) has a decreased ability to induce T-cell activation as compared to a second APC comprising HLA-DQ8 that is bound to InsB: 9-23, optionally,
        wherein the APC has a 10%, 20%, 30%, 40%, 50%, 60%, 70%, 80%, 85%, 90%, 95%, 98%, or 99% decreased ability to induce T-cell activation.

19. The complex of claim 15 (iii), wherein the APC has a decreased ability to induce T-cell activation in vivo or in vitro.

20. The complex of claim 16, wherein the complex is in a subject, optionally, wherein the subject is a human.

* * * * *